(12) United States Patent
Sueyoshi et al.

(10) Patent No.: US 7,769,980 B2
(45) Date of Patent: Aug. 3, 2010

(54) PARALLEL OPERATION DEVICE ALLOWING EFFICIENT PARALLEL OPERATIONAL PROCESSING

(75) Inventors: Toshinori Sueyoshi, Kumamoto (JP); Masahiro Iida, Kumamoto (JP); Mitsutaka Nakano, Kumamoto (JP); Fumiaki Senoue, Kumamoto (JP); Katsuya Mizumoto, Chiyoda-ku (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 307 days.

(21) Appl. No.: 11/840,116

(22) Filed: Aug. 16, 2007

(65) Prior Publication Data

US 2008/0052497 A1   Feb. 28, 2008

(30) Foreign Application Priority Data

Aug. 21, 2006   (JP) ............................. 2006-224244

(51) Int. Cl.
G06F 15/80   (2006.01)
(52) U.S. Cl. .............................. 712/10; 712/21; 712/22; 712/215
(58) Field of Classification Search .................. 712/10, 712/21, 215, 22
See application file for complete search history.

(56) References Cited

U.S. PATENT DOCUMENTS

| | | | | |
|---|---|---|---|---|
| 5,410,723 A | * | 4/1995 | Schmidt et al. ............... | 712/18 |
| 5,487,022 A | * | 1/1996 | Simpson et al. ............. | 708/205 |
| 5,574,933 A | * | 11/1996 | Horst ........................... | 712/28 |
| 5,673,407 A | * | 9/1997 | Poland et al. ................ | 712/222 |
| 6,079,008 A | * | 6/2000 | Clery, III ...................... | 712/11 |
| 6,272,616 B1 | * | 8/2001 | Fernando et al. ............. | 712/20 |
| 6,397,324 B1 | * | 5/2002 | Barry et al. .................. | 712/225 |
| 6,735,690 B1 | * | 5/2004 | Barry et al. .................. | 712/244 |
| 6,816,961 B2 | * | 11/2004 | Rice et al. .................... | 712/223 |
| 2002/0019928 A1 | * | 2/2002 | Saulsbury ..................... | 712/222 |
| 2003/0140212 A1 | * | 7/2003 | Stein et al. ..................... | 712/22 |
| 2005/0285862 A1 | | 12/2005 | Noda et al. | |
| 2006/0126726 A1 | * | 6/2006 | Lin et al. ............... | 375/240.03 |

FOREIGN PATENT DOCUMENTS

JP   2006-127460 A   5/2006

* cited by examiner

Primary Examiner—Aimee J Li
(74) Attorney, Agent, or Firm—Buchanan Ingersoll & Rooney PC

(57) ABSTRACT

In arithmetic/logic units (ALU) provided corresponding to entries, an MIMD instruction decoder generating a group of control signals in accordance with a Multiple Instruction-Multiple Data (MIMD) instruction and an MIMD register storing data designating the MIMD instruction are provided, and an inter-ALU communication circuit is provided. The amount and direction of movement of the inter-ALU communication circuit are set by data bits stored in a movement data register. It is possible to execute data movement and arithmetic/logic operation with the amount of movement and operation instruction set individually for each ALU unit. Therefore, in a Single Instruction-Multiple Data type processing device, Multiple Instruction-Multiple Data operation can be executed at high speed in a flexible manner.

7 Claims, 33 Drawing Sheets

FIG.5
POINTER REGISTER INSTRUCTION

| INSTRUCTION | OPERATION |
|---|---|
| ptr.set n,px | px ← #n (0＜n＜MAX_BIT,x=0...3)<br>: SET ARBITRARY VALUE IN REGISTER px |
| ptr.cpy px,py | py ← px (x,y=0...3)<br>: COPY BETWEEN TWO REGISTERS |
| ptr.inc px | px ← px+1 (x=0...3)<br>: INCREMENT px VALUE |
| ptr.inc2 px | px ← px+2 (x=0...3)<br>: INCREMENT px VALUE BY 2 |
| ptr.dec px | px ← px−1 (x=0...3)<br>: DECREMENT px VALUE |
| ptr.dec2 px | px ← px−2 (x=0...3)<br>: 2-BIT SHIFT px VALUE |
| ptr.sft px | px ← px＜＜1 (x=0...3)<br>: 1- BIT SHIFT px VALUE |

FIG.6
ALU INSTRUCTION FOR 1-BIT OPERATION (LOAD/STORE)

| INSTRUCTION | OPERATION | |
|---|---|---|
| mem.ld.X@px | Xj ← Aj[px] | (j=0...MAX_ENTRY,x=0...3) |
| mem.ld.N@px | Nj ← Aj[px] | (j=0...MAX_ENTRY,x=0...3) |
| mem.ld.V@px | Vj ← Aj[px] | (j=0...MAX_ENTRY,x=0...3) |
| mem.ld.F@px | Fj ← Aj[px] | (j=0...MAX_ENTRY,x=0...3) |
| mem.ld.D@px | Dj ← Aj[px] | (j=0...MAX_ENTRY,x=0...3) |
| mem.ld.C@px | Cj ← Aj[px] | (j=0...MAX_ENTRY,x=0...3) |
| mem.ld.XL@px | XLj ← Aj[px] | (j=0...MAX_ENTRY,x=0...3) |
| mem.ld.XH@px | XHj ← Aj[px] | (j=0...MAX_ENTRY,x=0...3) |
| | : LOAD FROM MEMORY POSITION INDICATED BY px | |
| mem.st.X@px | Aj[px] ← Xj if Vj | (j=0...MAX_ENTRY,x=0...3) |
| mem.st.N@px | Aj[px] ← Nj if Vj | (j=0...MAX_ENTRY,x=0...3) |
| mem.st.V@px | Aj[px] ← Vj if Vj | (j=0...MAX_ENTRY,x=0...3) |
| mem.st.F@px | Aj[px] ← Fj if Vj | (j=0...MAX_ENTRY,x=0...3) |
| mem.st.D@px | Aj[px] ← Dj if Vj | (j=0...MAX_ENTRY,x=0...3) |
| mem.st.C@px | Aj[px] ← Cj if Vj | (j=0...MAX_ENTRY,x=0...3) |
| mem.st.XL@px | Aj[px] ← XLj if Vj | (j=0...MAX_ENTRY,x=0...3) |
| mem.st.XH@px | Aj[px] ← XHj if Vj | (j=0...MAX_ENTRY,x=0...3) |
| | : STORE TO MEMORY POSITION INDICATED BY px<br>NOT EXECUTED WHEN MASK REGISTER (V) IS CLEARED | |
| mem.swp.X@px | Aj[px] ⇔ Xj if Vj & Nj    (j=0...MAX_ENTRY,x=0...3)<br>: SWAP DATA OF MEMORY CELL POSITION INDICATED<br>BY px WITH REGISTER DATA | |

FIG.7

ALU INSTRUCTION FOR 2-BIT OPERATION (LOAD/STORE)

| INSTRUCTION | OPERATION |
|---|---|
| mem2.ld.X@px | XLj ← Aj[px]        (j=0...MAX_ENTRY,x=0...3)<br>XHj ← Aj[px+1]     (j=0...MAX_ENTRY,x=0...3)<br>:LOAD FROM MEMORY POSITION INDICATED BY px<br>CONTINUOUS 2 BITS ON MEMORY ARE LOADED SIMULTANEOUSLY AND STORED IN XH/XL REGISTERS |
| mem2.st.X@px | Aj[px] ← XLj if Vj         (j=0...MAX_ENTRY,x=0...3)<br>Aj[px+1] ← XHj if Vj     (j=0...MAX_ENTRY,x=0...3)<br>:STORE TO MEMORY POSITION INDICATED BY px<br>CONTINUOUS 2 BITS ON MEMORY ARE STORED SIMULTANEOUSLY FROM XH/XL REGISTERS<br>NOT EXECUTED WHEN MASK REGISTER (V) IS CLEARED |
| mem2.swp.X@px | Aj[px] ⇔ XLj if Vj & Nj       (j=0...MAX_ENTRY,x=0...3)<br>Aj[px+1] ⇔ XHj if Vj & Nj    (j=0...MAX_ENTRY,x=0...3)<br>:SWAP DATA OF MEMORY CELL POSITION INDICATED BY px WITH DATA OF XH/XL REGISTERS<br>CONTINUOUS 2 BITS ON MEMORY ARE SWAPPED SIMULTANEOUSLY WITH DATA OF XH/XL REGISTERS<br>NOT EXECUTED WHEN MASK REGISTER (V) OR N REGISTER IS 0 |

FIG.8

ALU INSTRUCTION FOR 1-BIT OPERATION
(DATA MOVEMENT BETWEEN ENTRIES)

| INSTRUCTION | OPERATION |
|---|---|
| ecm.mv.n#n | $X_j \leftarrow X_{j+n}$ (0<=n<MAX_ENTRY)<br>: VALUE OF X REGISTER OF ENTRY j+n IS MOVED TO X REGISTER OF ENTRY j |
| ecm.mv.r rn | $X_j \leftarrow X_{j+rn}$ (0<=n<4)<br>: MOVE X REGISTER OF ENTRY j+rn APART BY VALUE STORED IN REGISTER rn TO X REGISTER OF ENTRY j |
| ecm.swp | $X_j \Leftrightarrow X_{j+1}$<br>: SWAP VALUES OF X REGISTERS IN NEIGHBORING ENTRIES |

FIG.9

ALU INSTRUCTION FOR 2-BIT OPERATION
(DATA MOVEMENT BETWEEN ENTRIES)

| INSTRUCTION | OPERATION |
|---|---|
| ecm2.mv.n#n | $XL_j \leftarrow XL_{j+n}$ (0<=n<MAX_ENTRY)<br>$XH_j \leftarrow XH_{j+n}$ (0<=n<MAX_ENTRY)<br>: VALUES OF XH/XL REGISTER OF ENTRY j+n ARE MOVED TO XH/XL REGISTERS OF ENTRY j |
| ecm2.mv.r rn | $XL_j \leftarrow XL_{j+rn}$ (0<=n<4)<br>$XH_j \leftarrow XH_{j+rn}$ (0<=n<4)<br>: VALUES OF XL/XH REGISTER OF ENTRY j+rn ARE MOVED TO XL/XH REGISTERS OF ENTRY j |
| ecm2.swp | $XL_j \Leftrightarrow XL_{j+1}$<br>$XH_j \Leftrightarrow XH_{j+1}$<br>: SWAP VALUES OF XH/XL REGISTERS IN NEIGHBORING ENTRIES |

| OPERATION | M0 | M1 |
|---|---|---|
| NOT | 0 | 0 |
| OR | 0 | 1 |
| XOR | 1 | 0 |
| AND | 1 | 1 | alu.op.mimd INSTRUCTION

| alu.op.not | Aj= ! Aj[px],iq Vj & ! M0j & ! M1j |
|---|---|
| alu.op.or | Aj=Aj[px]\|Xj,iq Vj & ! M0j & M1j |
| alu.op.xor | Aj=Aj[px]$\oplus$Xj,iq Vj & M0j & ! M1j |
| alu.op.and | Aj=Aj[px] & Xj,iq Vj & M0j & M1j |

:j=0~MAX_ENTRY

FIG.14

CODE: mx_mimd
NAME: MIMD OPERATION
PROTOTYPE: void mx_mimd(int ap,int bp,int cp,int n)i
ARGUMENTS: ap:DESTINATION ADDRESS
  bp:SOURCE ADDRESS
  cp:MIMD INSTRUCTION STORAGE ADDRESS
  n:BIT LENGTH
DESCRIPTION:
  COPY MIMD INSTRUCTION AT BIT POSITION (ADDRESS) DESIGNATED BY POINTER cp TO MIMD INSTRUCTION REGISTER, PERFORM LOGIC OPERATION DESIGNATED BY MIMD INSTRUCTION REGISTER ON CONTENTS IN THE REGION AT BIT POSITION (ADDRESS) DESIGNATED BY POINTER ap AND CONTENTS IN THE REGION AT BIT POSITION (ADDRESS) DESIGNATED BY POINTER bp ON 1-BIT BASIS, AND STORE RESULT IN AN REGION n BITS FROM THE BIT POSITION (ADDRESS) DESIGNATED BY ap
  : EXECUTED ONLY WHEN V FLAG IS SET.

FIG.15

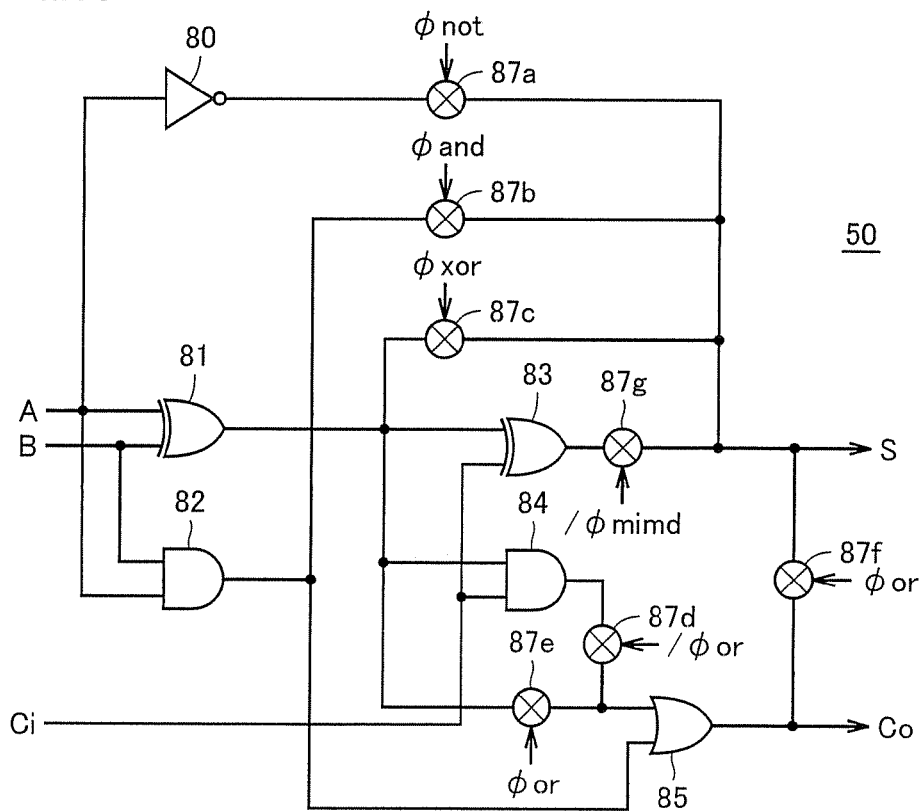

FIG.22

CODE: mx2_cp_zp
    NAME: PROGRAMMABLE ZIGZAG COPY (2-BIT MODE)
PROTOTYPE: void mx2_cp_zp(int ap,int bp,int cp,int n)i
ARGUMENTS: ap:DESTINATION ADDRESS
           bp:SOURCE ADDRESS
           cp:ENTRY MOVEMENT DISTANCE STORING ADDRESS
           n:BIT LENGTH
DESCRIPTION:
    COPY ENTRY MOVEMENT DISTANCE AT AN ADDRESS
    INDICATED BY cp TO RECM REGISTER, COPY CONTENTS
    OF n BITS FROM THE ADDRESS INDICATED BY bp FROM
    THE ADDRESS INDICATED BY ap OF ENTRY DESIGNATED
    BY THE DATA OF RECM REGISTER, ON 2-BIT BASIS

FIG.23

CODE: mx_cp_zp
    NAME: PROGRAMMABLE ZIGZAG COPY (1-BIT MODE)
PROTOTYPE: void mx_cp_zp(int ap,int bp,int cp,int n)i
ARGUMENTS: ap:DESTINATION ADDRESS
           bp:SOURCE ADDRESS
           cp:ENTRY MOVEMENT DISTANCE STORING ADDRESS
           n:BIT LENGTH
DESCRIPTION:
    COPY ENTRY MOVEMENT DISTANCE AT AN ADDRESS
    INDICATED BY cp TO RECM REGISTER, COPY CONTENTS
    OF n BITS FROM THE ADDRESS INDICATED BY bp FROM
    THE ADDRESS INDICATED BY ap OF ENTRY DESIGNATED
    BY THE DATA OF RECM REGISTER, ON 1-BIT BASIS

| COMMUNICATION DISTANCE | DIRECTION | E0 | E1 | E2 | E3 |
|---|---|---|---|---|---|
| 0 | – | 0 | 0 | 0 | 0 |
| 1 | UP(+) | 0 | 0 | 0 | 1 |
| 4 | UP(+) | 0 | 0 | 1 | 0 |
| 16 | UP(+) | 0 | 0 | 1 | 1 |
| 64 | UP(+) | 0 | 1 | 0 | 0 |
| 256 | UP(+) | 0 | 1 | 0 | 1 |
| 256 | DOWN(–) | 1 | 0 | 1 | 0 |
| 64 | DOWN(–) | 1 | 0 | 1 | 1 |
| 16 | DOWN(–) | 1 | 1 | 0 | 0 |
| 4 | DOWN(–) | 1 | 1 | 0 | 1 |
| 1 | DOWN(–) | 1 | 1 | 1 | 0 |

: UP ; ENTRY NUMBER LARGER
DOWN ; ENTRY NUMBER SMALLER

FIG.29

|  | ap | t1 | t2 | t3 | ... | tmp | MIMD INSTRUCTION BIT | | | ALU | M0 | M1 | V | |
|---|---|---|---|---|---|---|---|---|---|---|---|---|---|---|
| DERY0 | 1 | 1 | 0 | 1 | | 1 | | 1 | 1 | ALU | 1 | 1 | 1 | :AND |
| DERY1 | 1 | 1 | 1 | 0 | | | | 0 | 1 | ALU | | | 0 | |
| DERY2 | 0 | 1 | 0 | 1 | | 1 | | 1 | 1 | ALU | 1 | 1 | 1 | :AND |
| DERY3 | 0 | 0 | 0 | 0 | | | | | | ALU | | | 0 | |
| DERY4 | 1 | 0 | 0 | 0 | | | | 1 | 1 | ALU | | | 0 | |
| DERY5 | 0 | 0 | 0 | 0 | | | 0 | 0 | 1 | ALU | 0 | 0 | 1 | :NOT |
| DERY6 | 1 | 0 | 1 | 0 | | | | 0 | 0 | ALU | | | 0 | |
| DERY7 | 1 | 0 | 0 | 1 | | 1 | 0 | 1 | 1 | ALU | 0 | 1 | 1 | :OR |

|  | ap | t1 | t2 | t3 | t4 | ... | tmp | MIMD INSTRUCTION BIT | | | ALU | M0 | M1 | V | |
|---|---|---|---|---|---|---|---|---|---|---|---|---|---|---|---|
| DERY0 | 1 | 0 | 0 | 1 | 0 | | 0 | | 1 | 1 | ALU | | | | |
| DERY1 | 1 | 0 | 1 | 0 | 1 | | 1 | | 0 | 1 | ALU | | | | :OR:G2 |
| DERY2 | 0 | 0 | 0 | 1 | 0 | | 0 | | 1 | 1 | ALU | | | | |
| DERY3 | 0 | 0 | 0 | 0 | 0 | | 0 | | | | ALU | | | | |
| DERY4 | 1 | 0 | 0 | 0 | 0 | | 0 | | 1 | 1 | ALU | | | | :AND:G1 |
| DERY5 | 0 | 1 | 0 | 0 | 1 | | 0 | 0 | 0 | 1 | ALU | | | | :OR:G5 |
| DERY6 | 1 | 0 | 1 | 0 | 1 | | 0 | | 0 | 0 | ALU | | | | :NOT:G3 |
| DERY7 | 1 | 0 | 0 | 1 | 0 | | 1 | 0 | 1 | 1 | ALU | | | | :AND:G4 |

FIG.31

| | ap | t1 | t2 | t3 | t4 | ··· | tmp | MIMD INSTRUCTION BIT | | | ALU | M0 | M1 | V |
|---|---|---|---|---|---|---|---|---|---|---|---|---|---|---|
| DERY0 | 1 | 0 | 0 | 1 | 0 | | 0 | | 1 | 1 | ALU | | | 0 |
| DERY1 | 1 | 0 | 1 | 0 | 1 | | 1 | | 0 | 1 | ALU | 0 | 1 | 1 |
| DERY2 | 0 | 0 | 0 | 1 | 0 | | 0 | | 1 | 1 | ALU | | | 0 |
| DERY3 | 0 | 0 | 0 | 0 | 0 | | 0 | | | | ALU | | | 0 |
| DERY4 | 1 | 0 | 0 | 0 | 0 | | 0 | | 1 | 1 | ALU | 1 | 1 | 1 |
| DERY5 | 0 | 1 | 0 | 0 | 1 | | 0 | 0 | 0 | 1 | ALU | 0 | 1 | 1 |
| DERY6 | 1 | 0 | 1 | 0 | 1 | | 0 | | 0 | 0 | ALU | 0 | 0 | 1 |
| DERY7 | 1 | 0 | 0 | 1 | 0 | | 1 | 0 | 1 | 1 | ALU | 1 | 1 | 1 |

↑ LOAD

FIG.32

| | ap | t1 | t2 | t3 | t4 | ··· | tmp | MIMD INSTRUCTION BIT | | | ALU | M0 | M1 | V | |
|---|---|---|---|---|---|---|---|---|---|---|---|---|---|---|---|
| DERY0 | 1 | 0 | 0 | 1 | 0 | | 0 | | 1 | 1 | ALU | | | 0 | |
| DERY1 | 1 | 0 | 1 | 0 | 1 | | 1 | | 0 | 1 | ALU | 0 | 1 | 1 | :OR |
| DERY2 | 0 | 0 | 0 | 1 | 0 | | 0 | | 1 | 1 | ALU | | | 0 | |
| DERY3 | 0 | 0 | 0 | 0 | 0 | | 0 | | | | ALU | | | 0 | |
| DERY4 | 1 | 0 | 0 | 0 | 0 | | 0 | | 1 | 1 | ALU | 1 | 1 | 1 | :AND |
| DERY5 | 0 | 1 | 0 | 0 | 1 | | 0 | 0 | 0 | 1 | ALU | 0 | 1 | 1 | :OR |
| DERY6 | 1 | 0 | 1 | 0 | 0 | | 0 | | 0 | 0 | ALU | 0 | 0 | 1 | :NOT |
| DERY7 | 1 | 0 | 0 | 1 | 0 | | 1 | 0 | 1 | 1 | ALU | 1 | 1 | 1 | :AND |

↑ OPERATION RESULT

FIG.35

BEFORE CHANGE / AFTER CHANGE / MIMD INSTRUCTION BIT

Columns: ap, t1, t2, t3, tmp, FF0, FF1, MIMD INSTRUCTION BIT, ALU, M0, M1, V

| Row | ap | t1 | t2 | t3 | tmp | FF0 | FF1 | MIMD INSTR BIT | | M0 | M1 | V | Op |
|---|---|---|---|---|---|---|---|---|---|---|---|---|---|
| DERY0 | 1 | 0 | 1 | 0 | 0 | 0 | 0 | 1 0 1 1 1 0 | ALU | 1 | 0 | 1 | :XOR |
| DERY1 | 1 | 1 | 0 | 0 | 1 | 1 | 0 | 1 0 1 1 1 0 | ALU | 1 | 0 | 1 | :XOR |
| DERY2 | 1 | 0 | 1 | 1 | 0 | 0 | 1 | 1 0 1 1 1 0 | ALU | 1 | 0 | 1 | :XOR |
| DERY3 | 1 | 1 | 0 | 1 | 0 | 1 | 1 | 1 0 1 1 1 0 | ALU | 1 | 0 | 1 | :XOR |
| DERY4 | 1 | 1 | 0 | 0 | 0 | 0 | 0 | 1 0 1 1 1 0 | ALU | 1 | 1 | 1 | :AND |
| DERY5 | 1 | 0 | 1 | 0 | 0 | 1 | 0 | 1 0 1 1 1 0 | ALU | 1 | 1 | 1 | :AND |
| DERY6 | 1 | 1 | 0 | 1 | 0 | 0 | 1 | 1 0 1 1 1 0 | ALU | 1 | 1 | 1 | :AND |
| DERY7 | 1 | 0 | 1 | 1 | 0 | 1 | 1 | 1 0 1 1 1 0 | ALU | 1 | 1 | 1 | :AND |

BEFORE CHANGE

FIG.36

COMPARISON OF SIMULTANEOUS MOVEMENT OF 16-BIT DATA

| DISTANCE | vcopy (CYCLES) | RECM (CYCLES) |
|---|---|---|
| 1 | 26 | 29 |
| 2 | 34 | 37 |
| 4 | 26 | 29 |
| 8 | 34 | 37 |
| 16 | 26 | 29 |
| 32 | 34 | 37 |
| 64 | 26 | 29 |
| 128 | 34 | 37 |
| 256 | 26 | 29 |
| 512 | 34 | 37 |
| 1,024 | 50 | 53 |

COMPARISON OF GATHER PROCESS OF 16-BIT DATA

| ENTRY NUMBER | vcopy (CYCLES) | V FLAG (BITS) | RECM (CYCLES) | CONTROL BITS |
|---|---|---|---|---|
| 64 | 332 | 3 | 183 | 20 |
| 128 | 428 | 4 | 271 | 28 |
| 256 | 516 | 5 | 359 | 36 |
| 512 | 612 | 6 | 447 | 44 |
| 1,024 | 700 | 7 | 535 | 52 |
| 2,048 | 796 | 8 | 675 | 60 |

COMPARISON OF DE-INTERLEAVE PROCESS OF 16-BIT DATA

| ENTRY NUMBER | vcopy (CYCLES) | V FLAG (BITS) | TEMPORARY (BITS) | RECM (CYCLES) | CONTROL BITS |
|---|---|---|---|---|---|
| 4 | 172 | 2 | 32 | 33 | 4 |
| 8 | 234 | 3 | 32 | 126 | 12 |
| 16 | 296 | 4 | 32 | 157 | 16 |
| 32 | 358 | 5 | 32 | 250 | 24 |
| 64 | 420 | 6 | 32 | 281 | 28 |
| 128 | 482 | 7 | 32 | 374 | 36 |
| 256 | 544 | 8 | 32 | 405 | 40 |
| 512 | 606 | 9 | 32 | 498 | 48 |
| 1,024 | 668 | 10 | 32 | 529 | 52 |
| 2,048 | 754 | 11 | 32 | 622 | 60 |

COMPARISON OF 32-BIT DATA MOVEMENT

| vcopy (CYCLES) | V FLAG (BITS) | TEMPORARY (BITS) | RECM (CYCLES) | CONTROL BITS |
|---|---|---|---|---|
| 613 | 8 | 64 | 442 | 16 |

74
(COMBINATION CIRCUIT)

74

PARALLEL OPERATION DEVICE ALLOWING EFFICIENT PARALLEL OPERATIONAL PROCESSING

BACKGROUND OF THE INVENTION

1. Field of the Invention

The present invention relates to a semiconductor processing device and, more specifically, to a configuration of a processing circuit performing arithmetic/logic operations on a large amount of data at high speed using semiconductor memories.

2. Description of the Background Art

Recently, along with wide spread use of portable terminal equipment, digital signal processing allowing high speed processing of a large amount of data such as voice data and image data comes to have higher importance. For such digital signal processing, generally, a DSP (Digital Signal Processor) is used as a dedicated semiconductor device. Digital signal processing of voice and image includes data processing such as filtering, which in turn frequently requires arithmetic operations with repetitive sum-of-products operations. Therefore, a DSP is generally configured to have a multiplication circuit, an adder circuit and a register for accumulation When such a dedicated DSP is used, the sum-of-products operation can be executed in one machine cycle, enabling a high-speed arithmetic/logic operation.

When the amount of data to be processed is very large, however, even a dedicated DSP is insufficient to attain dramatic improvement in performance. By way of example, when the data to be operated assume 10,000 sets and an operation of each data set can be executed in one machine cycle, at least 10,000 cycles are necessary to finish the operation. Therefore, though each process can be done at high speed in an arrangement in which the sum-of-products operation is done using a register file, when the amount of data increases, the time of processing increases in proportion thereto as the data are processed in series, and therefore, such an arrangement cannot achieve high speed processing.

When such a dedicated DSP is used, the processing performance much depends on operating frequency, and therefore, if high speed processing is given priority, power consumption would considerably be increased.

In view of the foregoing, the applicant of the present invention has already proposed a configuration allowing arithmetic/logic operations on a large amount of data at high speed (Reference 1 (Japanese Patent Laying-Open No. 2006-127460)).

In the configuration described in Reference 1, a memory cell mat is divided into a plurality of entries, and an arithmetic logic unit (ALU) is arranged corresponding to each entry. Between the entries and the corresponding arithmetic logic units (ALUs), data are transferred in bit-serial manner, and operations are executed in parallel among a plurality of entries. For a binary operation, for example, data of two terms are read, operated and the result of operation is stored. Such operation on data is executed on bit-by-bit basis. Assuming that reading (load), operation and writing (store) of the operation result each require one machine cycle and the data word of the operation target has the bit width N, operation of each entry requires 4×N machine cycles. The data word of the operation target generally has the bit width of 8 to 64 bits. Therefore, when the number of entries is set relatively large to 1024 and data of 8-bit width are to be processed in parallel, 1024 results of arithmetic operations can be obtained after 32 machine cycles. Thus, necessary time of processing can be significantly be reduced as compared with sequential processing of 1024 sets of data.

Further, in the configuration disclosed in Reference 1, data transfer circuits are provided corresponding to the entries, Inter-ALU connecting switch circuit (data transfer circuit: ECM (entry communicator)) is provided for data transfer between processors (ALUs), whereby data are transferred through dedicated buses among the entries. Therefore, as compared with a configuration in which data are transferred between entries through a system bus, arithmetic/logic operations can be executed with high-speed data transfer. Further, use of the inter-ALU connecting switch circuit achieves operations on data stored in various regions in the memory cell mat, whereby degree of freedom in operation can be increased, and a semiconductor processing device performing various operations can be realized.

In the configuration described in Reference 1, it is possible to execute one same arithmetic/logic operation in parallel in processors among all entries of the memory mat. Specifically, the parallel processing device (MTX) described in Reference 1 is a processing device based on an SIMD (Single Instruction Stream Multiple Data Stream) architecture. Further, it uses the inter-ALU connecting switch circuit, so that communications between physically apart entries can be executed simultaneously in each entry, and processes over entries can also be executed.

In the configuration described in Reference 1, it is possible to execute a pointer register instruction for operating contents of a pointer register representing an access location in the memory cell mat, a 1-bit load/store instruction, a 2-bit load/store instruction, a 1-bit inter-entry data moving instruction, a 2-bit inter-entry data moving instruction for transferring data between a data storage portion of an entry and a corresponding operational processing element (ALU), a 1-bit arithmetic/logic operation instruction, and a 2-bit arithmetic/logic operation instruction. Further, by setting to "0" the value of a mask register (V register) provided in the processing element, the operation of the corresponding entry can be masked and the operation can be set to an non-execution state.

The processing device of Reference 1 is on SIMD basis, and all entries execute one same arithmetic/logic operation in parallel. Therefore, when one same arithmetic/logic operation is to be executed on a plurality of data sets, high-speed operation becomes possible and, therefore, filtering of image data, for example, can be executed at high speed.

Arithmetic/logic operations with low degree of parallelism, however, must be executed one by one successively while operations other than the target operation are masked, or it must be processed by a host CPU. Such successive processing of arithmetic/logic operations with low degree of parallelism hinders increase in processing speed, and hence, the performance of the parallel processing device cannot be fully exhibited.

Further, in communication between entries, in a configuration of SIMD type architecture, all entries communicate in parallel with entries apart by the same distance (in accordance with the data moving instruction between entries). For each entry to communicate with an entry apart by an arbitrary distance, however, it is necessary to adjust distance of data movement by combining the moving instruction between entries (data moving instruction) and the mask bit of the V register in the processing element. Therefore, parallel processing of data movement between entries at different distances is impossible.

If the arithmetic/logic operation and/or data moving process of low degree of parallelism could be performed efficiently, the processor would have wider applications.

SUMMARY OF THE INVENTION

An object of the present invention is to provide a parallel processing device capable of efficiently performing processes such as arithmetic/logic operation and/or data moving process of low degree of parallelism.

According to a first aspect, the present invention provides a parallel processing device, including: a data storage unit having a plurality of data entries each having a bit width of a plurality of bits and arranged corresponding to each entry; and a plurality of arithmetic/logic processing elements arranged corresponding to the data entries of the data storage unit, of which content of an operational processing (arithmetic or logic operation) is set individually, for executing the set operation on applied data.

According to a second aspect, the present invention provides a parallel processing device, including, a data storage unit having a plurality of data entries each having a bit width of a plurality of bits and arranged corresponding to each entry, a plurality of arithmetic/logic processing elements arranged corresponding to the entries and each executing a set operational processing (arithmetic or logic operation) on applied data; and a plurality of data communication circuits provided corresponding to the plurality of entries and each performing data communication between the corresponding entry and another entry. The plurality of data communication circuits each have inter-entry (entry-to-entry) distance and direction of data movement set individually.

According to a third aspect, the present invention provides a parallel processing device, including a data storage unit having a plurality of data entries each having a bit width of a plurality of bits and arranged corresponding to each entry, a plurality of arithmetic/logic processing elements arranged corresponding to the entries, having contents of an operational processing (arithmetic or logic operation) set individually, for executing the set operational processing such as arithmetic/logic operation on applied data, and a plurality of data communication circuits provided corresponding to the plurality of entries and each performing data communication between the corresponding entry and another entry. The plurality of data communication circuits each have entry-to-entry distance and direction of data movement set individually.

Further, contents of (arithmetic/logic) operation of the arithmetic/logic processing element of each entry and the amount and direction of data movement of the data communication circuit are set in registers for storing data to be processed and mask data for masking an operation, provided in the arithmetic/logic element.

The parallel processing device, in accordance with the first aspect of the present invention, is configured to set contents of operation in each arithmetic/logic processing element individually, and therefore, operations of low degree of parallelism can be executed concurrently in different entries, whereby performance can be improved. Particularly, data processing can be executed in a closed manner in the processing device, without the necessity of transferring data to the host CPU. Accordingly, the time required for data transfer can be reduced.

In the parallel processing device in accordance with the second aspect of the present invention, the amount of data movement is set in each entry and data can be moved between entries at a high speed. Accordingly, the time required for data transfer can be reduced.

In the parallel processing device in accordance with the third aspect of the present invention, contents of operation and data for setting the amount of data movement are stored in each operational processing register of the arithmetic or logic operation. Therefore, a dedicated register is unnecessary, and increase in layout area can be avoided. Further, the amount of data movement and contents of operation are set for each entry, so that high speed processing can be realized.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows, in a list, instructions for operating a pointer register of the main processing circuitry shown in FIG. 2.

FIGS. 6 and 7 show, in a list, ALU instructions of the main processing circuitry shown in FIG. 2.

FIGS. 8 and 9 show, in a list, entry-to-entry data moving instructions of the main processing circuitry shown in FIG. 2.

FIG. 14 shows a structure of MIMD operation instruction.

FIG. 15 schematically shows an exemplary internal configuration of an adder shown in FIG. 10.

FIG. 22 represents a 2-bit mode zigzag copy instruction.

FIG. 23 represents a 1-bit mode zigzag copy instruction.

FIG. 29 shows data arrangement of data entries at Stage 4 shown in FIG. 28.

FIG. 30 shows movement of bits as the operation target, at Stage 4 shown in FIG. 28.

FIG. 31 shows the flow of instruction bits when an operation instruction is determined, at Stage 4 shown in FIG. 28.

FIG. 32 shows bit arrangement as a result of arithmetic/logic operation at Stage 4 shown in FIG. 28.

FIG. 35 shows a flow of data bits in one cycle of the 2-bit counter shown in FIG. 34.

FIG. 36 shows, in a list, number of cycles required for simultaneous moving operation of 16-bit data.

BEST MODES FOR CARRYING OUT THE INVENTION

Embodiment 1

Figure 1:
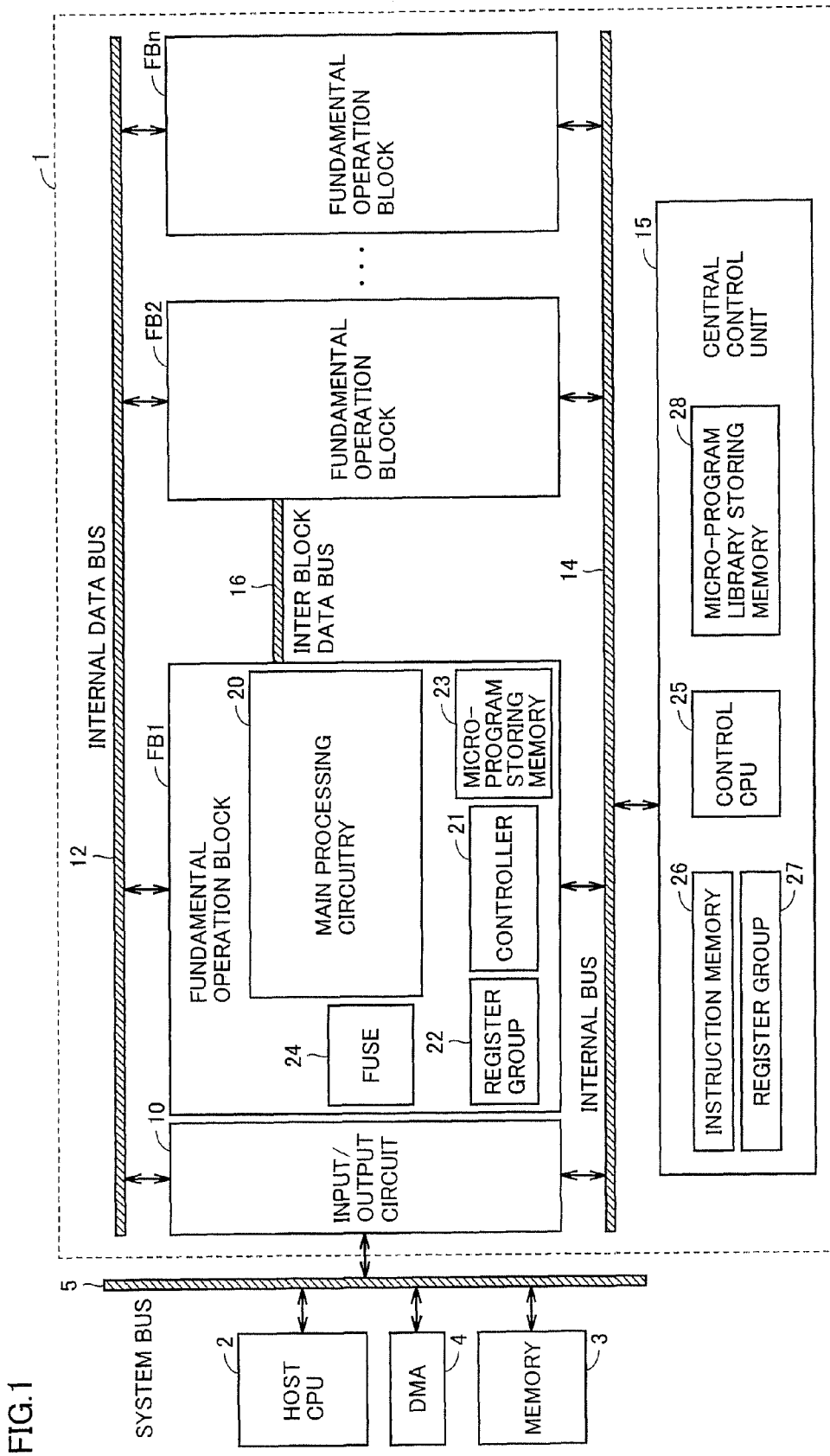
FIG. 1 schematically shows an overall configuration of a processing system utilizing the processing device to which the present invention is applied.

FIG. 1 schematically shows an overall configuration of a processing system utilizing a semiconductor processing device in accordance with Embodiment 1 of the present invention. Referring to FIG. 1, the processing system includes a semiconductor processing device 1 executing parallel operations; a host CPU 2 performing process control on semiconductor processing device 1, control of the whole system and data processing, a memory 3 used as a main storage of the system and storing various necessary data, and a DMA (Direct Memory Address) circuit 4 directly accessing to memory 3 without handling through host CPU 2. By the control of DMA circuit 4, data can be transferred directly between memory 3 and semiconductor processing device 1, and semiconductor processing device can be accessed directly.

Host CPU 2, memory 3, DMA circuit 4 and semiconductor processing device 1 are connected with each other through a system bus 5. Semiconductor processing device 1 includes a plurality of fundamental operation blocks (parallel processing devices) FB1 to FBn provided in parallel, an input/output circuit 10 transferring data/instruction with system bus 5, and a central control unit 15 controlling operational processing such as arithmetic and logic operations and data transfer in semiconductor processing device 1.

Fundamental operation blocks FB1 to FBn and input/output circuit 10 are coupled to an internal data bus 12. Central control unit 15, input/output circuit 10 and fundamental operation blocks FB1 to FBn are coupled to an internal bus 14. Between each of the fundamental operation blocks FB (generally representing blocks FB1 to FBn), an inter-block data bus 16 is provided. In FIG. 1, an inter-block data bus 16 arranged between neighboring fundamental operation blocks FB1 and FB2 is shown as a representative.

By providing fundamental operation blocks FB1 to FBn in parallel, same or different arithmetic or logic operations are executed in semiconductor processing device 1. These fundamental operation blocks FB1 to FBn are of the same configuration, and therefore, the configuration of fundamental operation block FB1 is shown as a representative example in FIG. 1.

Fundamental operation block FB1 includes main processing circuitry 20 including a memory cell array (mat) and a processor, a micro-program storing memory 23 storing an execution program described in a micro code; a controller 21 controlling an internal operation of fundamental operation block FB1; a register group 22 including a register used as an address pointer, and a fuse circuit 24 for executing a fuse program for repairing any defect of main processing circuitry 20.

Controller 21 controls operations of corresponding fundamental operation blocks FB1 to FBn, as control is passed by a control instruction supplied from host CPU 2 through system bus 5 and input/output circuit 10. These fundamental operation blocks FB1 to FBn each contains micro program storing memory 23, and controller 21 stores an execution program in memory 23. Consequently, the contents of processing to be executed in each of fundamental operation blocks FB1 to FBn can be changed, and the contents of operations to be executed in each of fundamental operation blocks FB1 to FBn can be changed.

An inter-block data bus 16 allows high speed data transfer between fundamental operation blocks, by executing data transfer without using internal data bus 12. By way of example, while data is being transferred to a certain fundamental operation block through internal data bus 12, data can be transferred between different fundamental operation blocks.

Central control unit 15 includes: a control CPU 25; an instruction memory 26 storing an instruction to be executed by the control CPU; a group of registers 27 including a working register for control CPU 25 or a register for storing a pointer, and a micro program library storing memory 28 storing libraries of micro programs. Central control unit 15 has control passed from host CPU 2 through internal bus 14, and controls processing operations, including arithmetic and logic operations and transfer, of fundamental operation blocks FB1 to FBn through internal bus 14.

Micro programs having various sequential processes described in a code form are stored as libraries in micro program library storing memory 28. Central control unit 15 selects a necessary micro program from memory 28 and stores the program in micro program storing memory 23 of fundamental operation blocks FB1 to FBn. Thus, it becomes possible to address any change in the contents of processing by the fundamental operation blocks FB1 to FBn in a flexible manner.

By the use of fuse circuit 24, any defect in fundamental operation blocks FB1 to FBn can be repaired through redundancy replacement.

Figure 2:
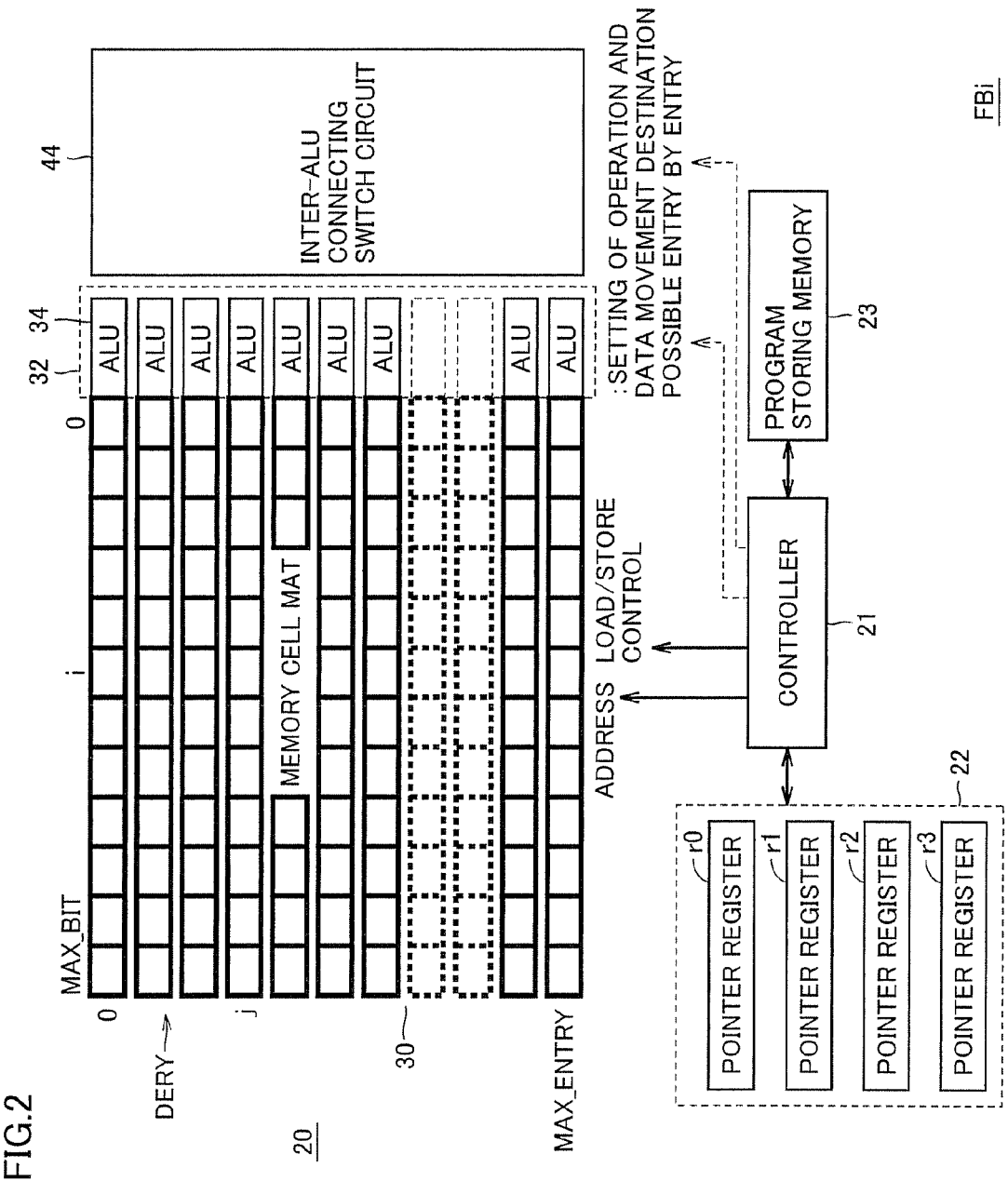
FIG. 2 schematically shows a configuration of main processing circuitry shown in FIG. 1.

FIG. 2 schematically shows a configuration of a main portion of fundamental operation block FBi (FB1 to FBn) shown in FIG. 1. Referring to FIG. 2, in fundamental operation block FBi, main processing circuitry 20 includes a memory cell mat 30 in which memory cells are arranged in rows and columns, and a group of operational processing units (a group of ALU (arithmetic and logic processing elements) 32 performing an operational processing such as arithmetic or logic operations on data stored in memory cell mat 30. Memory cell mat 30 is divided into a plurality of data entries DERY. Data entry DERY includes data entries having numbers 0 to MAX_ENTRY allotted thereto. Each data entry has bit positions from 0 to MAX_BIT, and its bit width is MAX_BIT+1.

In the group of operational processing units (ALU group) 32, an operational processing unit (hereinafter referred also to as an arithmetic logic unit or ALU processing element) 34 is arranged corresponding to each data entry DERY. For the group of operational processing (arithmetic logic) units 32, switch circuit 44 for interconnecting ALUs is provided.

In the following, an entry (ERY) is defined as encompassing the data entry DERY and the ALU processing element provided corresponding to the data entry.

The operation of main processing circuitry 20 is set by a program (micro program) stored in program storing memory 23. Controller 21 executes processing in accordance with the program stored in program storing memory 23.

In register group 22, pointer registers r0 to r3 are provided. Addresses of memory cell mat 30 of the data to be processed are stored in pointer registers r0 to r3. Controller 21 generates an address designating an entry (data entry) or a location in a data entry of main processing circuitry 20 in accordance with the pointers stored in pointer registers r0 to r3, to control data transfer (load/store) between memory cell mat 30 and the group of arithmetic logic units 32.

In the group of arithmetic logic units 32, contents of operation of ALU processing element are determined dependent on the operation mode, that is, determined commonly to all entries for an SIMD type operation and determined for each entry for an MIMD type operation. Further, inter-ALU connecting switch circuit 44 also includes an inter-ALU data transfer circuit arranged corresponding to each entry. At the time of entry-to-entry data transfer, the transfer destination can be set dependent on the operation mode, that is, commonly to all entries in the SIMD type operation and individually for each entry in the MIMD type operation.

When an SIMD type operation is executed and the same operation is to be executed among the entries, the contents of operation in the group of arithmetic logic units (ALUs) 32 and the connection path of inter-ALU connecting switch circuit 44 are commonly set by the control of controller 21. As to the connection path, controller 21 selectively controls setting of the path or route in accordance with an instruction stored in program storing memory 23, as indicated by dotted lines in FIG. 2 (in an MIMD type operation, the contents of operation and the transfer destination are set in each entry, in accordance with the stored data of the data entry, in an SIMD type operation, the contents of operation and the transfer destination are set by controller 21 commonly to the entries).

Figure 3:
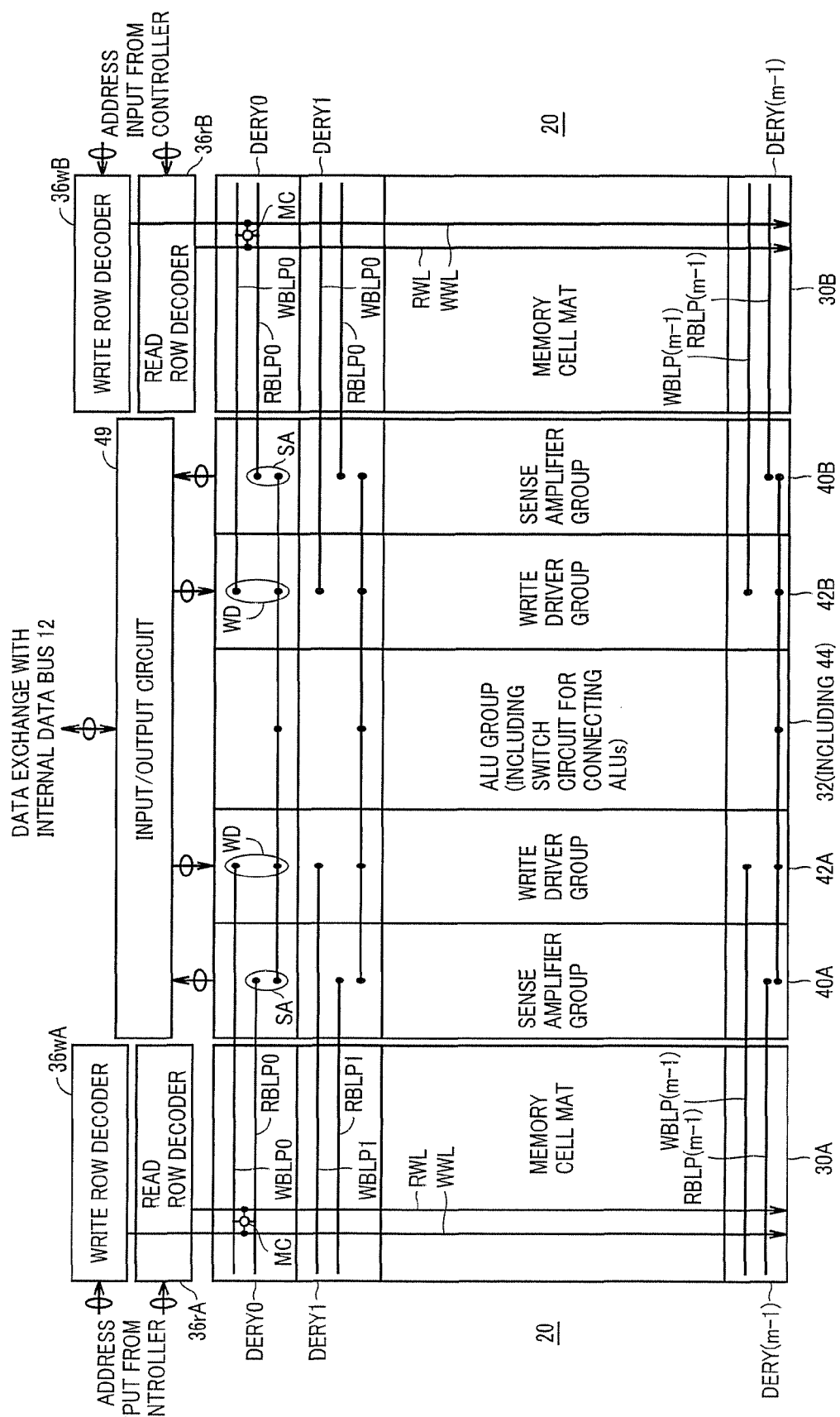
FIG. 3 shows a specific configuration of the memory cell mat shown in FIG. 2.

FIG. 3 more specifically shows the configuration of main processing circuitry 20 shown in FIG. 2. Referring to FIG. 3, memory cell mat 30 is divided into two memory mats 30A and 30B. In memory mats 30A and 30B, memory cells MC are arranged in rows and columns. In FIG. 3, the memory cell MC has a configuration of a dual-port memory cell in which a write port and a read port are provided separately. The memory cell MC, however, may be a single port memory cell. Memory cell MC is an SRAM (Static Random Access Memory) cell.

In each of memory mats 30A and 30B, corresponding to memory cells MC arranged aligned in the row direction, a write word line WWL and a read word line RWL are provided. Corresponding to memory cells MC arranged aligned in the column direction, a write bit line pair WBLP and a read bit line pair RBLP are provided.

Each of the memory mats 30A and 30B has m data entries, that is, data entries DERY0 to DERY(m−1). Corresponding to a set of each write bit line pair WBLP and read bit line pair RBLP, a data entry is provided.

By write word line WWL and read word line RWL, memory cells at the same bit position of data entries DERY0 to DERY(m−1) are selected in parallel.

Between memory mats 30A and 30B, the group of arithmetic logic units 32 is provided. Though not explicitly shown in FIG. 3, for the group of arithmetic logic units 32, inter-ALU connecting switch circuit (44) is provided.

Between the group of arithmetic logic units 32 and memory mat 30A, a sense amplifier group 40A and a write driver group 42A are arranged, and between the group of arithmetic logic units 32 and memory mat 30B, a sense amplifier group 40B and a write driver group 42B are arranged.

Sense amplifier group 40A includes sense amplifiers SA arranged corresponding to read bit line pairs RBLP (RBLP0-RBLP(m−1)) of memory mat 30A, respectively. Write driver group 42A includes write drivers WB arranged corresponding to write bit line pairs WBLP (WBLP0-WBLP(m−1)) of memory mat 30A, respectively.

Similarly, sense amplifier group 40B includes sense amplifiers SA arranged corresponding to read bit line pairs RBLP (RBLP0-RBLP(m−1)) of memory mat 30B, respectively.

Write driver group 42B includes write drivers WB arranged corresponding to write bit line pairs WWBLP (WBLP0-WBLP(m−1)) of memory mat 30B, respectively. When single port memory cells are used, the write bit line pair WBLP and the read bit line pair RBLP are formed into a common bit line pair BLP, and to the bit line pair BLP, the sense amplifier and the corresponding write driver are commonly coupled to each other.

For memory mat 30A, a read row decoder 36rA for selecting a read word line RWL, and a write row decoder 36wA for selecting a write word line WWL are provided. For memory mat 30B, a read row decoder 36rB for selecting a read word line RWL, and a write row decoder 36wB for selecting a write word line WWL are provided.

An input/output circuit 49 is provided for sense amplifier group 40A and write driver group 42A, as well as write driver group 42B and sense amplifier group 40B, for data transfer with the internal data bus (bus 12 of FIG. 1).

Input/output circuit 49 receives and transfers in parallel the data transferred to memory mats 30A and 30B. The data stored in memory mats 30A and 30B may have bit positions re-arranged for each memory mat, or, alternatively, each of memory mats 30A and 30B may be provided with a register circuit for converting data arrangement, and data writing and reading may be performed word line by word line between the register circuit and the memory mat.

If the bit width of transfer data of input/output circuit 49 is smaller than the number of entries (data entries), an entry selecting circuit (column selecting circuit) for selecting a data entry is provided corresponding to the group of sense amplifiers and the group of write drivers, though not explicitly shown in FIG. 3. A configuration in which an appropriate number of data entries are selected in parallel in accordance with the bit width of the transfer data of input/output circuit 49 can be used for such entry selection. Alternatively, input/output circuit 49 may have a bit width converting function, and data transfer may be performed in parallel between input/output circuit 49 and data entries DEERY0-DERY(m−1) and data transfer may be performed by the unit of bit width of internal data bus, between input/output circuit 49 and the internal data bus (bus 12 of FIG. 1).

In the configuration shown in FIG. 3, read row decoders 36rA and 36rB have the same configuration, and in accordance with the same address, drive the read word lines of the same bit position to the selected state. When the result of arithmetic and/or logic operation is to be stored in memory mat 30A, write row decoder 36wA is activated, and the corresponding write word line is driven to the selected state. In this case, write row decoder 36wB provided for memory mat 30B is maintained in an inactive state.

In the configuration of main processing circuitry shown in FIG. 3, two memory mats, that is, memory mats 30A and 30B are prepared, and between the memory mats 30A and 30B, a group of ALUs 32 is arranged. Therefore, by storing data sets as the operation target in each of memory mats 30A and 30B, it becomes possible to write data and read data in each machine cycle, whereby high speed arithmetic/logic operation (operational processing) is achieved.

When a single port memory is used, the write row decoder and the read row decoder are implemented by a common row decoder. In such a configuration, data load and store are executed in different machine cycles.

When an SIMD type operation is executed in main processing circuitry 20 shown in FIG. 3, one same arithmetic/logic operation is executed in every entry. The SIMD operation is executed in the following manner.

(i) Data bits DA[i] and DB[i] of the same bit position of data DA and DB as the operation target are read from memory mats 30A and 30B, and transferred to ALU processing element of the corresponding entry (loaded).

(ii) In each ALU processing element, a designated arithmetic/logic operation (operational processing) is executed on these data bits DA[i] and DB[i].

(iii) An operation result data bit C[i] is written (stored) at a bit position of a designated entry. In parallel with the writing operation, the data DA[i+1] and DB[i+1] of the next bit position are loaded to the ALU processing element.

(iv) The processes (i) to (iii) described above are repeated until all bits of the data of the operation target are operated and processed.

An execution sequence of an MIMD type operation will be described in detail later. An operation of 2-bit basis may also be executed (both in the SIX type operation and MIMD type operation) and, in that case, two data entries DERY constitute one entry ERY.

Figure 4:
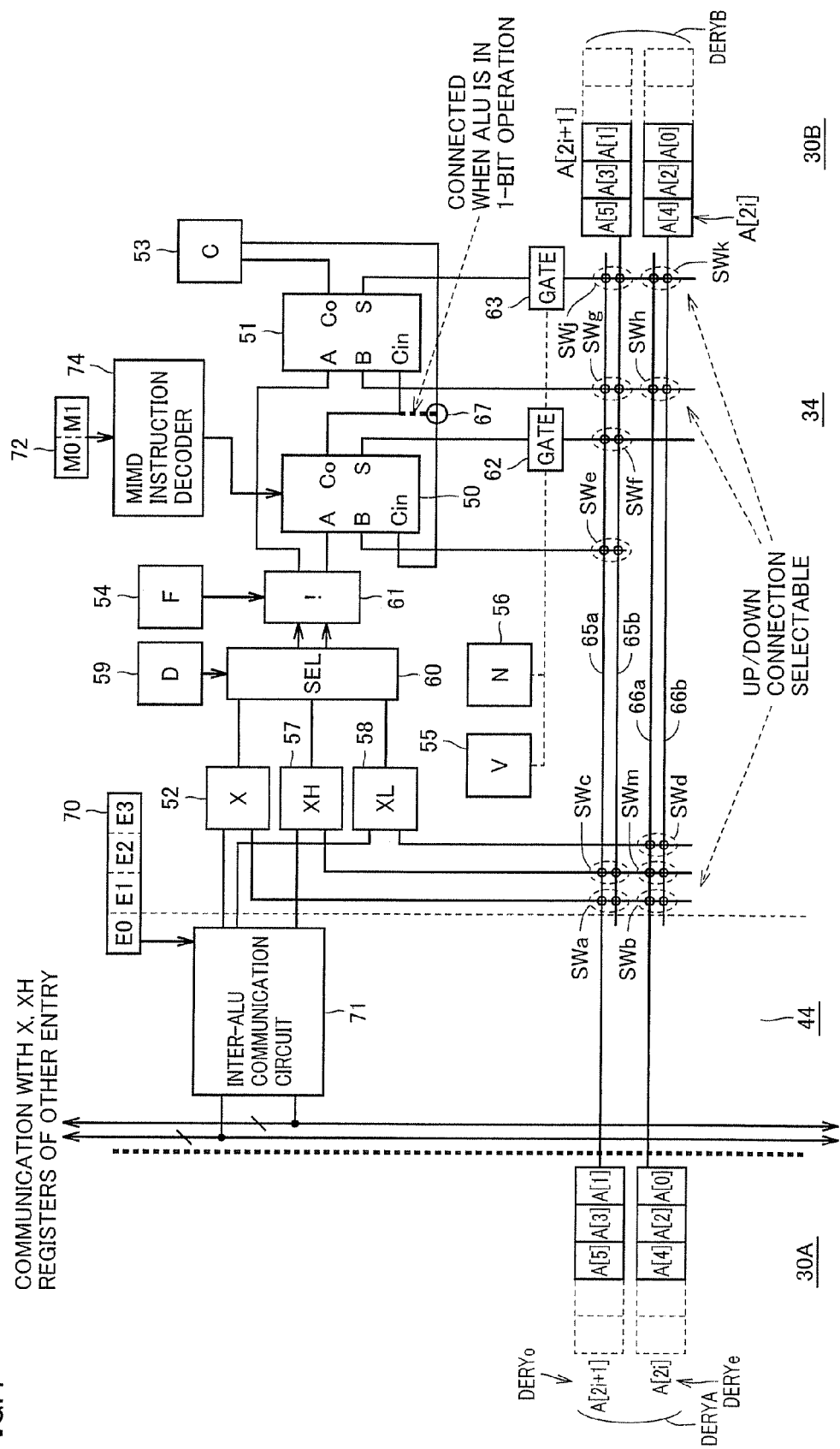
FIG. 4 schematically shows a configuration of an ALU processing element included in the ALU group shown in FIG. 3.

FIG. 4 schematically shows a configuration of an ALU processing element 34 of a unit element included in the group of ALUs 32. In ALU processing element 34, bit by bit and 2-bits by 2-bits arithmetic/logic operations (operational processing) are possible. In memory mats 30A and 30B, data entries DERYA and DERYB each consist of even-numbered data entry DERYe storing data bits A[2i] of an even-numbered address and an odd-numbered data entry DERYo storing data bits A[2i+1] of an odd-numbered address, Arithmetic/logic operation (operational processing) is performed in parallel on data bits of the same address (bit location) in even-numbered data entry DERYe and odd-numbered data entry DERYo, and the process is executed at high speed.

The even-numbered data entry DERYe and odd-numbered data entry DERYo of data entry DERYA are respectively coupled to internal data lines 65a and 66a. The even-numbered data entry DERYe and odd-numbered data entry DERYo of data entry DERYB are coupled to internal data lines 65b and 66b, respectively.

ALU processing element 34 includes, as processing circuits for performing arithmetic/logic operations, cascaded full adders 50 and 51. In order to set process data and contents of operation in ALU processing element 34, an X register 52, a C register 53, an F register 54, a V register 55 and an N register 56 are provided. X register 52 is used for storing operation data and for transferring data to another ALU processing element C register 53 stores a carry in an addition operation. F register 54 selectively inverts an operation bit in accordance with a value stored therein, to realize a subtraction.

V register 55 stores a mask bit V for masking an arithmetic/logic operation (including data transfer) in ALU processing element 34. Specifically, when the mask bit V is set to "1", ALU processing element 34 executes the designated arithmetic/logic operation (operational processing), and when the mask bit V is set to "0", the arithmetic/logic operation is inhibited. Thus, the arithmetic/logic operation is selectively executed in the unit of ALU processing element.

ALU processing element 34 further includes an XH register 57 and an XL register 58 for storing 2-bit data in parallel, a selector (SEL) 60 selecting 2 bits of one of the data sets from registers 52, 57 and 58 in accordance with a value stored in D register 59, a selection inversion circuit 61 performing an inversion/non-inversion operation on 2 bits selected by selector 60 in accordance with a bit stored in F register 54, and gates 62 and 63 selectively outputting a sum output S of full adders 50 and 51 in accordance with data stored in registers 55 and 56.

The outputted 2 bits of selection inversion circuit 61 are applied to A inputs of full adders 50 and 51, respectively X register 52 is connected either to internal data line 65a or 65b by a switch circuit SWa, and connected either to internal data line 66a or 66b by a switch circuit SWb. By the switch circuits SWa and SWb, in a 1-bit operation, data of one of memory mats 30A and 30B is stored in the X register, and in data transfer, the transfer data is stored in the X register.

XH register 57 is connectable to one of internal data lines 65a and 65b through a switch circuit SWc, and connectable to one of internal data lines 66a and 66b through a switch SWm. XL register 58 is connectable either to internal data line 66a or 66b through a switch circuit SWd.

The B input of full adder 50 is connected either to internal data line 65a or 65b by a switch circuit SWe. Gate 62 is connected either to internal data line 65a or 65b by a switch circuit SWf. The B input of full adder 51 is connectable to any of internal data lines 65a, 65b, 66a and 66b by switch circuits SWg and SWh.

Gate 63 is connectable either to internal data line 65a or 65b by a switch circuit SWj, and connectable either to internal data line 66a or 66b by a switch circuit SWk.

By these switch circuits SWa-SWh, SWj, SWk and SWm, serial processing of 1-bit unit in performing 2-bit parallel division is realized, and data transfer of 2-bit unit and data transfer of 1-bit unit are realized in data transfer.

When ALU processing element 34 performs a 1-bit operation, that is, when it performs an operation in 1-bit serial manner, a carry input Cin of full adder 51 is coupled by a switch 67 to C register 53. Gates 62 and 63 execute a designated arithmetic/logic operation when values stored in V register 55 and N register 56 are both "1", and otherwise, gates 62 and 63 are both set to an output high impedance state.

The value stored in C register 53 is connected to carry input Cin of full adder 50 through switch circuit 67. When an arithmetic/logic operation of 1-bit unit, or bit by bit basis operation, is executed, switch circuit 67 isolates the carry output Co of full adder 50, and connects the carry input Cin of full adder 51 to C register 53 (at this time, an addition is executed in full adder 51).

In ALU processing element 34 shown in FIG. 4, using X register 52 and XH register 57, or XH register 57 and XL register 58, data can be transferred 2-bits by 2-bits between another entry and the corresponding entry.

For controlling such data transfer, in inter-ALU connecting switch circuit 44, in correspondence to an entry, a movement data register (reconfigurable entry communication register: RECM register) 70, and an inter-ALU communication circuit (reconfigurable entry communicator: RECM) 71 for setting a data transfer path in accordance with data bits E0-E3 stored in the movement data register 70 are provided.

In ALU processing element 34, in order to set contents of operation individually entry by entry, an MIMD instruction register 72 and an MIMD instruction decoder 74 decoding bit values M0 and M1 stored in the MIMD instruction register to set contents of operation of full adder 50 and to generate a control signal for realizing a combination logic, are provided. By bits M0 and M1 of MIMD instruction register 72, it becomes possible to realize different arithmetic/logic operation in each entry, whereby an MIMD (Multiple Instruction stream-Multiple Data stream) type operation is realized. Prior to description of the MIMD operation and data transfer of ALU processing element 34, a group of instructions prepared at the time of SIMD operation will be described.

As pointer registers designating addresses of the memory mat, pointer registers p0 to p3 are used. Further, as shown in FIG. 2, pointer registers r0 to r3 in general register are also utilized. Pointer registers p0 to p3 are included in the group of registers shown in FIG. 2.

FIG. 5 shows, in the form of a list, pointer register instructions related to operations on pointer registers p0 to p3.

The instruction "ptr. set n, px" is for setting an arbitrary value n in a pointer register px. The arbitrary value n may assume any value within the range of the bit width (0 to MAX_BIT) of one data entry. The value x is any of 0 to 3, The instruction "ptr. cpy px, py" is a copy instruction for transferring and storing the content of pointer register px to pointer register py.

The instruction "ptr. inc px" is for incrementing by one the pointer of pointer register px.

The instruction "ptr. inc2 px" is for incrementing by two the pointer of pointer register px.

The instruction "ptr, dec px" is for decrementing by one the pointer of pointer register px.

The instruction "ptr. dec2 px" is for decrementing by two the pointer of pointer register px.

The instruction "ptr. sft px" is for left-shifting by one bit the pointer of pointer register px.

By utilizing instructions "ptr, inc2 px" and "ptr. dec2 px", 2-bit parallel processing becomes possible (odd-numbered and even-numbered addresses are simultaneously updated). In the 2-bit operation, though the pointer is incremented/decremented 2-bits by 2-bits, the position of selected word line in the memory mat changes 1 row address at a time.

FIG. 6 shows, in the form of a list, load/store instructions of 1-bit operation of the ALU processing element.

Referring to FIG. 6, the instruction "mem, ld. #R@px" is for storing (loading) the data bit at a position Aj[px] designated by the pointer register px to register #R. Register #R is any of the X register, N register, V register, F register, D register, XL register, XH register and C register At the time of 1-bit ALU operation, the X register is used, and the XL register and XH register are not used.

The instruction "mem. st. #R@px" is for writing (storing) the value stored in register #R to the memory cell position Aj[px] designated by the pointer register px.

The store instruction is not executed when the mask register (V register 55) is cleared.

In the store instruction also, the register #R is any of the X register, N register, V register, F register, D register, XL register, XH register and C register.

The instruction "mem. swp. X@px" is for swapping the value stored in the X register 52 and the data at the memory cell position Aj[px] designated by the pointer register px. The swap instruction is executed when "1" is set both in the mask register (V register 55) and N register 56. As the X register 52 is cleared/set by the data stored in the memory cell, circuit configuration can be simplified.

FIG. 7 shows, in the form of a list, load/store instructions for the ALU unit in 2-bit operation.

Referring to FIG. 7, the instruction "mem, 2. ld X@px" is for storing the data of memory cell positions Aj[px] and Aj[px+1] designated by the pointer register px to XL register 58 and XH register 57, respectively. Specifically, a lower bit of data at successive address positions is stored in the XL register 58 and a higher bit is stored in the XH register 57.

The instruction "mem. 2. st. X@px" is for storing values stored in the XL register and the XH register, respectively, to the memory cells of successive addresses Aj[px] and AJ[px+1] designated by the pointer register px. This operation is not executed when the mask register (V register) 55 is cleared.

The instruction "mem. 2. swp. X@px" is for swapping the data at the address Aj[px] designated by the pointer register px and a higher address Aj[px+1] with the values stored in the XL register 58 and XH register 57, respectively. The swap instruction is not executed when the V register 55 and the N register 56 are both cleared.

In the 2-bit operation, successive addresses Aj[px] and Aj[px+1] are accessed simultaneously using the pointer of pointer register px, whereby parallel processing of 2 bits is achieved. By utilizing this 2-bit operation, data storage to movement data register 70 and MIMD instruction register 72 can also be executed.

In the 2-bit operation instruction, the XL and XH registers are used. It is also possible, however, to use the XL and XH registers in an SIMD operation and to use the X and XH registers for an MIMD operation instruction. Further, the X register and the XH register may be used both for the SIMD type and MIMD type operations.

FIG. 8 shows, in the form of a list, instructions for moving data (move: vcopy) between entries, in 1-bit operation. When data is moved between entries, the pointer register rn is used. Candidates of the pointer register rn for movement data between entries include four pointer registers r0 to r3.

The instruction "ecm. mv. n #n" is for transferring the value stored in the X register of an entry j+n distant by a constant n to the X register of entry j.

The instruction "ecm. mv. r rn" represents an operation in which the value of X register of entry j+rn distant by a value stored in the register rn is transferred to the X register of entry j.

The instruction "ecm. swp" instructs an operation of swapping the values stored in the X registers Xj and Xj+1 of adjacent entries j+1 and j.

The moving of data between entries shown in FIG. 8 is commonly executed in each entry pair.

FIG. 9 shows, in the form of a list, operations of moving (move) data between entries in the ALU for 2-bit operation. In the 2-bit operation, instruction descriptor "ecm2" is used in place of instruction descriptor "ecm". By the designation of instruction descriptor "ecm2", arithmetic/logic operation 2-bits by 2-bits is defined, and parallel data transfer with XH and XL registers (or with XL and XH registers) is performed. For the designation of contents to be transferred with the registers, the same instruction descriptors as the 1-bit operation, that is, "mv. n#n", "mv, r rn" and "swp" are used.

Therefore, when an SIMD type operation is executed, at the time of data transfer, the XH and XL, registers may be used or the X and XH registers may be used, as data registers. In the 2-bit unit movement operation also, the amount of data transfer for each entry is the same.

Further, as arithmetic and logic operation (operational processing) instructions, addition instruction "alu.adc@px", subtraction instruction "alu.sbc@px", inversion instruction "alu.inv@px" and a register value setting instruction using a function value, that is, "alu.let f" are prepared.

By the addition instruction "alu. adc@px", the data at the memory address indicated by the pointer of pointer register px is added to the value in the X register, and the result is returned to the memory mat. In the memory cell address Aj, the value after addition is stored, and a carry is stored in the C register.

By the subtraction instruction "alu. sbc@px", from the data at the memory address indicated by the pointer register px, the value stored in the X register is subtracted, and the result is returned to the memory mat. The value as a result of subtraction is stored in the memory cell at Aj, and the carry is stored in the C register.

By the inversion instruction "alu. inv@px", the data at the memory address indicated by the pointer of pointer register px is inverted and returned to the memory mat (to the original position).

By the function value instruction "alu.let f", values of F register, D register, and C register respectively are set by the corresponding bit values, in accordance with a function value represented by function f=(F·8+D·4+N·2+C), with the symbol "·" indicating the multiplication.

Further, as 2-bit operation instruction, a booth instruction "alu2.booth" and an execution instruction "alu2.exe@px" are prepared.

The booth instruction "alu2.booth" is for performing multiplication in accordance with the second order Booth algorithm, and from the values of XH, XL and F registers, the values of N, D and F registers for the next operation are determined. Further, the execution instruction "alu2.exe@px" is an operation instruction that makes a conditional branch in accordance with values of D and F registers.

By utilizing these instructions, it becomes possible to execute an operation or data transfer in each entry in accordance with the same operation instruction. Execution of instruction is controlled by controller 21 shown in FIG. 1.

Now, an MIMD type operation using data moving register (RECM register) 70 and MIMD instruction register 72 shown in FIG. 4 above will be described.

When an MIMD type logic operation is executed, an instruction "alu.op.mimd" is used. In the MIMD type operation, only logic operation instructions are prepared as executable instructions. Specifically, four instructions, that is, AND instruction, OR instruction, XOR instruction and NOT instruction are prepared. The minimum necessary number of bits for selecting an execution instruction from these four instructions is 2 bits. Therefore, in MIMD instruction register 72, 2-bit data M0 and M1 are stored. When the contents of the MIMD type operation are added, the number of instruction bits is set in accordance with the number of executable MIMD operations.

Figure 10:
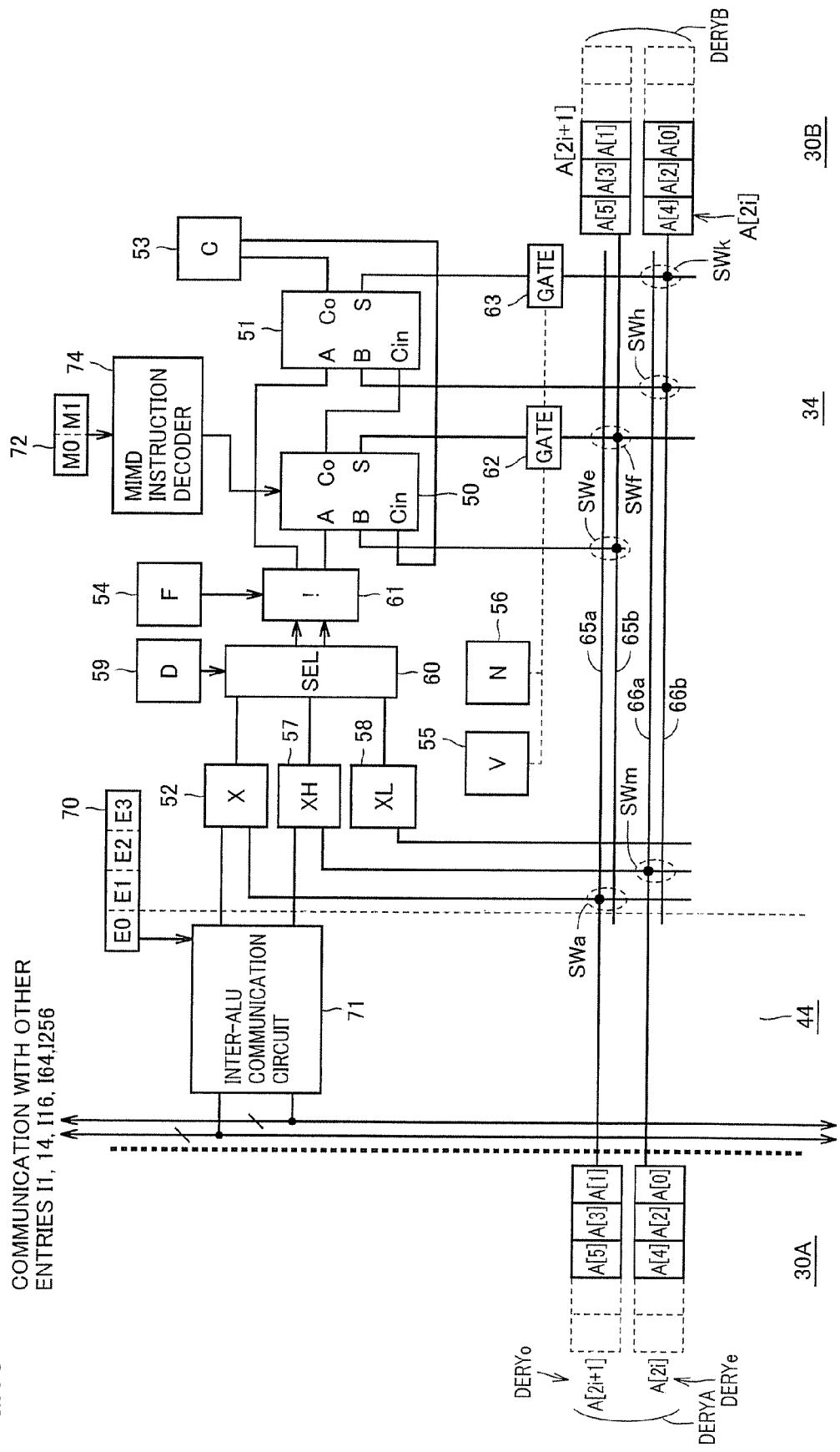
FIG. 10 schematically shows a configuration of an ALU processing element in accordance with Embodiment 1 of the present invention.

FIG. 10 schematically shows internal connections of the ALU processing element when an M type operation, that is, an instruction of MIMD type is executed. In the following, the internal configuration of ALU processing element in execution of an MIMD type instruction will be described.

When an MIMD type instruction is executed, X register 52 and XH register 57 are used as registers for performing 2-bit operation. When the MIMD type instruction is executed, XL register 58 is not used. Therefore, switch circuit SWa connects internal data line 65a to X register 52, and switch circuit SWm couples internal data line 66a to XH register 57. Switch circuit SWe couples internal data line 65b to the B input of adder 50, and switch circuit SWf couples an output of gate 62 to internal data line 65b. Switch circuit SWh connects internal data line 66b to the B input of adder 51, and switch circuit SWk connects an output of gate 63 to internal data line 66b.

By MIMD instruction decoder 74, adder 50 executes any of AND instruction, OR instruction, XOR instruction and NOT instruction, as described above. The result of logic operation is stored in data entry DERYB of memory mat 30B. When not one logic operation alone is done but the same logic operations are executed in parallel by adders 50 and 51, a control signal outputted from MIMD decoder 74 is commonly applied to adders 50 and 51. Here, as an example, logic operation is executed individually in each entry, using adder 50.

Further, inter-ALU communication circuit (RECM) 71 couples X register 52 and XH register 57 to internal data lines in accordance with bit values E0-E3 stored in movement data register (RECM register) 70, and transfers data to a transfer destination designated by the data bits E0-E3.

In ALU processing element 34 shown in FIG. 10, in accordance with the control signal from MIMD instruction decoder 74, the content of internal operation of adder 50 is set, and a designated logic operation is executed in each ALU processing element, and by inter-ALU communication circuit 71, data movement can be executed with the amount of data movement and transfer direction set individually in each entry.

Figures 11, 12, 13:
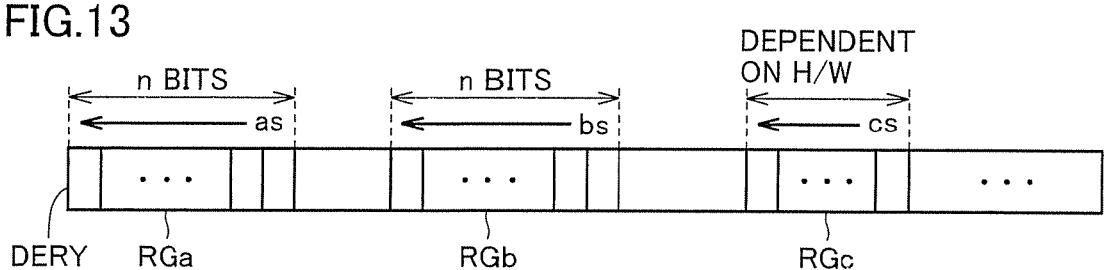
FIG. 11 shows, in a list, correspondence between bits of MIMD register and designated MIMD operation instructions, shown in FIG. 10.
FIG. 12 shows, in a list, logics of MIND operation instructions shown in FIG. 11.
FIG. 13 schematically shows regions designated by the pointer in memory mat shown in FIG. 3.

FIG. 11 shows, in a list, correspondence between the data bits (MIMD instruction bits) M0 and M1 stored in MIMD instruction register 72 and the operations executed by adder 50. Referring to FIG. 11, when bits M0 and M1 are both "0", negation operation "NOT" is designated. When bits M0 and M1 are "0" and "1", respectively, a logical sum operation "OR" is designated. When bits M0 and M1 are "1" and "0", respectively, an exclusive logical sum operation "XOR" is designated. When bits M0 and M1 are both "1", a logical product operation "AND" is designated.

Therefore, in the present invention, four logic operations are prepared and by 2-bit MIMD instruction M0 and M1, the content of operation is designated, When the number of operation contents to be designated increases, the number of data bits stored in MIMD instruction register 72 is also increased.

FIG. 12 shows, in a list, the MIMD operation instructions and the contents executed correspondingly.

Referring to FIG. 12, M0$j$ and M1$j$ represent MIMD instruction bits in an ALU processing element ALUj, and Aj represents a result of operation in the processing element ALUj. Here, j indicates an entry number, and its range is the entry number 0 to MAX_ENTRY.

The operation instruction is executed when the mask bit Vj is "1". Here, represents a negation operation (inversion). Therefore, when bits M0$j$ and M1$j$ are both "0" and mask bit Vj is "1", the negation operation instruction "alu.op.not" is executed. Here, in entry j, an inverted value !Aj[px] of bit Aj[px] designated by pointer px is obtained as the operation result data bit Aj.

For a logical sum operation instruction "alu.op.or", bit M0$j$ is set to "0" and bit M1$j$ is set to "1". When the instruction is executed, mask bit Vj is "1". By the logical sum operation, logical sum of the data bit Aj[px] designated by pointer px and the data bit Xj stored in the X register is obtained.

For an exclusive logical sum operation "alu.op.xor", bit M0$j$ is set to "1", and bit M1$j$ is set to "0". When the instruction is executed, mask bit Vj is "1". By the logical sum operation, exclusive logical sum of the data bit Aj[px] designated by pointer px and the data bit Xj stored in the X register is obtained.

For a logical product instruction "alu.op.and", bits M0$j$ and M1$j$ are both set to "1". Mask bit V is "1". Here, a logical product of the data bit Aj[px] designated by pointer px and the data bit Xj stored in the X register is obtained.

FIG. 13 schematically shows data bit storage regions in one data entry. The data entry DERY is divided into at least three regions RGa, RGb and RGc. The region RGa has its least significant address bit (start address) designated by pointer ap and has bit width of n bits. The region RGb has its start address bs designated by pointer bp and has bit width of n bits from the start address bs. Region RGc is for storing mask data and an operation MIMD instruction data. The bit width of this region depends on the hardware (H/W), that is, the number of executable instructions. In the memory mat, the bit width of region RGc is determined in accordance with the actual contents of operation to be executed, data bit width of the operation target and the number of data. The start address is set by a pointer cs.

Further, a temporary region for storing work data is also used. Configuration of data regions will be described later, together with specific operation procedures.

FIG. 14 shows a form of an instruction when an MIMD type operation is executed, in which an operation instruction is executed individually in each entry. The MIMD instruction is denoted by a code "mx_mimd". The MIMD operation "mx_mimd" is executed by controller 21 shown in FIG. 1. A prototype of the MIMD operation is represented by "void mx_mimd (intap, intbp, intcp, intn)". The argument ap is a destination address, bp a source address, and cp represents an MIMD instruction storage address. Further, n represents bit length of each region. Specifically, by intap, the start address "as" of region RGa shown in FIG. 13 is set, by intbp, the start address "bs" of region RGb shown in FIG. 13 is designated, and by intcp, the start address "cs" of region RGc shown in FIG. 13 is set. Here, n represents bit width of regions RGa and RGb. In the prototype shown in FIG. 14, the bit width of each of regions RGa and RGb is set to n bits, and the bit width of region RGc is set to log2 of the number of executable instructions.

When the M operation shown in FIG. 14 is executed, the following process steps are executed.

Step 1: An mx_mimd instruction is executed by the controller. In accordance with a load instruction ld, MIMD operation instruction M0, M1 at the bit position (address) designated by pointer cp is copied to MIMD instruction register 72 shown in FIG. 10. Thus, the operation content "alu. op. mimd" to be executed by the entry unit is set. Here, "mimd" is any of "or", "xor", "and" and "not".

Step 2: Content of the region at the bit position (address) designated by pointer ap and the content of the region at the bit position (address) designated by pointer bp are read bit by bit, and transferred to the ALU processing element (loaded).

Step 3: On the loaded data bits, the logic operation designated by the data stored in MIMD instruction register 72 is performed. The MIMD operation instruction is executed only when the mask bit (V register 55) is set to 1 in the ALU processing element.

Step 4: The result of operation is stored in a bit position (address) designated by pointer ap of region RGa shown in FIG. 13, having the start address of as.

Step 5: The process of steps 2 to 4 is repeatedly executed on all the data bits as the target of operation. Though each operation is done in bit-serial manner, the process is executed in parallel among a plurality of entries, and taking advantage of the high speed operability of SIMD type operation, operations of less parallelism can be executed concurrently with each other, whereby high speed processing is realized.

When the MIMD operation is executed, pointers ap, bp and cp are applied commonly to the entries of the memory mat, and in each entry, an operation (logic operation) designated by the MIMD operation instruction "alu. op. mimd" is executed individually, in bit-serial manner.

FIG. 15 shows an exemplary configuration of adder 50 shown in FIG. 10. Referring to FIG. 15, adder 50 includes an XOR gate 81 receiving data bits applied to inputs A and B, an AND gate 82 receiving bits at inputs A and B, an inverter 80 inverting the bit applied to input A, an XOR gate 83 receiving a bit from a carry input Ci and an output bit of XOR gate 81, an AND gate 84 receiving an output bit of XOR gate 81 and a bit from carry input Ci, and an OR gate 85 receiving output bits of AND gates 82 and 84 and generating a carry output Co. A sum output S is applied from XOR gate 83.

In adder 50, further, in order to switch internal path in accordance with the MIMD control data, switch circuits 87a to 87g are provided. Switch circuit 87a couples the output signal of inverter 80 to sum output S in accordance with an inversion instruction signal φnot. Switch circuit 87b couples the output of AND gate 82 to sum output S in accordance with a logical product instruction signal φand. Switch circuit 87c couples the output of XOR gate 81 to sum output S in accordance with an exclusive logical sum instruction signal φxor Switch circuit 87e couples the output of XOR gate 81 to the first input of OR gate 85 in accordance with a logical sum instruction signal for. Switch circuit 87f couples the output of OR gate 85 to the sum output S in accordance with a logical sum instruction signal φor. Switch circuit 87d selectively couples the output of AND gate 84 to the first input of OR gate 85, in accordance with an inversion signal /φor of the logical sum instruction signal.

Switch circuit 87g couples the output of XOR gate 83 to sum output S in accordance with an inversion signal /φmimd of the MIMD operation instruction signal.

The MIMD instruction signal /φmimd is set to an inactive state when an MIMD operation is done, and sets switch circuit 87g to an output high impedance state. Similarly, switch circuit 87d attains to the output high impedance state in accordance with the inversion signal /φor of the logical sum instruction signal, when a logical sum operation is executed.

The adder 50 shown in FIG. 15 is a full adder having a generally used circuit configuration. Though an inverter 80 is additionally provided for performing the negation operation, it may be provided to select the output of selection inversion circuit 61 shown in FIG. 10. In that case, bit value of F register (see FIG. 10) is set such that an inversion operation is performed.

Alternatively, an inverter may be provided in XOR gate 81 and the inverter in XOR gate 81 may be used as an inverter for executing the NOT operation.

In the configuration of adder 50 shown in FIG. 15, when a negation operation NOT is to be executed, switch circuit 87a is rendered conductive, and other switch circuits are all rendered non-conductive, whereby the output signal of inverter 80 is transmitted to sum output S.

When a logical product operation AND is to be executed, logical product instruction signal φand is activated, switch circuit 87b is rendered conductive, and other switch circuits are rendered non-conductive (output high impedance state). Therefore, the output bit of AND gate 82 is transmitted to sum output S through switch circuit 87b.

When a logical sum operation OR is to be executed, logical sum instruction signal φor is activated, switch circuits 87e and 87f are rendered conductive, and other switches are set to output high impedance state. Therefore, the output bit of OR gate 85 receiving the output bits of XOR gate 81 and AND gate 82 is transmitted to sum output S. When the OR operation is executed, XOR gate 81 outputs "H" ("1"), when the bit values applied to inputs A and B have different logical values. AND gate 82 outputs a signal of "1" when bits applied to inputs A and B are both "1". Therefore, when at least one of the bits applied to inputs A and B has logical value "1", a signal "1" is output from OR gate 85 through switch circuit 87f to sum output S, and the result of OR operation is obtained.

As shown in FIG. 15, by selectively setting switch circuits 87a to 87g to the conductive state in accordance with the MIMD operation to be executed, the designated operation instruction can be executed using the logic gates of internal elements of adder 50.

The configuration of adder 50 is merely an example, and a configuration similar to an FPGA (Field Programmable Gate Array), in which internal connection paths are arranged in a matrix and interconnection is set in accordance with the operation instruction signal, may be used.

Further, the configuration of full adder 50 shown in FIG. 15 is merely an example and not limiting. Any full adder configuration can be used, provided that internal connection paths are set in accordance with the operation instruction signal.

Figure 16:
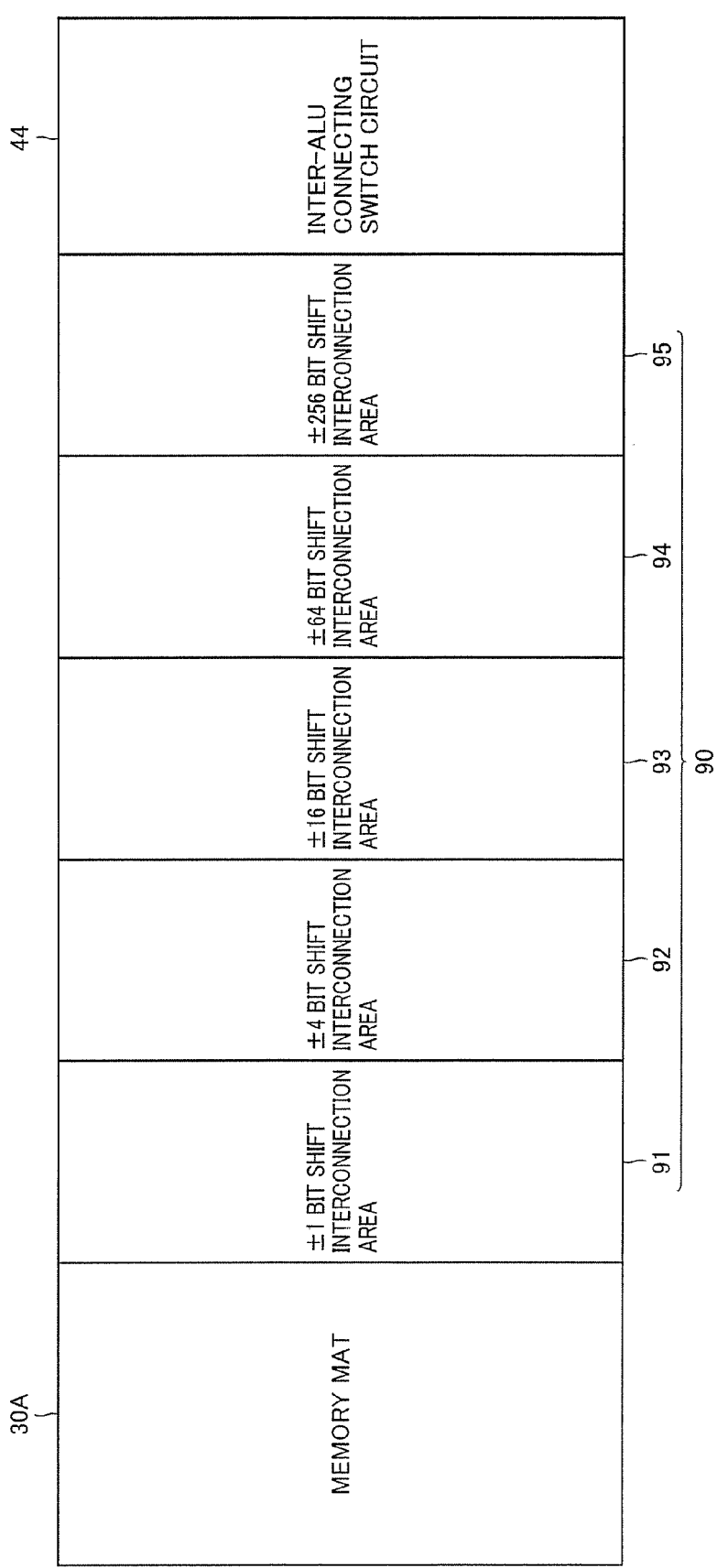
FIG. 16 schematically shows interconnection areas of the inter-ALU connecting switch circuit shown in FIG. 3.

FIG. 16 schematically shows interconnection areas for data communication between entries. Referring to FIG. 16, an interconnection area 90 for data communication is provided between memory mat 30A and inter-ALU connecting switch circuit 44. Interconnection area 90 for data communication includes an area 91 in which ±1 bit shift interconnection lines are arranged, an area 92 in which ±4 bit shift interconnection lines are arranged, an area 93 in which ±16 bit shift interconnection lines are arranged, an area 94 in which ±64 bit shift interconnection lines are arranged, and an area 95 in which ±256 bit shift interconnection lines are arranged.

A ±i bit shift interconnection line is for data communication between entries apart from each other by i bits. Here, interconnection lines for 11 different types of data communications, including ±1, ±4, ±16, ±64 and ±256 bit shifts and 0 bit shift, are prepared. As data communication is performed in 2-bit unit (2-bits by 2-bits), interconnection lines for data transfer using X register and XH register are arranged corresponding to each entry, in these interconnection areas 91 to 95.

Figure 17:
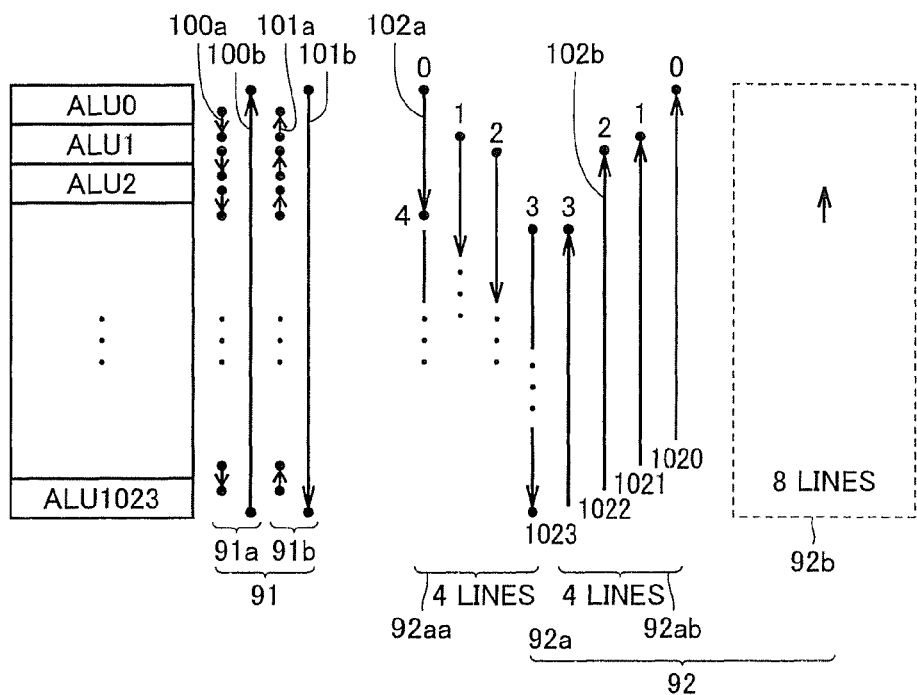
FIG. 17 schematically shows interconnection arrangement of the 1-bit and 4-bit shift interconnection areas shown in FIG. 16.

FIG. 17 shows an exemplary arrangement of interconnection lines in interconnection areas 91 and 92 shown in FIG. 16. Referring to FIG. 17, an interconnection arrangement is shown as an example having 1024 entries and ALU processing elements 0 to 1023.

In FIG. 17, ±1 bit shift interconnection area 91 includes a ±1 bit shift interconnection area 91a and a −1 bit shift interconnection area 91b. In +1 bit shift interconnection area 91a, a line 100a for transferring data in one direction to an entry having a number larger by 1, and a line 100b realizing 1-bit shift to an entry of the maximum number (ALU 1023) are provided. Line 100a performs shifting between neighboring entries (ALU processing elements), and therefore, lines 100a are arranged in an aligned manner.

In the −1 bit shift interconnection area 91b, similarly, a line 101a connecting neighboring entries and a line 101b for data transfer from the entry of the minimum number (ALU element 0) to the entry of the maximum number (ALU 1023) are provided. Here again, lines 101a are arranged in an aligned manner.

Therefore, in these interconnection areas 91a and 91b, per 1 bit of transfer data, two interconnection lines are arranged. Therefore, when interconnections are made for 2-bit data transfer, the lines 100a, 110b, 101a and 101b are arranged such that each of these perform 2-bit data transfer in parallel.

The ±4 bit shift area 92 includes a +4 bit shift interconnection area 91a and a −4 bit shift interconnection area 92b. FIG. 17 shows the arrangement of +4 bit shift area 92a, and −4 bit shift area 92b is indicated by a block in dotted line.

The +4 bit shift area 92a includes interconnection lines 102a arranged being shifted in position from each other by one entry. There are four interconnection lines 102a arranged in parallel, and each performs data transfer to an entry apart or spaced by 4 bits. In this case also, in order to perform +4 bit shift to an entry of large number, an interconnection line 102b is provided. In FIG. 17, numbers on lines 102a and 102b represent entry numbers. Here, four +4 bit shift interconnection lines 102a are arranged in parallel, and four interconnection lines 102b achieving shift in the direction from the maximum number to the minimum number are arranged in parallel. Therefore, in interconnection area 92a, 8 lines are arranged per 1 bit of transfer data.

As shown in FIG. 17, as the interconnection lines are arranged in a rhombic quadrilateral, lines for shifting can be arranged efficiently while avoiding tangling, and the layout area for the interconnection lines can be reduced.

Here, by arranging interconnection lines 100b, 101b and 102b for entry return so as to overlap with interconnection lines 100a, 101a and 102a for shifting, the interconnection layout area can further be reduced (multi-layered interconnection structure is utilized).

Figure 18:
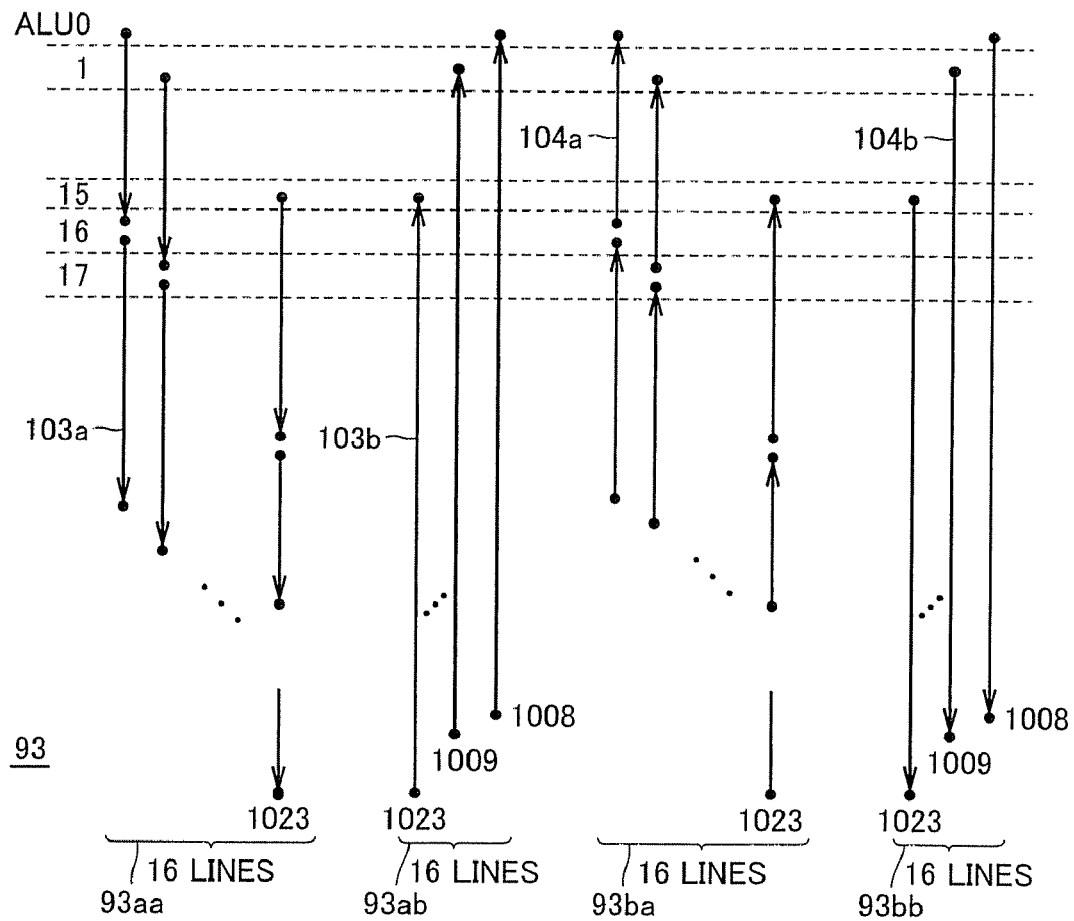
FIG. 18 shows an exemplary arrangement of interconnection lines in the 16-bit shift interconnection area shown in FIG. 16.

FIG. 18 schematically shows an exemplary arrangement of interconnection lines in ±16 bit shift interconnection area 93 shown in FIG. 16. Here, the ±16 bit shift interconnection area 93 includes +16 bit shift interconnection areas 93aa and 93ab, and −16 bit shift interconnection areas 93ba and 93bb. In the +16 bit shift interconnection area 93aa, interconnection line 103a connects to an entry apart by 16 bits. For cyclic shift operation between entries, an entry return line 103b is provided. Here, in −16 bit shift interconnection area 93ba, an interconnection line 104a is provided for connecting entries apart or away by 16 bits. Interconnection line 104b is an entry return line, which similarly connects entries away by 16 bits in cyclic manner.

In ±16 bit shift interconnection area 93, by arranging interconnection lines for transferring 2-bit data shifted by 1 entry from each other, interconnection lines 103a and 104a can be arranged in parallel in the entry direction (vertical direction), and the interconnection layout area can be reduced. Here, in each of interconnection areas 93aa, 93ab, 93ba and 93bb, 16 lines are arranged.

Figure 19:
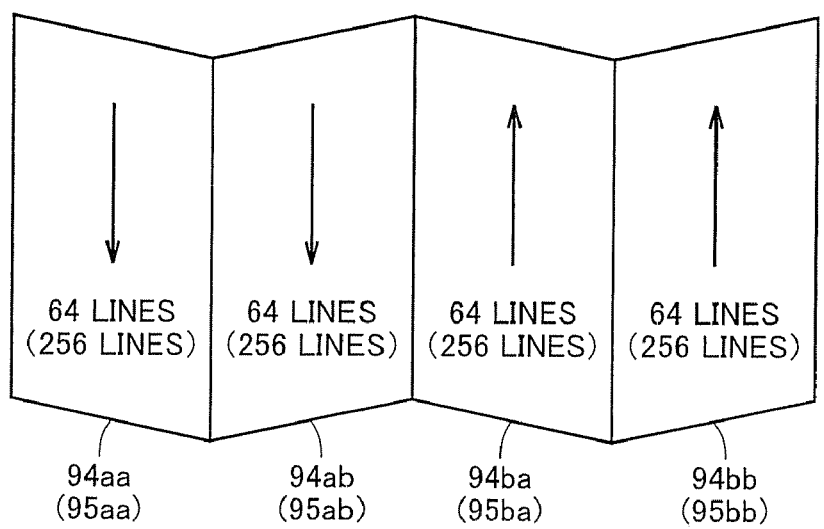
FIG. 19 schematically shows interconnection arrangements of 64-bit and 256 bit shift interconnection areas shown in FIG. 16.

FIG. 19 schematically shows an exemplary arrangement of interconnection lines in ±64 bit shift interconnection area 94 and ±256 bit shift interconnection area 95 shown in FIG. 16. Referring to FIG. 19, ±64 bit shift interconnection area includes +64 bit shift interconnection areas 94aa and 94ab and −64 bit shift interconnection areas 95ba and 94bb. In each of these areas 94aa, 94ab, 94ba and 94bb, 64 interconnection lines are arranged in parallel (per 1 bit of transfer data). Here, the shift line connects entries away by 64 bits, in the + direction and − direction, respectively.

Similarly, ±256 bit shift interconnection area 95 is divided into interconnection areas 95aa, 95ab, 95ba and 95bb. Here, in each area, 256 interconnection lines are arranged in parallel per 1 bit of transfer data, and entries away or distant by 256 bits are connected.

Using such shift lines, interconnections for performing shifting operations of ±4 bits, ±16 bits, ±64 bits and ±256 bits are provided for each entry, whereby it becomes possible to set the amount of data movement (distance between entries and the direction of movement) for each entry in moving data. In the following description, "amount of data movement" refers to both distance and direction of movement.

Figure 20:
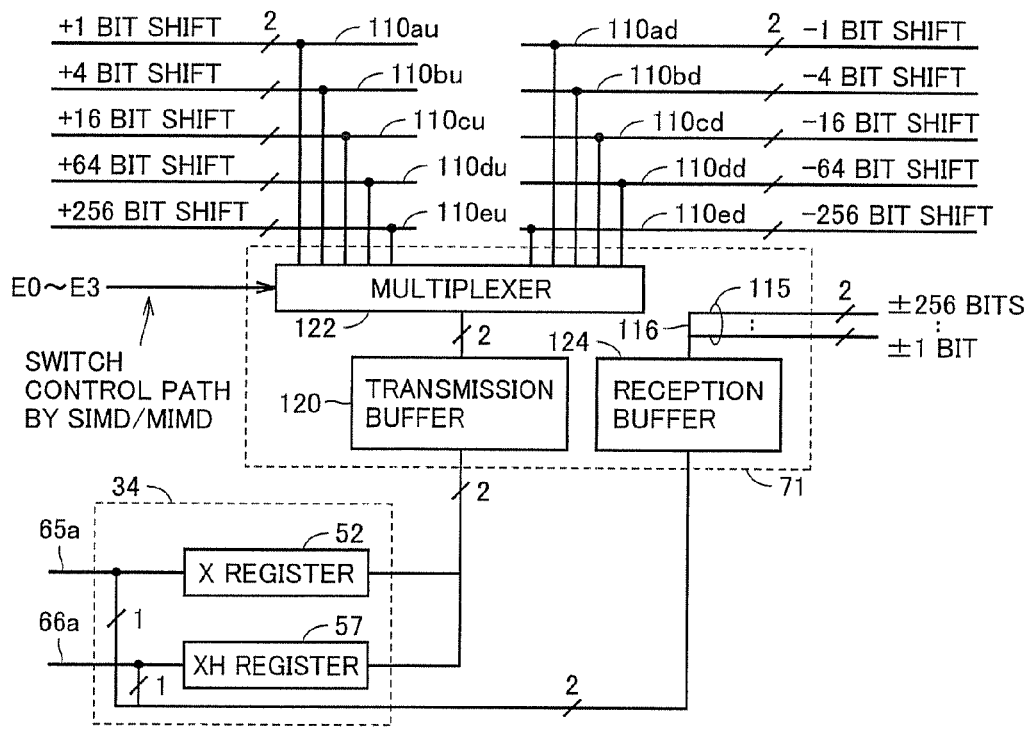
FIG. 20 schematically shows a configuration of an inter-ALU communication circuit shown in FIG. 10 and corresponding interconnections.

FIG. 20 schematically shows a configuration of an inter-ALU communication circuit (RECM) 71 shown in FIG. 4. In FIG. 20, X register 52 and XH register 57 included in ALU processing element 34 are shown as representatives. X register 52 and XH register 57 are connected to internal data lines 65a and 66a, respectively, at the time of an MIMD operation and MIMD data transfer, as shown in FIG. 10.

Inter-ALU communication circuit 71 includes a transmission buffer 120 receiving values stored in X register 52 and XH register 57, a multiplexer 122 for setting a transfer path of a data bit from transfer buffer 120 in accordance with bits E0 to E3 stored in the movement data register, and a reception buffer 124 receiving transmission data through a signal line 116 commonly coupled to a group of interconnection lines for the ALU processing element and generating data after transfer.

Multiplexer 122 selectively drives one of signal lines 110au-110ed provided corresponding to the entry. Signal lines 110au to 110ed each are a 2-bit signal line, representing the ±1 bit shift interconnection line to ±256 bit shift interconnection line shown in FIGS. 17 to 19. As shown in FIG. 20, shift interconnection lines are provided for each entry, and connection destination of such shift interconnection lines 110au to 110ed is set in a unique manner. By way of example, +1 bit shift interconnection line 110au is coupled to a reception buffer of a neighboring ALU processing element of an entry having a number larger by 1, and −1 bit shift interconnection line 110ad is coupled to a reception buffer of a neighboring entry having a number smaller by 1.

Reception buffer 124 commonly receives corresponding group of signal lines (±1 bit shift lines to ±256 bit signal lines). The signal lines of the group of signal lines 115 are subjected to wired OR connection.

Figure 21:
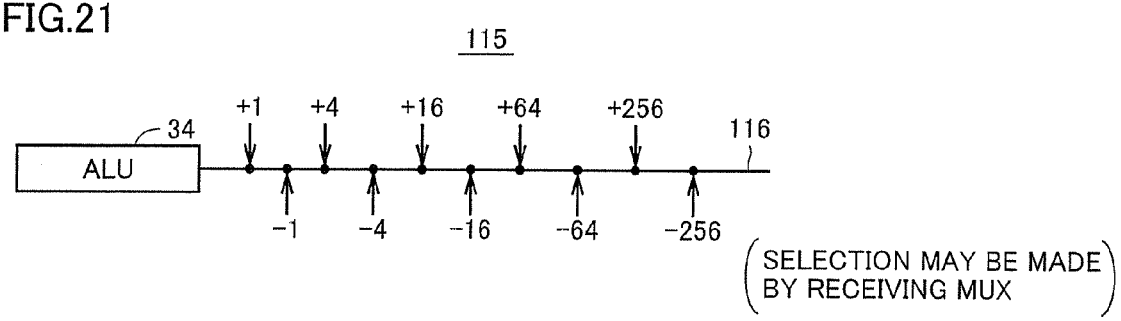
FIG. 21 shows an exemplary connection of interconnection lines to a reception buffer shown in FIG. 20.

FIG. 21 schematically shows connection of a signal line 116 to the reception buffer. The group of signal lines 115 is connected in one-to-one correspondence between entries, with data transfer directions taken into account, as shown in FIGS. 17 to 19 above. Specifically, the group of signal lines 115 includes ±1 bit shift signal lines, ±16 bit shift signal lines, ±64 bit shift signal lines and ±256 bit signal lines. These are wired-OR connected commonly to signal line 116.

Upon data transfer, in inter-ALU communication circuit 71, multiplexer 122 selects a data transfer signal line (bit shift line) in accordance with values E0 to E3 stored in the movement data register, and couples the selected shift signal line to transmission buffer 120. Therefore, for one ALU processing element, one shift signal line is selected. The shift signal line is a one-directional signal line, and in the entry (ALU processing element 34) of the transfer destination, by signal line 116 coupled to reception buffer 124, one signal line of the group of signal lines 115 is driven. Therefore, even when the group of shift signal lines is wired-OR connected, data can reliably be transferred and received by the entry of the transfer destination and the transfer data can be generated.

Here, if the load on the signal line 116 is considered too heavy and high speed data transfer through transmission buffer 120 may be difficult, a multiplexer for reception similar to multiplexer 122 is provided in reception buffer. Here, the multiplexer for reception selects the source of data transfer based on the information at the time of data transfer. By setting the same data as the movement data E0 to E3 of the data transfer source, as the reception buffer selection control data at the destination of data transfer, it becomes possible for the reception buffer 124 to select the shift signal line on which the transfer data is transmitted.

FIG. 22 shows an exemplary description of an instruction for moving data between entries. FIG. 22 represents a programmable zigzag copy (2-bit mode) in which data are moved 2-bits by 2-bits. The 2-bit mode copy code is represented by "mx2_cp_zp". A prototype of the 2-bit mode copy is represented by "void mx2_cp_zp (intap, intbp, intcp, intn)". Here, the argument, ap, is a destination address, and argument, bp, is a source address. The argument, cp, is an address for storing distance of movement between entries, and the argument, n, represents bit length of the transfer data storage region.

In the 2-bit copy code, the data of distance of movement between entries designated by pointer cp is copied in 2-bit unit, in an RECM register (movement data register). Contents of n bits from the initial or start address bs designated by pointer bp are transferred in 2-bit unit to the entry designated by the data in RECM register. At the entry as the transfer destination, the transferred data are copied in 2-bit unit, in a region starting from the initial address as indicated by pointer ap.

FIG. 23 shows description of an instruction for programmable zigzag copy (1-bit mode) in which data are moved bit by bit. The 1-bit mode copy code is represented by "mx_cp_zp", A prototype of the 1-bit mode copy is represented by "void mx_cp_zp (intap, intbp, intcp, intn)". The arguments ap, bp and cp of the 1-bit mode copy code are the same as the definition of arguments of 2-bit mode copy code. When the instruction of 1-bit mode copy code is executed, an operation similar to that for executing the 2-bit mode zigzag copy instruction is performed, except that the copy operation is executed bit by bit.

Figures 24, 25:
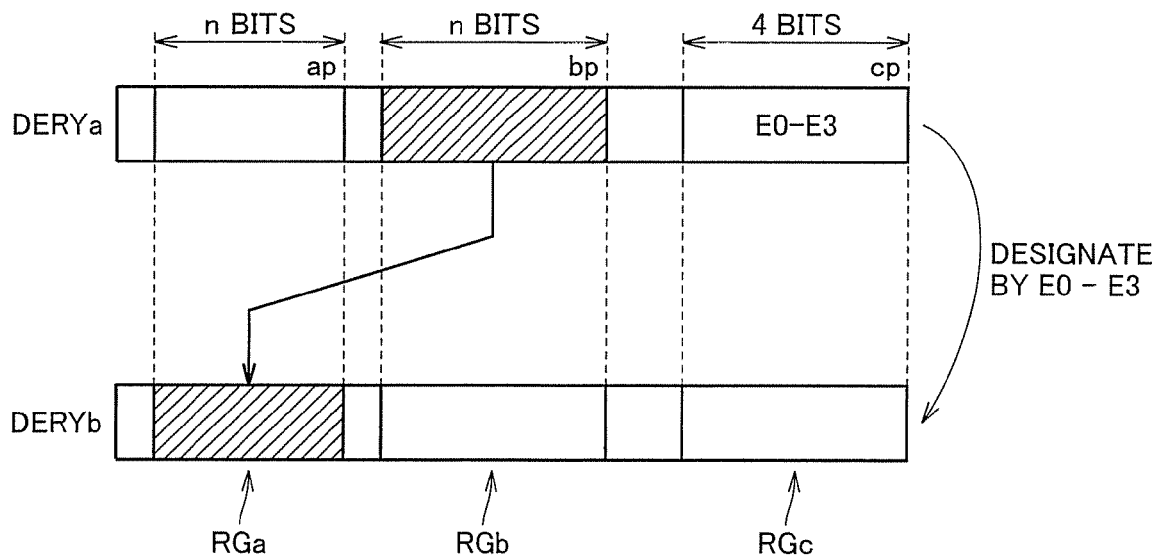
FIG. 24 schematically shows data flow in the zigzag copy mode.
FIG. 25 shows, in a list, control bits, shift distances and shift directions of inter-ALU communication circuit shown in FIG. 10.

FIG. 24 schematically shows data movement when the programmable zigzag copy instruction shown in FIGS. 22 and 23 is executed. FIG. 24 shows, as an example, data transfer from data entry DERYa to data entry DERYb. As shown in FIG. 24, in the zigzag copy mode, in accordance with the data E0 to E3 of the amount of movement stored in the region RGc of 4 bit width from the start address cs designated by pointer cp in data entry DERYa, the data entry DERYb as the transfer destination is set (manner of connection or routing of multiplexer 122 of FIG. 20 is set).

Thereafter, the data of region RGb of n-bit width starting from the start address bs designated by pointer bp are transferred to the region RGa of n-bit width starting from start address as designated by pointer ap of data entry DERYb, in 1-bit unit (when 1-bit mode programmable zigzag copy instruction is executed) or in 2-bit unit (when 2-bit mode programmable zigzag copy instruction is executed). Data transfer paths are provided in one-to-one correspondence between entries, and data can be transferred without causing collision of data, by designating the data transfer destination individually for each entry.

Data transmission is performed using the X register and the XH register, and data reception is performed using the reception buffer. Here, after once storing the received data in X/XH register, the transfer data may be stored at bit positions designated by the address pointer ap, in accordance with a "store" instruction. Alternatively, in the zigzag copy operation, data may be directly written from the reception buffer to bit positions designated by address pointer ap, through an internal signal line.

Transmission and reception are not performed simultaneously. By way of example, transmission and reception may be done in the former half and in the latter half of one machine cycle, respectively. Alternatively, transmission and reception may be performed in different machine cycles. Thus, transmission and reception can be performed in one entry.

Selective activation for transmission and reception may be set, for example, by the mask bit V. When execution of a "load" instruction is masked at the time of transmission and execution of a store instruction is masked at the time of reception by the mask bit V, transmission and reception can be executed selectively. Alternatively, by driving a bit line pair of the corresponding data entry using the reception buffer, it becomes possible to execute writing of received data in all entries in parallel (the address pointer at the time of writing is the same for all the entries, as the word line is common to all entries).

FIG. 25 shows, in a list, the amount of data movement E0-E3, communication distance and communication direction, stored in movement data register (RECM register) 70 shown in FIG. 10. By the 4-bit movement data E0-E3, the direction of communication can be set to an up (+) direction (in which entry number increases) and a down (−) direction (in which entry number decreases), and the data communication distance can be set to any of 1, 4, 16, 64 and 256. Including the communication distance of 0, a total of 11 different types of data communication between entries can be realized.

Figure 26:
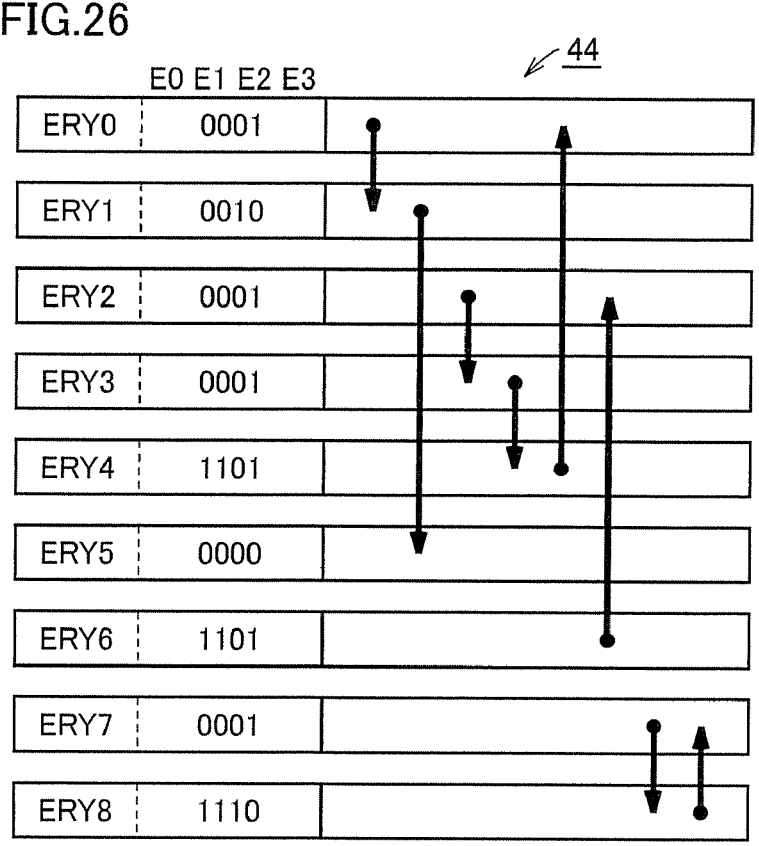
FIG. 26 shows an example of a zigzag copy operation.

FIG. 26 shows an example of data movement between entries. In FIG. 26, entries ERY0 to ERY8 are shown as representatives. In inter-ALU connecting switch circuit 44, the data transfer path is set in accordance with the movement amount data E0 to E3. For entries ERY0, ERY2, ERY3 and ERY7, a +1 bit shift operation is set, For entry ERY1, a +4 bit shift operation is designated. For entry ERY4, a −4 bit shift operation is designated, and for entry ERY6, a −4 bit shift operation is designated. Further, for entry ERY8, a −1 bit shift operation is designated.

In FIG. 26, arrows represent data movement, and the root of each arrow indicated by a black circle is coupled through a multiplexer to the transmission buffer, and the tip end of the arrow is coupled to the reception buffer of the transmission destination.

The interconnection lines between entries arranged for inter-ALU connecting switch circuit 44 are one-directional lines, and hence, among entries ERY0 to ERY8, data movement can be executed in parallel without causing collision of data.

Now, an operation when the programmable zigzag copy instruction shown in FIGS. 22 and 23 is executed, will be described.

Step 1: When data movement is to be performed individually in each entry by zigzag copying, first, data representing the amount of data movement of the corresponding entry is set in advance in a region designated by the pointer cp of the data entry. At this time, mask bit V is set in a different region.

Step 2: Controller (21) executes the zigzag copy instruction, and under the control of the controller, the entry movement amount data E0 to E3 stored in the region designated by the pointer cp of data entry are stored in the movement data register (RECM register). Therefore, this operation is performed commonly in every entry.

Step 3: In accordance with the movement data E0 to E3 stored in the data movement register (RECM register), connection path of the multiplexer (element 122 of FIG. 20) is set.

Step 4: In accordance with the data of the operation target (data to be moved) and dependent on whether it is a 1 bit mode copy or 2 bit mode copy, the transmission data is set in the register (X register and XH register, or X register) in the ALU processing element. At this time, the data in the region having the bit width of n bits designated by the pointer bp of the data entry are stored in the register of the corresponding ALU processing element. This operation is also executed commonly on all entries under the control of controller (21).

Step 5: The data set in the register for transfer (X and XH registers, or X register) are transferred to the entry at the destination of movement through multiplexer 122 shown in FIG. 20. At the entry at the destination of movement, the data that have been transferred through the reception buffer are stored bit by bit or 2 bits by 2 bits in the region designated by the pointer ap of the corresponding data entry (this operation is also executed with the pointer generated commonly to all entries by the controller 21).

Step 6: The process of Step 3 to Step 5 is executed repeatedly until all the data bits to be moved are transferred.

At the time of this data transfer, when bit "0" is set in the mask register (V register), data setting and transmission from the data entry of an entry to a corresponding data register (X, XH and the movement data registers) are not performed.

Next, processing of an MIMD operation will be described.

Step 1: First, in a region having the bit width of n bits designated by the pointer cp of a data entry, an instruction (M0, M1) for performing an MIMD operation is set.

Step 2: An appropriate MIMD instruction among the MIMD operation instructions set in the data entries is stored in the MIMD instruction register, by executing a load instruction under the control of controller (21).

Step 3: A register load instruction is executed on the data of the operation target under the control of controller (21), data bits of bit positions designated by pointers ap and bp of data entry regions (RGa and RGb) are transferred to the corresponding ALU processing element, and one data bit (which is transferred first) is set in the X register. In the ALU processing element, an operation content is set by the MIMD instruction decoder such that the instruction set in the MIMD instruction decoder is executed. On the data loaded from address positions designated by pointers ap and bp of the data entry, the set operation is executed. The result of operation is stored at the bit position of the data entry designated by the pointer ap, by executing a store instruction, in controller (21).

Step 4: Until the number of times of operations reaches a designated number, that is, until the processing of all operations on the data bits of the operation target is complete, the process of Step 3 is repeatedly executed. Whether the operation number has reached the designated number or not is confirmed by checking whether the point ap or bp reached the set maximum value or not.

When an SIMD operation is to be executed, under the control of controller 21 shown in FIG. 2, connection path of inter-ALU connecting switch circuit 44 is set commonly for all entries, and the content of operation of the ALU processing element 34 is also set commonly to all entries. Here, pointer control of data entries DERY is executed in parallel by controller 21, and one same instruction is executed in parallel in all entries. Now, a specific operation of performing a 4-bit addition will be considered.

[Exemplary Application of a Combination Circuit]

Figure 27:
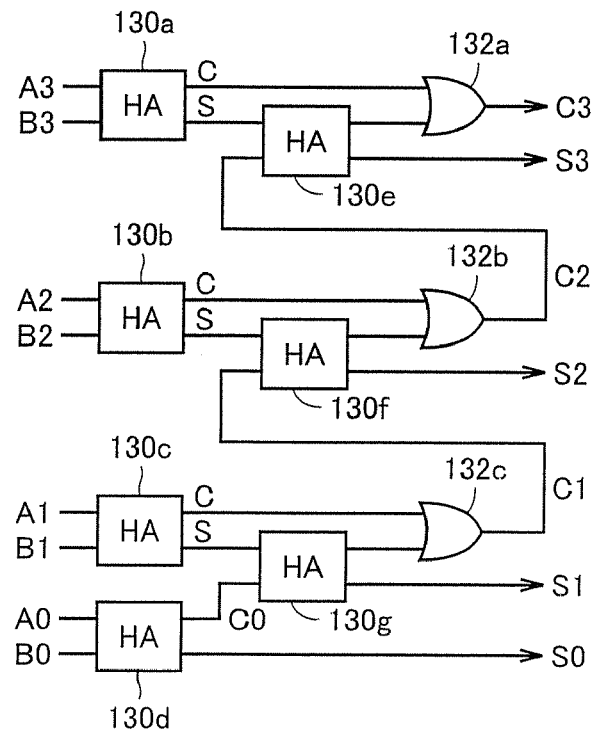
FIG. 27 shows an exemplary configuration of a 4-bit adder.

FIG. 27 shows an exemplary configuration of a common 4-bit adder. As shown in FIG. 27, a 4-bit adder adding 4-bit data A0-A3 and B0-B3 is implemented by seven half adders (HA) 130a-130g and three OR gates 132a-132c. As the internal configuration of the half adder, one using an XOR gate and an AND gate, one using an AND gate, an OR gate and a NOT gate, or various other configurations may be used. Half adders 130a-130d respectively receive 2 bits at corresponding positions. Half adders (HA) 130a-130g are provided for generating outputs S3 to S1, and OR gates 132a-132c are used for generating carries c3 to c1. Half adders 130e-130g receive carry outputs of the half adders of the preceding stage (1-bit lower half adders) and sum outputs of the half adders of the corresponding bit positions, OR gates 132a-132c receive carry outputs of the half adders of the corresponding bit positions.

Figure 28:
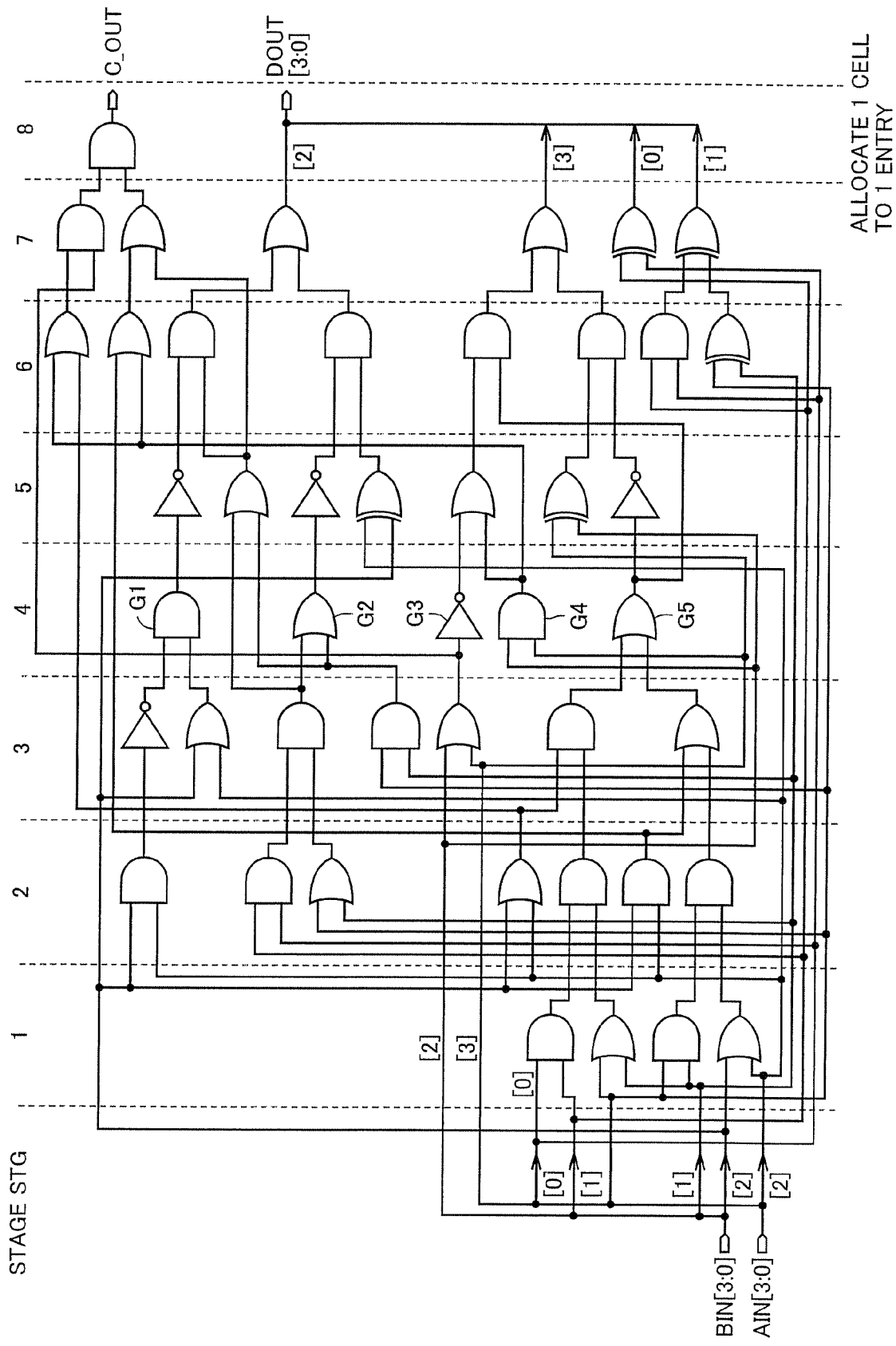
FIG. 28 shows a configuration when a 4-bit adder shown in FIG. 27 is developed by a combination circuit.

When the 4-bit adder shown in FIG. 27 is realized by a combination circuit including an 1-input, 1-output NOT gate, a 2-input, 1-output AND gate, a 2-input, 1-output OR gate and a 2-input, 1-output XOR gate, the logic circuit of 4-bit adder shown in FIG. 28 can be obtained.

As shown in FIG. 28, a 4-bit addition is executed, divided into eight stages STG. In this configuration, half-addition operations that can be performed in parallel are executed in parallel, followed by an operation of receiving the carry propagation later. The configuration of the 4-bit adder realized by the combination circuit of logic gates shown in FIG. 28 can be found by developing the 4-bit adder shown in FIG. 27 in logic gates, considering carry propagation.

In the 4-bit adder shown in FIG. 28, from 4-bit inputs AIN[3:0] and BrN[3:0], a 4-bit output DOUT[3:0] and a carry output C_OUT are generated.

The logic operation of logic circuit shown in FIG. 28 is executed with the parallel processing device described in the foregoing, stage by stage successively in accordance with the MIMD instruction. Referring to FIG. 28, at the time of MIMD operation, in each stage STG, one cell (logic gate) is allocated to one entry. Each time the stage STG changes, an output signal of the logic gate is propagated to a different entry, and the amount of movement of the logic gate output differs cell by cell. Further, the operation executed in the entry (cell) differs in each stage. Therefore, the amount of movement and the instruction are set individually for each entry, and mutually different MIMD operations are executed.

FIG. 29 shows state of data stored in data entries at the start of the stage, when an operation of stage STG 4 is executed in the logic circuits shown in FIG. 28. As data entries, data entries DERY0 to DERY7 are used. At positions designated by address pointer ap of four data entries DERY0 to DERY3, respective bits of 4-bit data A are stored, and similarly at positions designated by address pointer ap of data entries DERY4 to DERY 7, respective bits of 4-bit data B are stored. Consequently, when the MIMD instruction is executed, different from an execution of an SIMD type operation, data of the operation target are stored dispersed over a plurality of entries, and the result of operation is transmitted to entries of propagation destinations of respective logic gates and stored in temporary regions.

Temporary regions t1 to tmp store process data, and at addresses designated by temporary pointers t1, t2 and t3, output values of logic gates of respective stages are stored. At the region designated by temporary pointer tmp, the other operation data of each entry is stored. Specifically, in each entry, a binary operation is executed on the data bit stored at the bit position indicated by temporary pointer ti (i is other than mp) and the data bit stored at the bit position indicated by the temporary pointer tmp. When a negation operation involving an inversion is executed, the inverting operation is performed on the data bit stored at the bit position indicated by the temporary pointer ti (in the following, generally referred to as a temporary address ti where appropriate).

FIG. 29 shows a data flow when an operation A+B=(0011)+(1101) is performed.

MIMD instruction bits are stored in MIMD instruction register of the corresponding ALU processing unit in 2-bit mode, at data entries DERY0 to DERY7.

Before the start of operation stage STG 4 (at the end of stage STG3), operations are performed in four data entries DERY0, DERY2, DERY5 and DERY7 (each respective mask bit V (content of V register) is set to "1"). Here, operation instruction bits M0 and M1 of data entries DERY0 and DERY2 indicate an AND operation, and MIMD operation instruction (bits M0, M1) of data entry DERY5 designates a NOT operation. MIMD instruction bits M0 and M1 of data entry DERY7 designates an OR operation. Data entries DERY0 and DERY2 have executed the operation of AND gate in the preceding stage of OR gate G2 of stage STG4, and storing the result of this operation at temporary address t3, Data entries DERY5 and DERY7 store the output of an inverter of the preceding stage of gate G1 and the output of an OR gate in the preceding stage of gate G3, respectively, at temporary address t3.

Specifically, in FIG. 29, at the start of stage STG4 (at the completion of stage STG3), output values of stage STG3 are established, logical values of data entries DERY0 and DERY2 are "1", the result of negation at data entry DERY5 is "0", and the result of OR operation "1" is stored in data entry DERY7. At the time of operation, in data entries DERY0 to DERY7, operations are selectively executed in accordance with the mask bit (contents of V register), and the result of operation is stored at temporary address t3 of the corresponding data entry. Therefore, in data entries DERY 0 and DERY 2, an AND operation of bits at temporary addresses t3 and tmp is performed, and bit "1" is stored at temporary address t3.

In data entry DERY 5, a NOT operation is performed, the bit value "1" that has been stored previously is inverted, and bit "0" is stored at temporary address t3. In data entry DERY7, an OR operation of bit values stored at temporary pointers t3 and tmp is performed, and the result of operation is again stored at temporary address t3. Therefore, "1" is stored at temporary address t3 of data entry DERY7.

Then, in order to execute the operation of stage STG4 shown in FIG. 28, data are rearranged.

Here, data entry DERY1 is allocated as the operation region of OR gate G2, data entry DERY4 is allocated as the region of AND gate G1, and data entry DERY5 is allocated as the region of OR gate G5. The region of data entry DERY6 is allocated to inverter G3 performing a NOT operation. Data entry DERY7 is allocated to the AND gate G4 for performing an AND operation.

FIG. 30 schematically shows data movement when the operations of stage STG4 are performed. OR gate G2 must receive an output bit of the AND gate of the preceding stage. Here, the output value of the AND gate in the preceding stage of OR gate G2 is stored at the bit positions designated by the temporary pointer t3 of data entries DERY0 and DERY2, and these data bits are transferred to temporary address t4 of data entry DERY1. Here, the bit at temporary address t3 of data entry DERY0 is stored at temporary address tmp of data entry DERY1, and the bit at temporary address t3 of data entry DERY2 is stored at temporary address t4 of data entry DERY1.

To data entry DERY4, AND gate G1 is allocated. Here, the outputs of an inverter and the OR gate of the preceding stage are moved to data entry DERY4. Specifically, the bit at temporary address t1 of data entry DERY2 is moved to temporary address tmp of data entry DERY4, and the output of the inverter at temporary address t3 of data entry DERY5, which has been established in stage STG3, is moved to temporary address t4 of data entry DERY4.

Data entry DERY5 is allocated to OR gate G5. Here, outputs of AND gate and OR gate of the preceding stage of OR gate G5 must also be moved, and the data at the bit position indicated by temporary pointer t1 of data entry DERY2 and the data bit of data entry DERY1 indicated by temporary pointer t2 are moved to positions indicated by temporary pointers tmp and t4, respectively.

Data entry DERY6 is allocated to inverter G3. Here, it is necessary to move the output bit of the OR gate of the preceding stage to temporary address t4 of data entry DERY6. The result of operation of temporary address t3 of data entry DERY7 operated at the preceding stage STG3 is transferred to the position of temporary address t4 of data entry DERY6.

Data entry DERY7 is allocated to AND gate G4. The AND gate G4 receives most significant bits BIN[3] and AIN[3]. Therefore, the data at the bit position indicated by address pointer ap of data entry DERY7 is moved to the position indicated by temporary pointer tmp, and the data bit at the bit position indicated by address pointer ap stored in data entry DERY3 is moved to the position of temporary address t4 of data entry DERY7. Thus, input of respective gates G1 to G5 of stage STG4 are stored at bit positions indicated by temporary pointers t4 and tmp of respective data entries.

In this data moving operation, basic amounts of data movement are ±1, ±4, ±16, ±64 and ±256. Therefore, the data are transferred, as far as possible, to regions indicated by the basic amounts of data movement. At the time of this data transfer, the zigzag copy instruction described above is used. By way of example, first, data transfer to the region indicated by temporary pointer t4 takes place and, thereafter, by executing the zigzag copy instruction, data are moved to the temporary address tmp in the similar manner. The data movement may be done in reverse order. Specifically, at the time of data movement to temporary addresses t4 and to tmp, data may be moved to temporary address tmp first.

In the data movement, the amount of data movement at data entries DERY2 and DERY3 is +2 Therefore, for the data movement between these two entries, +1 bit shift operation is executed twice.

In this data moving operation, in each data entry, data bits at the same bit positions are read (loaded) by a row decoder, not shown, and data are transferred and stored. Therefore, when data are transferred to temporary addresses t4 and tmp, data are moved while pointers ap and t1 to t4 are updated. Here, whether the movement is to be executed or not is determined by the mask bit V of the mask register (V register).

In this data transfer, first, the load instruction may be executed with the source address changed successively, to store transfer data bits in the corresponding X registers in respective entries and, thereafter, data transfer (1-bit mode zigzag copy instruction) may be executed while changing the destination address, with the destination being temporary addresses t4 and tmp. By way of example, when the copy instruction mx_cp_zp shown in FIG. 23 is executed, pointer bp is successively updated to store transfer data bits in corresponding X registers, and then, a transfer instruction is executed to activate the transmission buffer, whereby the data transfer from the X register to the destination entry is executed. As the destination address is successively updated to t4 and tmp, the mask bit V is set/cleared in accordance with the destination address, and data is moved correctly from each entry to temporary addresses t4 and tmp.

FIG. 31 shows an operation in the entry when MIMD instruction bits are stored. When an MIMD instruction is to be set for each entry, the MIMD operation instruction mx_mimd shown in FIG. 14 is executed, and as the MIMD instruction bits, instruction bits M0 and M1 for stage STG4 designated by pointer cp are copied to the MIMD register. At this time, the bit value of mask register (V register) is set to "1" in data entries DERY1 and DERY4 to DERY7 in which operations are to be carried out, and the mask bit is set to "0" in other entries. Thus, MIMD instruction bits stored in data entries DERY1 and DERY4 to DERY7 are stored in the MIMD instruction register, and the operations to be executed are designated.

Thereafter, as shown in FIG. 32, in accordance with bit values M0 and M1 set in the MIMD instruction register, MIMD operation instruction "all. op. mimd" is executed on the bits at addresses t4 and tmp. In FIG. 32, an OR operation is done in data entry DERY1, an AND operation is done in data entry DERY4, an OR operation is done in data entry DERY5, a NOT operation is done in data entry DERY6, and an AND operation is done in data entry DERY7.

In these operations, the operation is executed on bit values stored at temporary addresses t4 and tmp, and the result of operation is stored at a bit position of temporary address t4. In the data entry where the operation is not executed, the corresponding mask bit V is "0" After execution of operations at stage STG4, results of operations are stored at bit positions of temporary address t4 of data entries DERY1 and DERY4 to DERY7.

Thereafter, through similar processing, operations of stages STG5 to STG8 are executed.

As the MIMD instruction control bit, the MIMD instruction control bit or bits necessary for each stage is or are stored. Therefore, the bit width of the region for storing the MIMD operation instruction control bits is set in accordance with the number of operation stages, and the bit width of the region designated by the temporary pointer is also set in accordance with the number of operation stages.

[Exemplary Application of Sequential Circuit]

Figure 33:
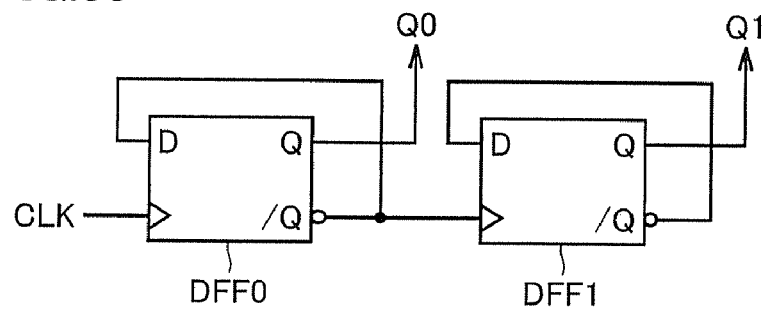
FIG. 33 shows an example of a 2-bit counter.

FIG. 33 shows a general configuration of a 2-bit counter as an example of a sequential circuit. The 2-bit counter 33 shown in FIG. 33 includes two stages of cascaded D flip-flops DFF0 and DFF1. D flip-flop DFF0 of the first stage receives at a clock input a clock signal CLK, and D flip-flop DFF1 of the next stage receives at a clock input a signal from an output /Q of the D flip-flop DFF0 of the first stage, D flip-flops DFF0 and DFF1 have their complementary outputs /Q coupled to their inputs D. From outputs Q of D flip-flops DFF0 and DFF1, count bits Q0 and Q1 are output, respectively.

In the 2-bit counter shown in FIG. 33, D flip-flops DFF0 and DFF1 output the state of a signal at the D input immediately before a rise of a signal applied to the clock input. Therefore, the state of the signal at the output Q of each of D flip-flops DFF0 and DFF1 changes in synchronization with the rise of the signal applied to its clock input. The configuration of the 2-bit counter shown in FIG. 33 is also used as a frequency divider dividing the frequency of clock signal CLK.

Figure 34:
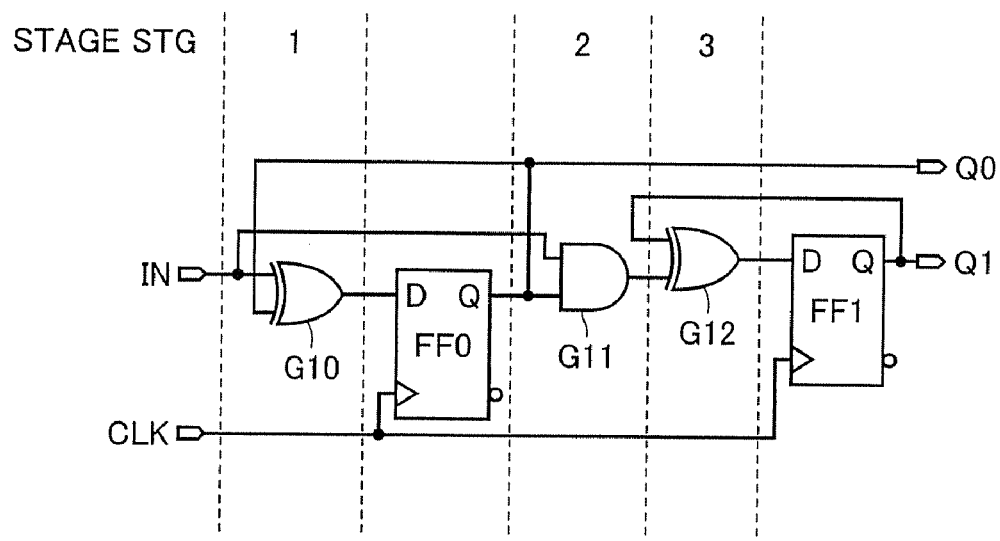
FIG. 34 shows a configuration when the 2-bit counter shown in FIG. 33 is implemented by a sequential circuit of logic gates and flip-flops.

FIG. 34 shows a configuration in which the 2-bit counter of FIG. 33 is implemented by XOR gates and an AND gate. Referring to FIG. 34, the 2-bit counter includes flip-flops FF0 and FF1, an XOR gate G10 receiving the signal at output Q of flip-flop FF0 and an input signal IN, an AND gate G11 receiving the input signal IN and a signal from output Q of flip-flop F0, and an XOR gate G12 receiving an output signal of AND gate G11 and a signal from output Q of flip-flop FF1. The output signal of XOR gate G10 is applied to an input D of flip-flop F0, and the output signal of XOR gate G12 is applied to an input D of flip-flop FF1.

To the clock inputs of flip-flops FF0 and FF1, a clock signal CLK is applied commonly.

In the 2-bit counter shown in FIG. 34, flip-flops FF0 and FF1 are realized by memory cell regions held in data entries. In the 2-bit counter shown in FIG. 34, as the number of stages of logic operations, three stages STG are used. Signals are taken and held in flip-flops FF0 and FF1 by storing output values of XOR gates G10 and G12 at corresponding bit positions in the corresponding data entry.

FIG. 35 shows an exemplary bit arrangement when the operation of 2-bit counter shown in FIG. 34 is emulated. At data entries DERY0 to DERY7, the input signal IN is stored at the bit position designated by address pointer ap. The input signal IN has a bit value "1". Bit values of temporary addresses t1-t3 correspond to output bits of stages STG1 to STG3, respectively. Temporary address tmp is not used in the 2-bit counter operation.

In order to store the values stored in flip-flops FF0 and FF1, at the data entry, pointer addresses FF0 and FF1 are prepared (here, both the flip-flops and the pointer addresses indicating the bit positions are denoted by the same reference characters).

In FIG. 35, eight data entries DERY0 to DERY7 are provided from the following reason. There are four initial states of flip-flops FF0 and FF1, and for the four initial states, one set of four data entries is used. This is to represent an operation of one stage by one set of data entries. In FIG. 35, states of stages STG2 and STG3 are represented by the set of data entries DERY4 to DERY7 and the set of data entries DERY0 to DERY3. In the 2-bit counter shown in FIG. 34, the count operation can be emulated using four data entries. For the MIMD instruction bits, a region of 6 bits is secured to successively execute the XOR operation, AND operation and XOR operation in correspondence to stages STG1 to STG3, respectively (the region for storing mask bit and the like is not shown).

In data entries DERY0-DERY3, operation instruction (control) bits M0 and M1 are set to "1, 0", and an XOR operation is designated. On the other hand, for the data stored in data entries DERY4 to DERY7, operation instruction (control) bits M0 and M1 are both set to "1", and an AND operation is designated.

First, the process of operation in data entries DERY0 to DERY3 will be described. In the region indicated by temporary address t3, the initial value of flip-flop FF1 is stored. As to flip-flop F0, the result of operation of stage STG1 differs dependent on the initial value, and the result of operation is stored in address pointer FF0. In FIG. 35, the bit value representing the result of operation at stage STG1 is stored at temporary address t1.

The bit value of temporary address t2 corresponds to the state before the rise of clock signal CLK, and it is a logical value before data storage to flip-flop FF0. Therefore, the bit value at the position of temporary address t2 and the value stored in flip-flop FF0 have opposite logical values.

At stage STG3, an XOR operation is performed on the bit value of temporary address t2 and the bit value stored in flip-flop FF1, and the result of operation is again stored in the bit position of flip-flop FF1.

Specifically, in data entries DERY0 to DERY3, as initial values of flip-flops FF1 and FF2, (0, 0), (0, 1), (1, 0) and (1, 1) are stored at pointer addresses FF0 and FF1. Before the rise of the clock signal CLK, in accordance with the values stored in flip-flop F0, the output value of XOR gate G10 is determined, the bit value of temporary address t1 is determined, and as the clock signal CLK rises, the value stored in flip-flop FF0 is determined by the output bit value of XOR gate G10.

At stage STG2, in accordance with the value stored in flip-flop FF0 before the rise of clock signal CLK, the output bit value of AND gate G11 is determined, and the bit value is stored at temporary address t2. Therefore, bit values of temporary addresses t2 and t1 have opposite logical values.

At stage STG3, in accordance with the output value of AND gate G11 and the value stored in flip-flop FF1, the output value of XOR gate G12 is determined. The output value of XOR gate G12 is stored in flip-flop FF1 in synchronization with the rise of clock signal CLK. FIG. 35 shows the state when the XOR operation has been done, before the rise of clock signal CLK, at stage STG3. Specifically, at temporary address t3, the value stored in flip-flop FF1 is set as the input bit value, the XOR operation is done on the bit values of temporary addresses t2 and t3, and the result of operation is stored at pointer address FF1, as the value stored in flip-flop FF1, at the completion of operations of stage STG3. At the time of this operation, the result of XOR operation is written (stored) in temporary address t3, and thereafter, the contents of temporary address t3 are written to the position of pointer address FF1. Thus, it follows that, in the subsequent processing, the value stored in flip-flop FF1 can always be set as the input bit to XOR gate g12, at the start of execution of stage STG3.

In the bit arrangements of data entries DERY4 to DERY7, the operation of stage STG2 is about to be executed. At stage STG2, MIMD instruction bits (control bits) M0 and M1 are both set to "1", and an AND operation is executed.

Here, at stage STG1, in accordance with the value stored in flip-flop F0, the logical value of its output bit (output bit of XOR gate) is determined. XOR gate G11 operates as an inverter, and at temporary address t1, an inverted value of the value of flip-flop FF0 is stored.

When the operation of stage STG2 is executed, data has not yet been written to flip-flop F0, and pointer addresses FF0 and FF1 of data entries DERY4 to DERY7 are shown maintaining the initial values of the 2-bit counter. Therefore, the bit value of temporary address t2 of stage STG2 is equal to the logical value of the bit stored in flip-flop FF0 (the input signal IN has the logical value "1").

At stage STG2, a logical product operation (AND operation) on the value stored in flip-flop FF0 and the bit at the bit position of address pointer ap is executed in each entry.

As shown in FIG. 35, by preparing logic operations as the MIMD type operation instructions, each entry executes an operation individually, and it becomes possible to emulate a sequential circuit.

Further, by repeatedly executing the operations, in data entries DERY0 to DERY7, the states of flip-flops FF0 and FF1 can be stored at pointer addresses FF0 and FF1, and thus, the state of flip-flops can be represented.

As described above, by adding the MIMD instruction register and a decoder in the ALU processing element, it becomes possible to have a parallel processing device of an SIMD type architecture operate as an MIMD type processing device. Consequently, it becomes possible to execute different instructions in different entries at one time, and the process time can be reduced.

Further, by the MIMD instruction register and decoder, it becomes possible to achieve emulation of a logic circuit on the parallel processing device. Specifically, a NOT element (1-input, 1-output), an AND element (2-input, 1-output), an OR element (2-input, 1-output) and an XOR element (2-input, 1-output) constitute a complete logic system, and therefore, every combination circuit can be represented. Further, by preparing a region for holding data in the data entry, a sequential circuit such as a flip-flop or a latch can also be represented. Thus, every hardware circuit can be implemented by the parallel processing device in accordance with the present invention. Thus, in the parallel processing device, a software executing portion in accordance with the SIMD instruction and a hardware executing portion utilizing logic circuits can be provided together, and as a result, a processing device of very high versatility can be realized.

Further, when the 2-bit counter shown in FIG. 33 or 34 is formed by hardware circuitry, flip-flop FF0 experiences a gate delay of one stage while flip-flop FF1 experiences a gate delay of two stages. Therefore, in order to adjust operation timing in synchronization with the clock signal, it is necessary to set timings in consideration of delays of two stages of gates G11 and G12. This means that the operation margin of the clock signal must be enlarged, which makes it difficult to increase the speed of clock signal. In the parallel processing device, however, operation process is done in each stage, and the cycle of each stage is defined by the clock signal (clock signal of the parallel processing device). The result of operation of each execution stage and the input can be read from memory cells at an arbitrary timing. Therefore, in the 2-bit counter, the critical path of the first stage flip-flop is the gate delay of one stage, and that of the second stage flip-flop is the gate delay of two stages. For each flip-flop, the critical path can be changed. Therefore, timing adjustment between flip-flops becomes unnecessary, and correct operation processing and high speed operation can be realized.

Further, as the MIMD operation is made possible, dependency on the degree of parallelism of processes can be reduced, so that the parallel processing device (MTX) comes to have wider applications. As a result, operations that were conventionally handled by host CPU can be closed within the parallel processing device (MTX), and therefore, the time necessary for data transfer between the CPU and the parallel processing device (MTX) can be reduced. Thus, the process performance of the overall system can be improved.

Further, data processing can be set by the entry unit in a reconfigurable manner, so that complicated data transfer (vertical movement; data movement between entries) can be controlled more flexibly, and high speed data transfer becomes possible.

FIG. 36 shows, in a list, the number of cycles necessary for data movement in accordance with vertical movement instruction "vcopy" (same as the "move" instruction) used in the conventional semiconductor parallel processing device (MTX), and in accordance with the circuit for communication between entries (RECM: Reconfigurable Entry Communicator) in accordance with Embodiment 1 of the presents invention. In the table of FIG. 36, a parallel processing device (MTX) approach simulator, version 0.03.01 was used, and a 2-bit ALU performing 2-bit unit operation was used as a model. For the RECM, calculation of cycles in the approach simulator version 0.03.01 was used to be formed into a library.

In FIG. 36, cycle numbers necessary for the amounts of data movement of 1 bit 2 bits, 4 bits, 8 bits, 16 bits, 32 bits, 64 bits, 128 bits, 256 bits, 512 bits and 1024 bits are listed. When the vertical movement instruction "vcopy" (=move) is used, data movement in one direction is set commonly for all data entries. Here, 16 bits of data are moved 2-bits by 2-bits. For the transfer of data bits, 8 cycles are necessary. Further, cycles necessary for data movement including load and store of transfer data are set in advance by the approach simulator.

When the entry communication is done using the RECM, as shown in FIG. 36, it is necessary to store communication control data E0 to E3 in the communication control register (RECM register). Therefore, the number of cycles for the movement becomes longer by the number of cycles (3 cycles in FIG. 36) for this operation. When the amount of data movement is a basic amount of movement, the necessary cycle number is 26 cycles when the vertical movement instruction is executed, and when the movement of the same distance is repeated, the number of cycles necessary for data communication becomes longer by 8 cycles.

Therefore, when communication with entries at the same distance is to be done, as in the case of simultaneous movement using the vertical copy instruction "vcopy" with all entries being at the same distance, the operation would be slower if the data movement to individual entry is executed using RECM. Further, for each entry, the control data for setting the amount of data movement must be stored in the data entry, and therefore, the region for storing the communication control data must be provided in the memory mat.

When entries communicate with entries of different distances, however, the communication control can be realized for each entry, and hence, the process can be completed in smaller number of cycles. The reason for this is as follows. When the communication distance (data movement distance) differs from entry to entry, according to the conventional method, it is necessary to execute selective movement using the vertical movement instruction "vcopy" and the mask bit of the mask register (V register). Therefore, it is necessary to repeatedly execute data movement for each data movement amount, and hence, the process takes long time. When communication is controlled using the RECM register, however, communication distance of each entry can be selected in one communication, and hence, the data movement process can be completed in a shorter time. By way of example, when data movement such as shown in FIG. 26 is to be done, there are five different amounts of data movement. Therefore, it is necessary to execute the data transfer instruction five times if the vertical movement instruction "vcopy" or the moving instruction "move" is used. According to Embodiment 1 of the present invention, however, data movement can be completed by one data communication with the amount of movement set for each entry, so that the time of data transfer can be reduced.

Further, as the interconnection lines for data movement, conventionally used interconnection lines for executing the movement instruction "vcopy" or "move" in the conventional parallel processing device can directly be applied. Therefore, the number of cycles required for data movement can be reduced without increasing the area for interconnection lines. In the following, specific data movement processes will be described.

[Gather Process]

Figures 37, 38:
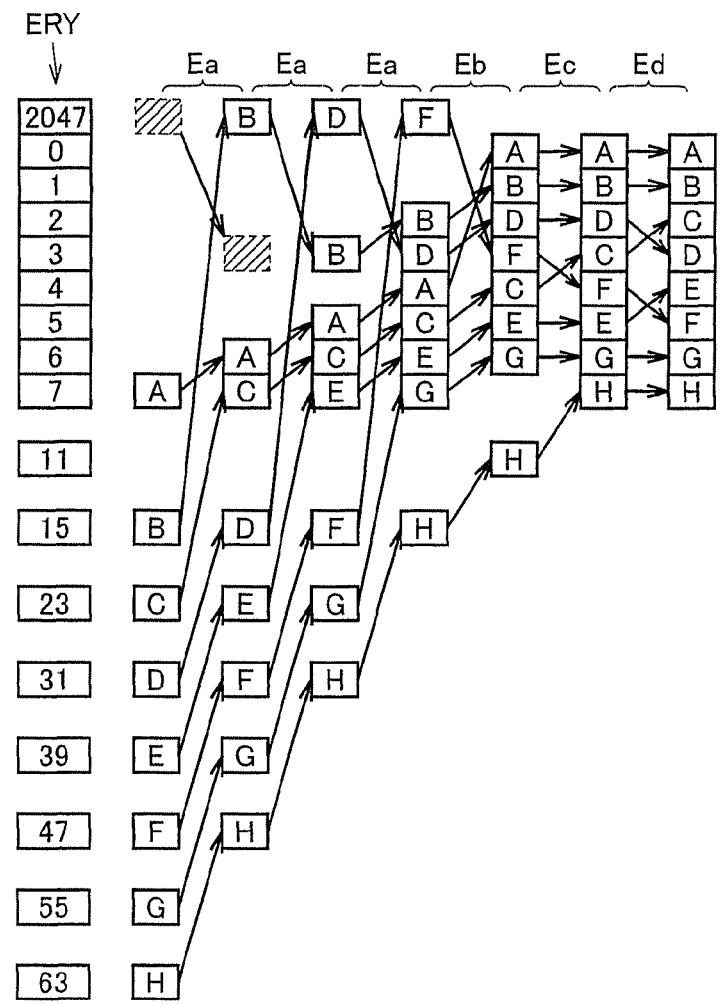
FIG. 37 shows data flow in a gather process in accordance with Embodiment 1 of the present invention.
FIG. 38 shows, in a list, the number of entries, the number of necessary cycles and the bit width of control storage region, for the gather process shown in FIG. 37.

The gather process refers to a data moving process in which data at every 8 entries are collected, and the collected entry data are arranged in order from the first of the entries. Generally, this process is performed in image processing to introduce fluctuating noise (analog-like noise) at a boundary region, thereby to make smooth tone change at the boundary region. FIG. 37 shows a flow of data movement when this process is executed on 64 entries.

In FIG. 37, 2048 entries are prepared as entries in the memory cell mat. Contents A to H of entries ERY7, ERY15, ERY23, ERY31, ERY39, ERY47, ERY55 and ERY63 are taken out, and arranged in order, starting from entry 0. In the gather process shown in FIG. 37, the following process steps are executed.

Step 1: First, data (E0-E3) for controlling data movement are stored in the control data storage region of the data entry. Here, a data storage region in the entry is set commonly in each entry, in accordance with a pointer.

Step 2: From the data entry, the data E for controlling data movement is stored in the corresponding RECM register (movement data register), in accordance with the amount of data movement As shown in FIG. 37, when the data Ea for controlling data movement is used a plurality of times successively, it is initially set once at the time of moving communication data, and then, data movement between entries is executed repeatedly.

Step 3: Then, in accordance with the value E (E0-E3) stored in the RECM register, the distance and direction of movement are set for each entry, and the data are moved.

Referring to FIG. 37, first, in accordance with the group of data Ea for controlling movement, data B of entry ERY15 is transferred to entry ERY2047. Entry ERY7 is shifted downward by 1 bit. Data C of entry ERY23 is transferred to entry ERY7 (moved by −16 bits). Remaining entry data D-H are each moved by −16 bits, and the entry positions of each of the data D-H is shifted to a direction smaller by 16 bits (down shift operation).

Next, in each entry, the same moving instruction is executed. The data stored in entry ERY15 is transferred to entry ERY2047, and data of entry ERY7 is down-shifted by 1 bit. In entry ERY23, a −16 bit shift is performed, and in other entries ERY23, ERY31, ERY39 and ERY47, similar shift operation is performed. At this time, data B of entry ERY2047 is transferred to entry ERY3 (4-bit up-shift).

Again in the next cycle, data movement is performed in accordance with the group of control data Ea, so that data B, D, A, C, E and G are stored in entries ERY2 to ERY7, and data H is stored in entry ERY15.

Step 4: Then, the pointer is moved and the next movement control data is stored in the corresponding RECM register. In accordance with the group of movement control data Eb, data are moved. Specifically, a 4-bit up-shift operation is performed on the data of entry ERY2047, a 4-bit down-shift operation is performed on data A of entry ERY4, a 1-bit down-shift operation is performed on remaining entries ERY2, ERY3, ERY5-ERY7, and a 4-bit down-shift operation is performed on entry ERY15.

Step 5: The pointer is updated and the next movement control data is stored in the corresponding RECM register. The transfer data is stored in the X/XH register, and data are moved in accordance with the control data Ec. This moving operation is executed repeatedly on the transfer data bits. By this process, in ERY3 and ERY4, 1-bit up-shift and down-shift are performed, and the data are stored and exchanged. The data of entry ERY11 is stored, by 4-bit shift, in entry ERY7.

Step 6: last group of movement control data is stored in the corresponding RECM register, and the amount of movement is set for each entry. The transfer data is stored in the X/XH register, and data are moved in accordance with the control data group Ed. In this process, contents of entries ERY2 and ERY3, and contents of entries ERY4 and ERY5, are exchanged in accordance with the control data group Ed, Thus, data A-H come to be successively stored from entry ERY0 to ERY7.

Therefore, by individual moving operations, such gather process can also be achieved, and high speed processing becomes possible.

In the data moving flow shown in FIG. 37, there are entries on which data movement is performed and not performed, in accordance with the movement control data Ea. Whether data movement is to be executed or not can be set by the mask bit, and the mask bit may be set/cleared for each moving operation. Further, at this time, once the mask bit is set and the moving operation is done on the entry, unnecessary transfer data can be rewritten by data transferred in a subsequent cycle, as shown by hatched blocks in FIG. 37. Thus, even when the mask bit is set to the same state for the same group of movement control data, there is no particular problem as long as the data can be rewritten by the transfer data of a later cycle.

FIG. 38 shows, in a list, relation between the number of entries, necessary number of cycles and the control bits when the gather process shown in FIG. 37 is performed on 16-bit data. The V flag represents a mask bit stored in the mask register (V register). The control bit represents the number of data (E0-E3) that determine the transfer destination/amount of movement when the zigzag copy mode is executed. Here, the region for storing initial data is not shown. The relation between the number of entries and the number of execution cycles shown in FIG. 38 is also obtained utilizing the cycle number calculation of simulator version 0.03.01 described above.

The example of 64 entries shown in FIG. 38 corresponds to the operation of FIG. 37. As for the control bits, there are four different moving instructions, and they are 16 bits in total, and in order to stop data transfer of regions (entries) unrelated to the data transfer, a mask flag is used. Therefore, a 4-bit mask flag is used for each case, and the number of control bits becomes larger by the number of mask bits, than the moving instruction used for each movement.

Figure 39:
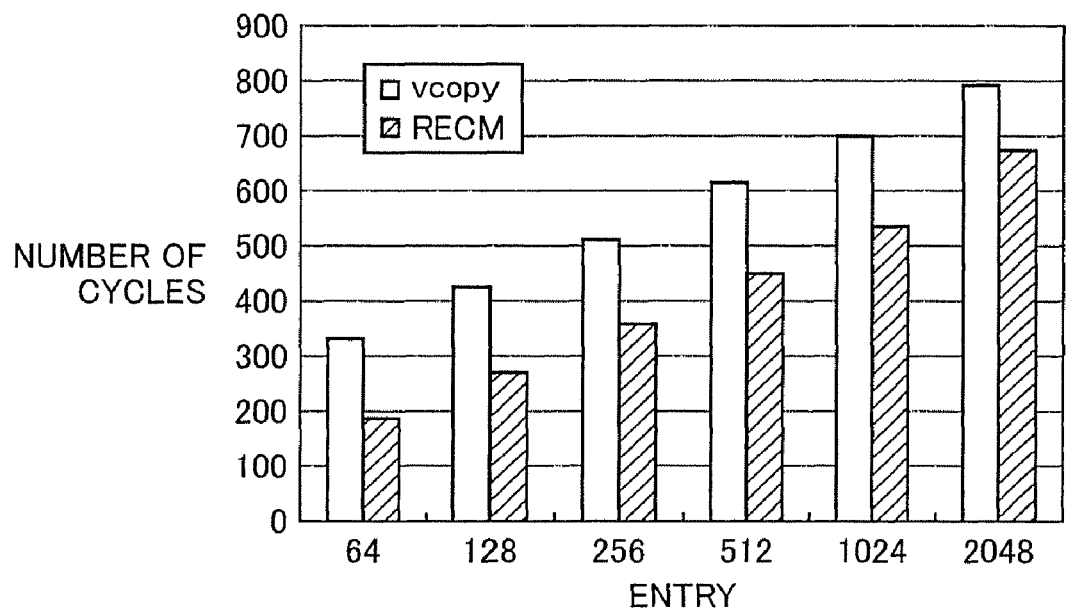
FIG. 39 shows, in a graph, the number of entries and the number of cycles shown in the table of FIG. 38.

FIG. 39 shows the relation between the number of entries and the number of cycles in the gather process shown in FIG. 38. In FIG. 39, the abscissa represents the number of entries and the ordinate represents the number of cycles. As can be seen from FIG. 39, as the number of entries increases, the number of necessary cycles naturally increases. When data movement is performed individually for each entry using the RECM register, however, the number of cycles is smaller than in the configuration in which movement in the same direction is done in each entry in accordance with the vertical movement instruction "vcopy" or "move".

Figure 40:
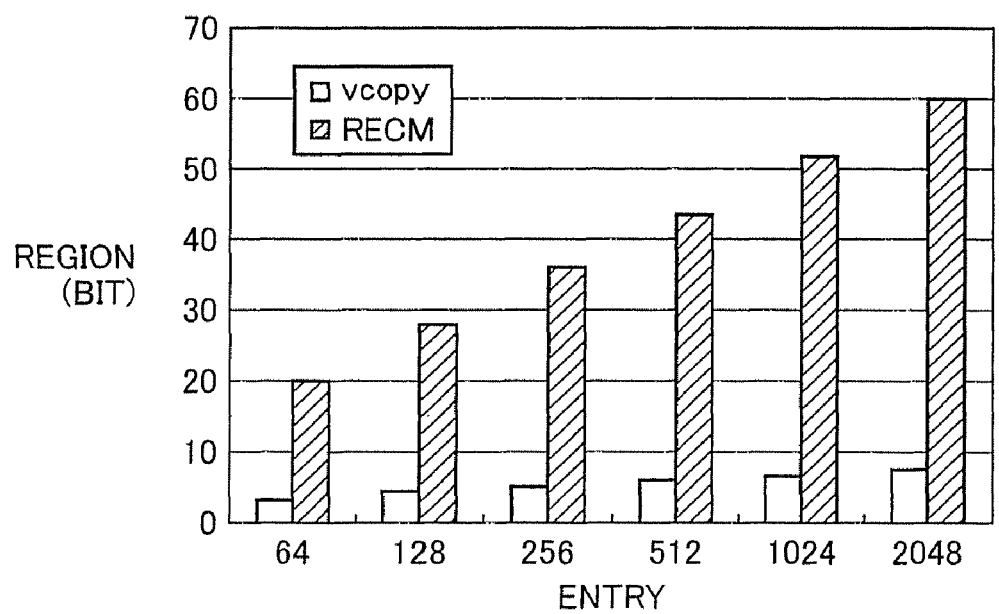
FIG. 40 shows, in a graph, the number of entries and the control bit width shown in the table of FIG. 38.

FIG. 40 represents the number of entries and the bit width of the region occupied by control bits, in the gather process shown in FIG. 38. In FIG. 40, the abscissa represents the number of entries, and the ordinate represents the bit width of control data storing region. Referring to FIG. 40, when data movement is performed by setting the amount of data movement in the entry unit using the RECM register, it is necessary to store the movement control data for each entry, and hence, the bit width of the region for storing the control bits significantly increases relative to the bit width of the region storing the mask bit (V flag) when the common vertical movement instruction "vcopy" is used. The transfer data, however, contains 16 bits, and the bit width of one entry is sufficiently wide (the width corresponds to the number of memory cells of one bit line pair, and corresponds to the number of word lines). Therefore, there is sufficient margin for providing the region for storing the control bits.

[De-Interleave Process]

De-interleave process refers to a process for moving data strings aligned in the vertical direction of entries such that data of even-numbered entries are stored in upper half area of the entry group and data of odd-numbered entries are stored in lower half area of the entry group.

Figure 41:
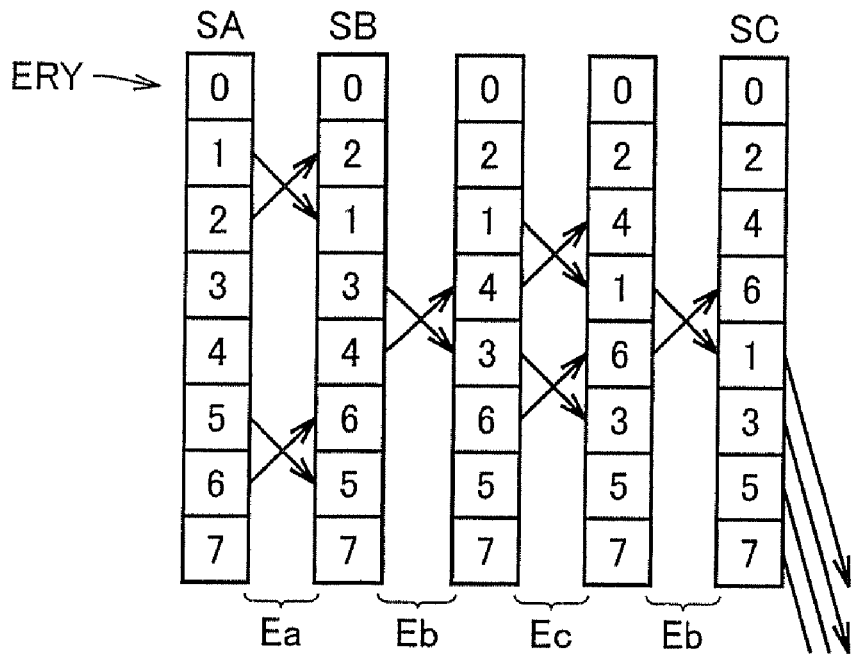
FIG. 41 shows data flow at the time of de-interleave process in the device in accordance with Embodiment 1 of the present invention.

FIG. 41 shows data flow in the de-interleave process in the parallel processing device in accordance with Embodiment 1 of the present invention. Referring to FIG. 41, a state SA represents the initial state of data stored in the entry ERY, and a state SB represents the state at the end of processing 4 entries. A state SC represents a state at the completion of de-interleave process, when there are 8 entries ERY.

As shown in FIG. 41, data are moved successively, using movement control data groups Ea-Ec, and contents of even-numbered entries and odd-numbered entries are exchanged for each of the entries, whereby the data of even-numbered entries and the data of odd-numbered entries can be classified.

Figure 42:
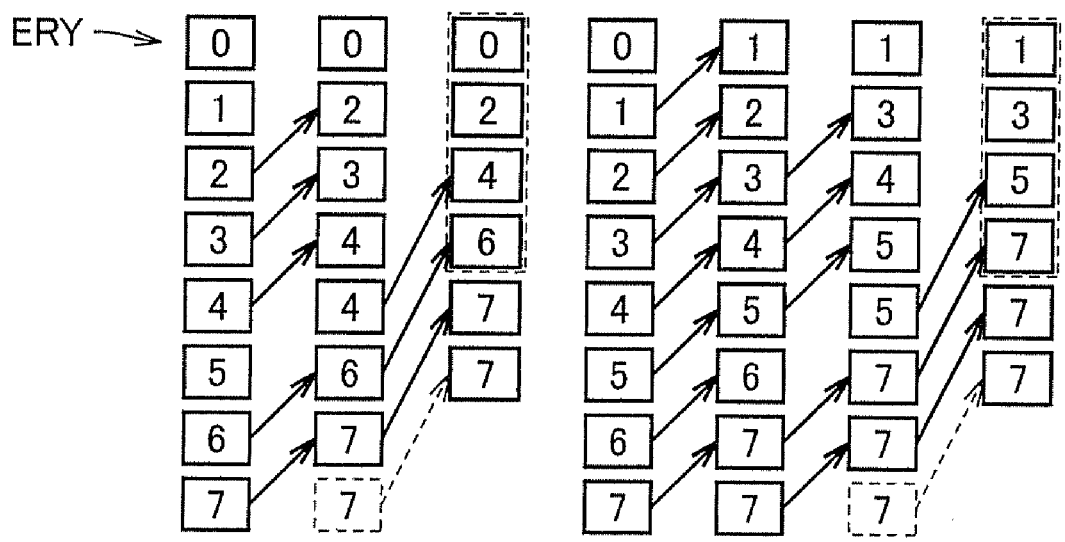
FIG. 42 schematically shows data flow in de-interleave process utilizing a vertical movement instruction.

FIG. 42 shows a process procedure when the moving operation is performed in accordance with the common copy instruction (vertical movement instruction) "vcopy" of the SIMD type movement instruction. Here, the data of respective entries must be moved in the same direction by the same amount, and therefore, the process is executed, separately for data movement of even-numbered entries and for data movement of odd-numbered entries. As shown in FIG. 42, when the data are moved using the vertical copy instruction "vcopy", the original data (initial data) must be divided into even-numbered entries and odd-numbered entries for classification, and hence, the data must be held in each of the entries ERY0 to ERY7. Therefore, the transfer data are held in a temporary region, and the data held in the temporary region are transferred successively. At the time of this transfer, it is again necessary to transfer data separately for data of even-numbered entries and for data of odd-numbered entries. Accordingly, the temporary region must have a region for transferring data of odd-columns and a region for transferring data of even-columns, and thus, the temporary region having double the bit width of transfer data must be provided.

Figures 43, 44:
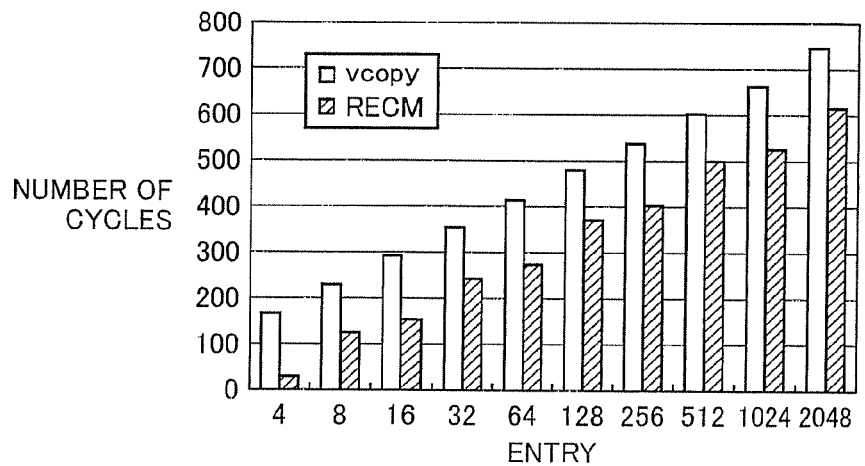
FIG. 43 shows, in a list, the number of entries, the number of cycles and the bit width of operation control memory regions in de-interleave process shown in FIGS. 41 and 42.
FIG. 44 is a graph showing the number of entries and the number of cycles shown in the table of FIG. 43.

FIG. 43 shows, in a list, the number of entries, the bit width of data storage region and the number of transfer cycles when 16-bit data are processed in the de-interleave process shown in FIGS. 41 and 42. The number of cycles shown in FIG. 43 is also obtained using the RECM simulator version 0.03.01 described above, for the data transfer of 2-bit unit.

When the number of entries is 4, what occurs is simply a transition from initial state SA to state SB, as shown in FIG. 41. Therefore, only the movement control data Ea is used as the control bits Accordingly, when the RECM is used, 4 bits of the instruction Ea are necessary as the control bits (the mask bit is not shown, a 0-bit shift may be executed as the data movement, and in that case, the mask bit is unnecessary).

In the RECM, a cycle for setting the movement control data to the RECM register becomes necessary, and at the time of data transfer on 2-bit unit, cycles for storing the transfer data in the X/XH register, data transfer, and for writing the transfer data and the like at the transfer destination are required. Even when the number of entries is 4, 33 cycles are necessary for data movement. When the number of entries is 4 and the vertical copy instruction "vcopy" is used, it is necessary to use 2 bits of mask flag to inhibit transfer when data of even-numbered rows are transferred and data of odd-numbered rows are transferred. Further, in each movement data must be transferred by the same amount of data, and therefore, the number of cycles significantly increases to 172 cycles.

Figure 45:
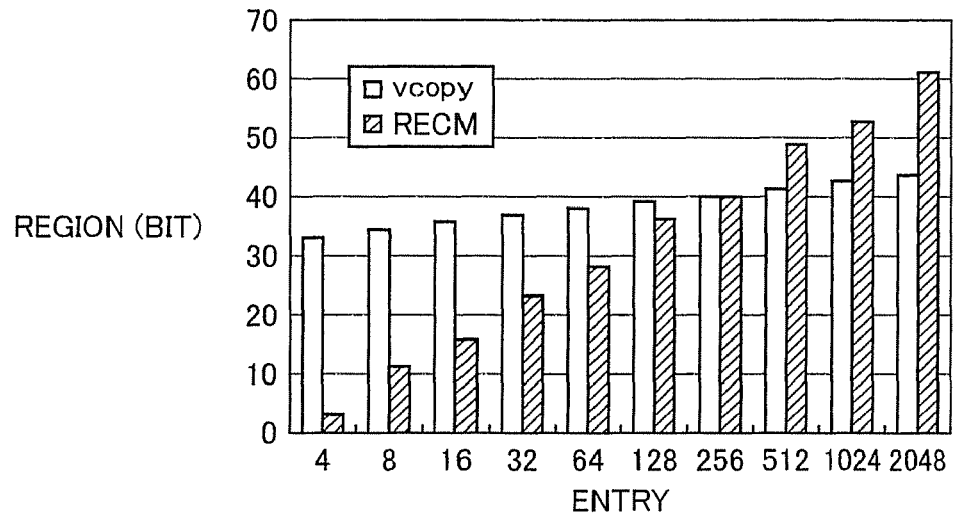
FIG. 45 is a graph showing the number of entries and the bit width of operation control memory regions shown in the table of FIG. 43.

FIG. 44 is a graph representing the relation between the number of entries and the number of cycles, of the comparison table of de-interleave process shown in FIG. 43. FIG. 45 shows the number of entries and the width of control bits, of the table shown in FIG. 43. In FIG. 44, the abscissa represents the number of entries and the ordinate represents the number of cycles. In FIG. 45, the abscissa represents the number of entries and the ordinate represents mask/control bit width.

As can be seen from FIG. 44, by moving data using the RECM register, high-speed data movement becomes possible. Further, as can be seen in FIG. 45, if the number of data movement entries is small, the region used in the memory mat can be reduced. Here, it is unnecessary to provide a temporary region for storing data of even-numbered rows of entries and data of odd-numbered rows of entries, and the moved data can directly be written to positions indicated by the original address pointers. Therefore, though the bit width of control bits increases when the RECM is used, the temporary region can be eliminated, and the bit width of the region used in the memory mat for data movement can be made comparable to or smaller than when the vertical movement instruction is executed.

[Anti-Aliasing Process]

An alias generally refers to an imaginary data not included in the original data. The anti-aliasing process is to remove or avoid the alias component. In the field of image processing, the anti-aliasing process means removal of jaggies (jaggy or stepwise portions along the pixels of the figure) of generated figures. The anti-aliasing process includes an operation of calculating a mean value among pixels of the region of interest. The aliasing process is for exchanging, among data aligned in vertical directions over entries, data of a prescribed range.

Figure 46:
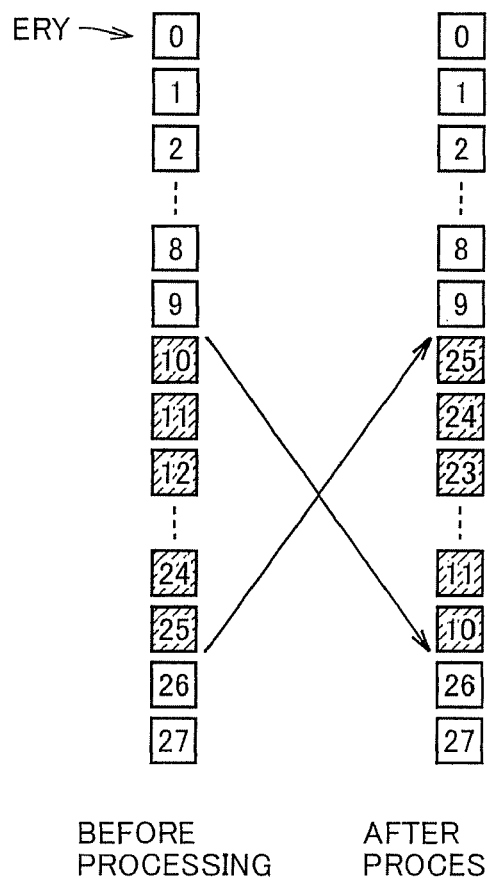
FIG. 46 shows a data flow in an anti-aliasing process.

FIG. 46 shows an example of exchange of data arrangement in the aliasing process. Referring to FIG. 46, data of entries ERY10 to ERY25 are sorted in the vertical direction, to be arranged in the order of original data stored in entries ERY25 to ERY10.

Figures 47, 48:
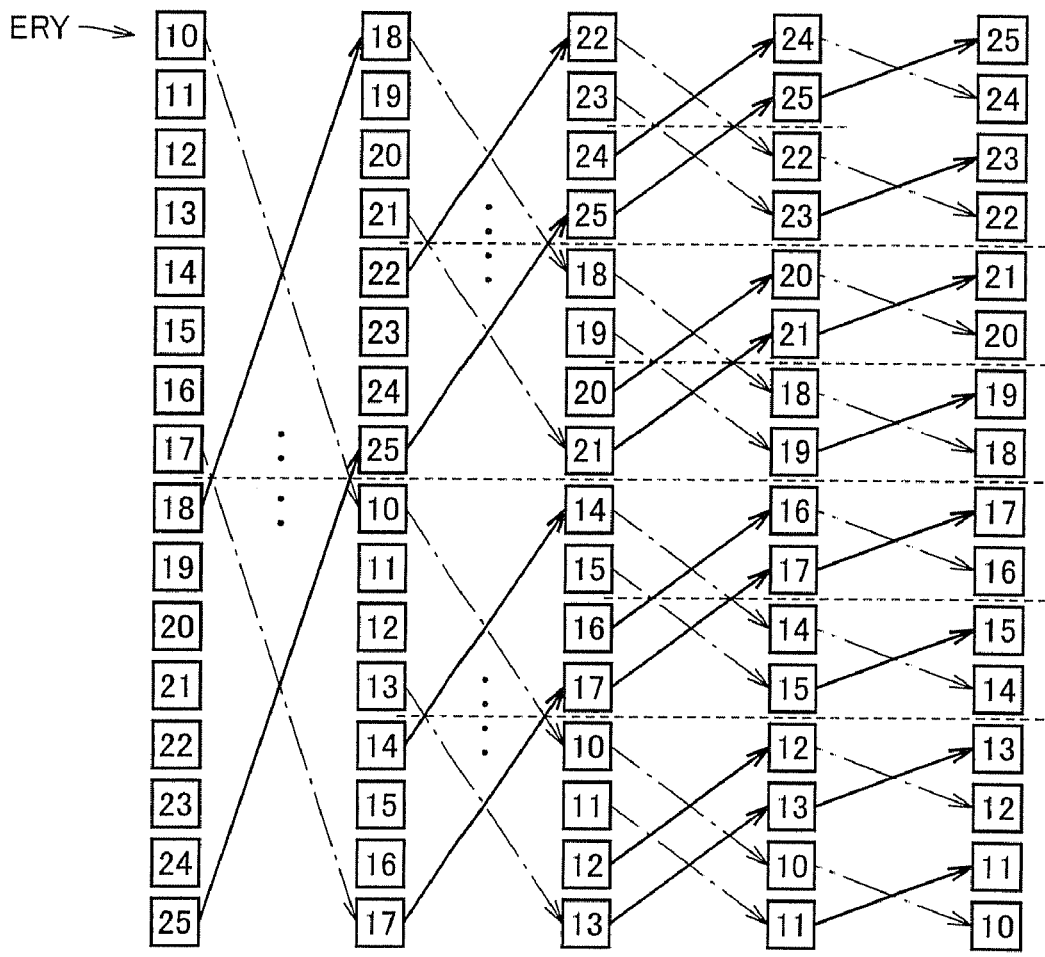
FIG. 47 shows an exemplary data flow in an aliasing process, during the anti-aliasing process shown in FIG. 46.
FIG. 48 shows, in a list, the number of cycles and the bit width of operation control memory regions at the time of alias processing of 32-bit data.

FIG. 47 schematically shows the data flow when the data are vertically moved at the time of data arrangement exchange in the alias process. Referring to FIG. 47, first, a process of moving data of upper or lower 8 entries among 16 entries is executed, and then, data transfer of the remaining 8 entries is executed. Here, by successively reducing the amount of data transfer from 8, 4, 2 to 1, sorting of data can be realized. In Embodiment 1, however, the basic amounts of data transfer are ±1, ±4 and ±16, and therefore, communication with a position away by 8 entries require execution of 4-bit shift operation twice. For a 2-bit shift operation, an 1-bit shift operation must continuously be repeated twice At the time of this data transfer operation, as an example, execution of a +shift instruction represented by a solid line, and a −shift operation represented by a chain-dotted line, are executed alternately. When the regions for data holding and for data movement collide, correct data transfer becomes impossible. Therefore, a temporary region is necessary to hold the intermediate data. As the transfer takes place twice, two temporary data regions for +shift and −shift operations are necessary.

Further, data transfer is performed in entries ERY10 to ERY25, while data movement is not performed in other entries. Therefore, it is necessary to mask data transfer using the mask bit. Further, a mask is necessary also when the +shift and −shift are performed alternately.

FIG. 48 shows a result of simulation when the alias process of 32 bit data shown in FIG. 47 was executed. As the simulator, approach version 0.03.01 was used, and in the simulator, a cycle number calculation simulator provided as a library is utilized. When 32-bit data are to be moved using the vertical movement instruction "vcopy", 613 cycles are necessary, a region of 8 bits is necessary as the mask bit pattern storing region, and bit width for two data, that is, 64 bits, is necessary for storing temporary bits. When the RECM register is used, the necessary number of cycles is 442, and 16 bits are used as control bits. Specifically, it is necessary to execute the movement instruction four times (as the amount of movement is limited to 1, 4 and 16).

Therefore, as can be seen from the table of FIG. 48, data communication using the RECM register requires smaller number of cycles, and higher speed of operation can be realized.

Further, when the RECM register is used, the contents of from entries ERY0 to ERY25 can be moved entirely, and therefore, the temporary region becomes unnecessary. Thus, the width of memory mat region used for data communication can be reduced.

Provision of the RECM register using data movement communication circuitry attains the following effects. Specifically, when the vertical movement instruction "vcopy" or "move" is used that instructs simultaneous movement, data can be moved only between entries of the same distance at one time. Therefore, when data movement over different distance entry by entry is necessary, movement between entries must be repeated a number of times in accordance with the amount of data movement. When the inter-ALU data communication circuit (RECM register) in accordance with Embodiment 1 of the present invention is used, however, the distance of data movement between entries can be set and the data can be moved, entry by entry in a programmable manner. Consequently, high-speed data movement between entries becomes possible. Further, dependent on the amount of data movement, data can be moved over desired, different distances for each entry, simply by once executing the data movement instruction.

Further, by simply switching the selection signal of a multiplexer for data movement between entries to a control signal of an RECM register (including a decode circuit) from the overall control (control by controller 21 (see FIG. 1)) of the parallel processing device (main processing circuitry), data transfer on entry unit can be controlled, and addition of new interconnection resources is unnecessary.

Embodiment 2

Figure 49:
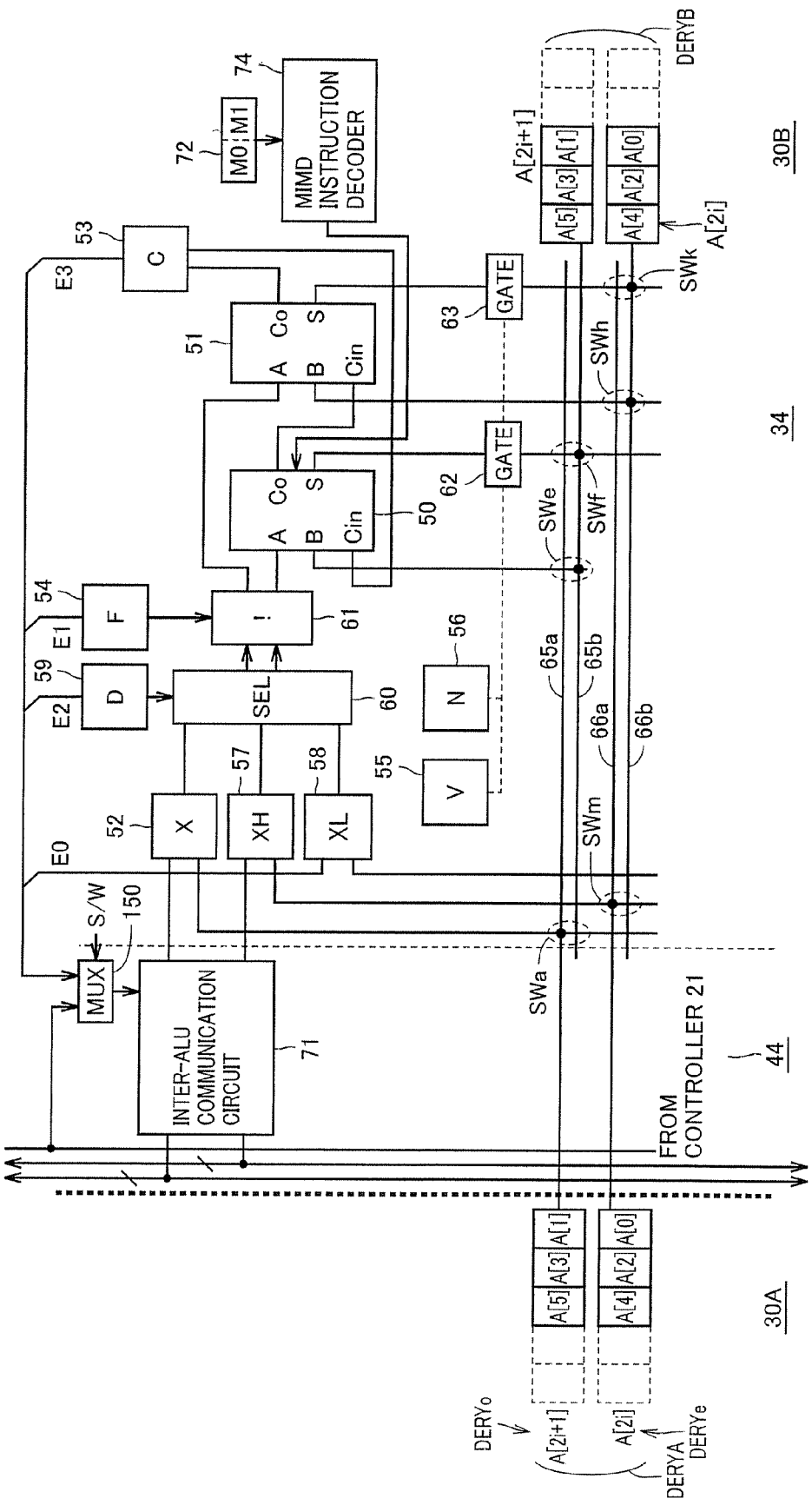
FIG. 49 schematically shows a configuration of an ALU processing element in accordance with Embodiment 2 of the present invention.

FIG. 49 schematically shows a configuration of an ALU processing element in accordance with Embodiment 2 of the present invention. The configuration of ALU processing element shown in FIG. 49 differs from that of ALU processing element in accordance with Embodiment 1 shown in FIG. 1 in the following point. Specifically, C register 53, F register 54, D register 59 and XL register 58 are used as registers for storing movement control data E0 to E3. In other words, in place of MIMD instruction register (RECM register) 70, operation registers provided in ALU processing element 34 are used. In data movement, an arithmetic operation or a logic operation is not executed, and therefore, XL register 58, D register 59, C register 53 and F register 54 are not used In the data movement operation, these unused registers are utilized as registers for storing movement control data, and hence it becomes unnecessary to provide an MIMD instruction register (RECM register) for this purpose only, and thus, the area occupied by the inter-ALU connecting switch circuit can be reduced.

Except for this point, the configuration of ALU processing element shown in FIG. 49 is the same as that of ALU processing element shown in FIG. 10, and therefore, corresponding portions are denoted by the same reference characters and detailed description thereof will not be repeated. It is noted, however, that in FIG. 49, a multiplexer (MUX) 150 is shown as an example, for switching a path of movement control between an operation of SIMD type architecture and an operation of MIMD type architecture. Multiplexer 150 selects, in accordance with the mode control signal S/M switching between execution of an SIMD instruction and an MIMD instruction, one of the control signal from controller 21 and the control instruction bits E0-E3 from these registers. The mode control signal is generated by controller 21 in accordance with a result of determination as to whether the instruction is an MIMD type movement instruction or not when the movement instruction is to be executed (when the MIMD type movement instruction is to be executed, the mode control signal S/M is set to a state for selecting the movement control data from the registers).

By way of example, in FIG. 49, control bit E3 is stored in C register 53, control bit E1 is stored in F register 54, E0 is stored in XL register 58, and control bit E2 is stored in D register 59. Other combination of control bits may be stored in these registers 53, 54, 58 and 59.

As the instruction for transferring (loading) the movement amount data to these registers 53, 54, 59 and 58, the load instructions shown in the list of instructions described previously may be utilized, and thus, the movement amount data can be stored in these registers.

As described above, according to Embodiment 2 of the present invention, as the registers for storing movement data, registers not used at the time of data moving operation among the registers provided in the ALU processing unit are used. Thus, the area of occupation by the circuitry for inter-ALU movement can be reduced. Further, when the movement data are stored, the movement control data can be stored using the register load instruction for an SIMD operation, and therefore, program description for data movement control is easy.

Embodiment 3

Figure 50:
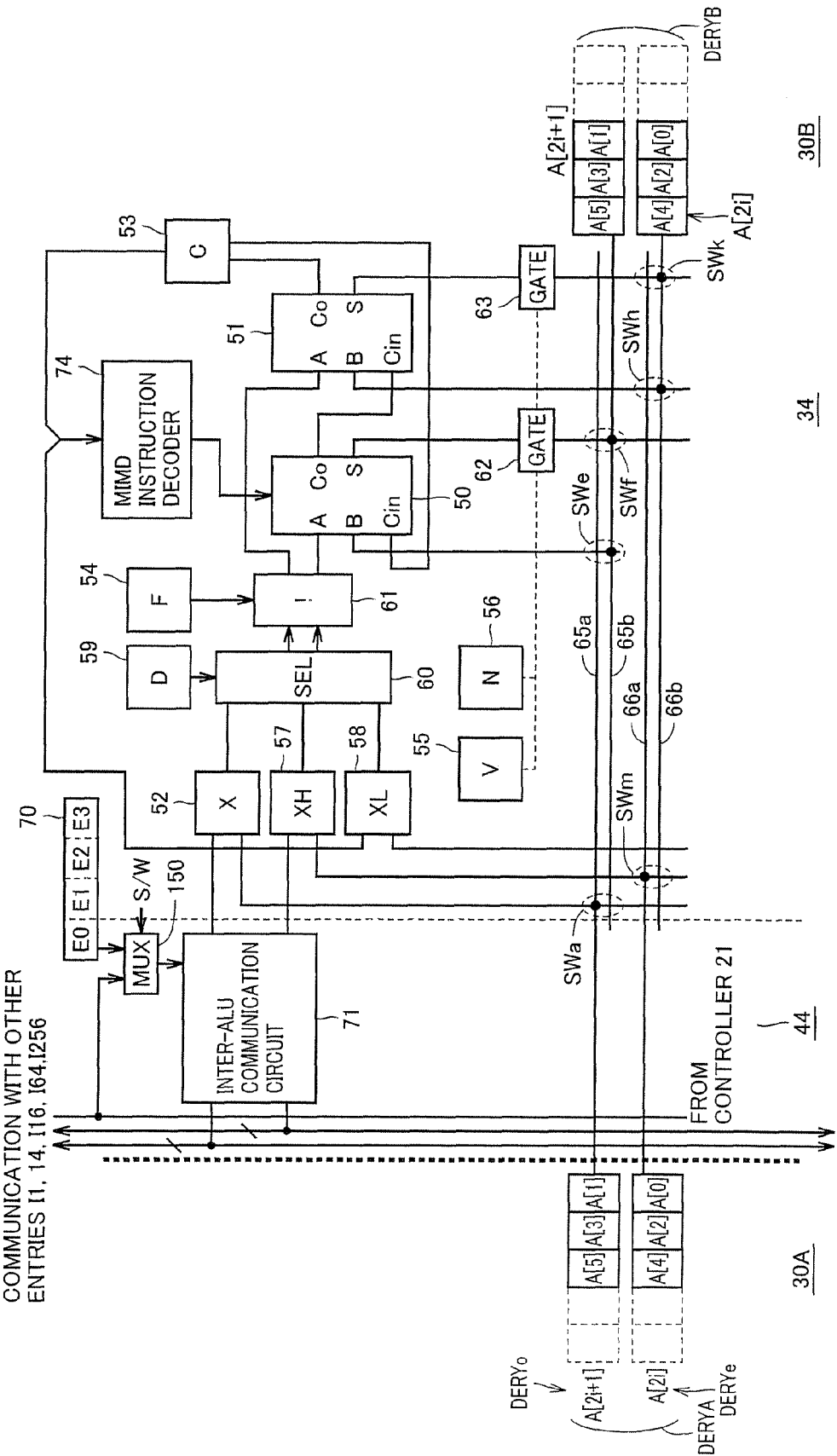
FIG. 50 schematically shows a configuration of an ALU processing element in accordance with Embodiment 3 of the present invention.

FIG. 50 schematically shows a configuration of the ALU processing element according to Embodiment 3 of the present invention. The ALU processing element shown in FIG. 50 differs from ALU processing element according to Embodiment 1 in the following point. Specifically, as the registers for applying the MIMD instruction to MIMD instruction decoder 74, C register 53 and XL register 58 are used. Except for this point, the configuration of the ALU processing element shown in FIG. 50 is the same as that of the ALU processing element shown in FIG. 10 and therefore, corresponding portions are denoted by the same reference characters and detailed description thereof will not be repeated.

It is noted, however, that in the configuration shown in FIG. 50 also, multiplexer 150 is provided for inter-ALU communication circuit (RECM) 71, for setting the connection path of inter-ALU communication circuit 71 by switching between the bits E0-E3 from data register (RECM register) 70 and the control signal from controller 21, in accordance with the mode control signal S/M.

In the configuration of ALU processing element 34 shown in FIG. 50, a register used only for storing the MIMD instruction becomes unnecessary, and hence, layout area of the ALU processing element can be reduced. When registers 53 and 58 are used as the MIMD instruction registers as shown in FIG. 50, instructions for executing the MIMD) operation is described as follows.

```
MTX_MIMD(as, bs, cs, bit_count)
0: ptr.set#cs, p1;
1: men.ldC@p1++:
2: men.ldXL@p1;
3: ptr.set#as, p2; ptr. set#bs, p3;
4: for(i = 0; i < bit_count; i++) {
5: men.ldX@p2++;
6: alu.op.mimd@p3++;
7: }
```

In the operation description, by the instruction of line number 0, the pointer of pointer register p1 is set as the initial value cs of pointer cs.

By the instruction of line number 1, the bit of the position designated by the pointer of pointer register p1 is loaded to the C register, and the count value of pointer register p1 is incremented by 1.

By the instruction of line number 2, the data bit at the bit position designated by pointer register p1 is loaded to the XL register.

In accordance with the instruction of line number 3, the pointer of pointer register p2 is set as the initial value as of address pointer ap, and the value designated by the pointer of pointer register p3 is set as the initial value bp of address pointer bp.

By the "for" sentence of line number 4, the range of variation of "i" is set within the range of 0 to bit width bit_count, and at each operation, the value i is incremented.

By the instruction of line number 5, the bit at the position designated by the pointer of pointer register p2 is loaded to the X register, and then, the pointer of pointer register 2 is incremented.

By the instruction of line number 6, on the data bit at the position designated by the pointer of pointer register p3 and the data of X register, the designated MIMD operation instruction "alu. op, mimd" is executed in accordance with the bits stored in the C register and XL register 58, and the result of execution is again stored at the bit position designated by the pointer of pointer register p3.

Line number 7 indicates the end of the instruction sequence.

Therefore, when the MIMD operation is executed, by the C register 53 and the XL register 58, operation instructions (control bits) M0 and M1 are stored, the data bit as the operation target is transferred, and an operation with the bit at the position designated by the pointer of pointer register p3 is executed. Here, when the operation of 1-bit basis is executed, a logic operation is executed using the X and XH registers When the operation of 1-bit basis is executed, the data at the bit position designated by the pointer of pointer register p3 is transferred to the XH register, and the operation is executed. When a negation instruction NOT is to be executed, an inverting operation is executed on the bit value of a predetermined register, among the bits stored in the XL and XH registers.

In this manner, by utilizing an instruction of a common SIMD type architecture, it is possible to set an MIMD instruction in the registers of each ALU processing element and to execute the operation process.

As described above, in accordance with Embodiment 3 of the present invention, as the registers for storing the MIMD instruction, registers for storing operational data of the ALU processing element are used, so that a dedicated MIMD operation instruction register becomes unnecessary. Thus, the area occupied by the ALU processing element can be reduced.

Embodiment 4

Figure 51:
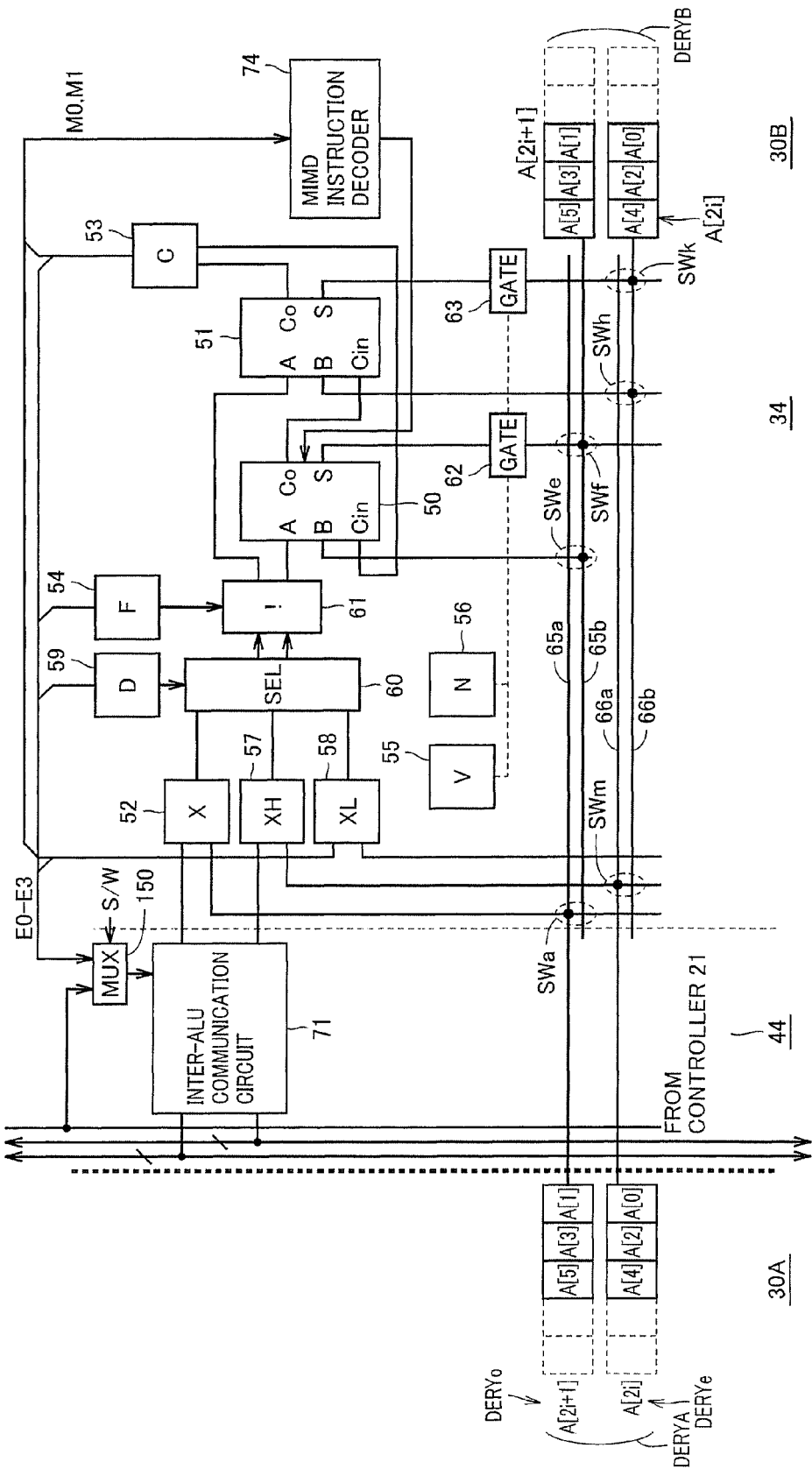
FIG. 51 schematically shows a configuration of an ALU processing element in accordance with Embodiment 4 of the present invention.

FIG. 51 schematically shows a configuration of the ALU processing element 34 according to Embodiment 4 of the present invention. The configuration of ALU processing element shown in FIG. 51 differs from that of the ALU processing element shown in FIG. 50 in the following point. Specifically, the movement control data bits E0-E3 for the inter-ALU communication circuit (RECM) 71 are respectively stored in C register 53, F register 54, XL register 58 and D register 59. Further, MIMD instruction bits M0 and M1 are stored in XL register 58 and C register 53.

As an example, in XL register 58, instruction bit M0 and control data E0 are stored, and in C register 53, MIMD operation instruction M1 and data movement amount control bit E3 are stored. In F register 54 and D register 59, movement amount control bits E1 and E2 are stored, respectively. The data movement operation and the MIMD operational instructions are not simultaneously executed. Therefore, collision of data bits does not occur even when the C register 53 and XL register 58 are used for storing the MIMD operational instruction and the control bits of zigzag copying operation.

The configuration of the ALU processing element in accordance with Embodiment 4 shown in FIG. 51 is equivalent to the combination of configurations shown in FIGS. 49 and 50. Here, it is unnecessary to provide dedicated registers for setting the movement data amount for each entry and for storing the MIMD instruction for each entry, so that the occupation area of the ALU processing element can further be reduced.

As described above, according to Embodiment 4 of the present invention, as the registers for storing the MIMD instruction and respective control bits of the RECM data, registers provided in the ALU processing element are utilized. Therefore, it is unnecessary to add new, further registers in the ALU processing element, and the increase in area of ALU processing element can be avoided. By way of example, when 1024 entries are provided and 6 registers (2 bits for MIMD) register, 4 bits for RECM registers) are shared per one ALU processing element, a total of 6144 registers can be reduced, and the area increase can effectively be prevented.

The manner of loading data and movement/instruction control data to each register and the manner of executing the MID instruction are the same as those described in Embodiment 1 above. By issuing once the zigzag copy instruction and the M1) operational instruction, data transfer and operation can be executed on entry by entry basis.

Embodiment 5

Figure 52:
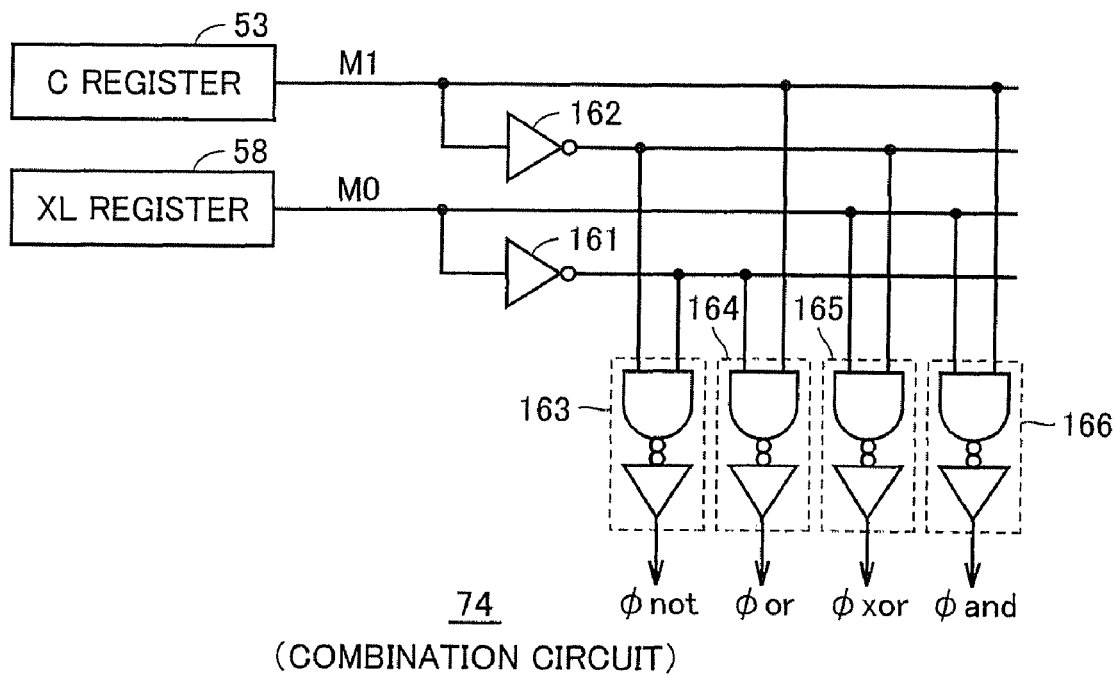
FIG. 52 shows an exemplary configuration of an MIMD instruction decoder in accordance with Embodiment 5 of the present invention.

FIG. 52 shows an example of a specific configuration of MIMD instruction decoder 74 described in Embodiments 1 to 4. In the configuration shown in FIG. 52, MIMD instruction bits M0 and M1 are generated by XL register 58 and C register 53, respectively. The MIMD instruction bits, however, may be stored in a dedicated MIMD register, as in Embodiment 1.

Referring to FIG. 52, MIMD instruction decoder 74 includes inverters 161 and 162 receiving instruction bits M0 and M1, respectively, an AND circuit 163 receiving output signals of inverters 161 and 162 and generating a negation operation designating signal φnot, an AND circuit 164 receiving an output signal of inverter 161 and instruction bit M1 and generating a logical sum operation designating signal φor, an AND circuit 165 receiving instruction bit M0 and an output signal of inverter 161 and generating an exclusive logical sum operation designating signal φxor, and an AND circuit 166 receiving instruction bits M0 and M1 and generating a logical product instruction designating signal φand. One operation designating signal φmimd is activated in accordance with the logical values of instruction bits M0 and M1, and an internal connection for executing the corresponding logic operation is set in adder 50.

The MIMD instruction decoder 74 shown in FIG. 52 is implemented by a combination circuit using inverters and AND circuits (NAND gate and inverters). By implementing the MID instruction decoder 74 by a combination circuit, the area occupied by instruction decoder 74 can be reduced and, in addition, high-speed decoding operation becomes possible.

The configuration of combination circuit for MIMD instruction decoder 74 shown in FIG. 52 is only an example, and other combination of logic gates may be used.

Embodiment 6

Figure 53:
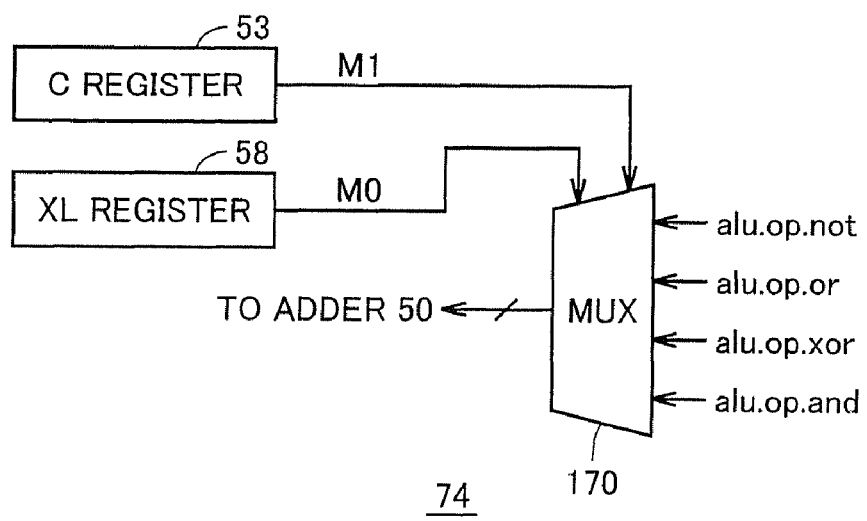
FIG. 53 shows another configuration of an MIMD instruction decoder in accordance with Embodiment 6 of the present invention.

FIG. 53 schematically shows a configuration of MIMD instruction decoder 74 according to Embodiment 6 of the present invention. In the configuration of FIG. 53 also, the MIMD instruction is represented by bits M1 and M0 from C register 53 and XL register 58. The MIMD instruction bits, however, may be applied from a dedicated MIMD register.

In FIG. 53, MIMD instruction decoder 74 is formed by a multiplexer (MUX) 170 that selects any of MIMD operation instructions alu.op.not, alu.op.or, alu.op.xor, and alu.op.and in accordance with instruction bits M0 and M1 and applies the selected one to adder 50.

The MIMD operation instructions applied to multiplexer 170 are each bit-deployed and supplied in the form of a code. In accordance with control bits M0 and M1, a code representing the designated operation instruction is selected and applied to adder 50.

Figure 54:
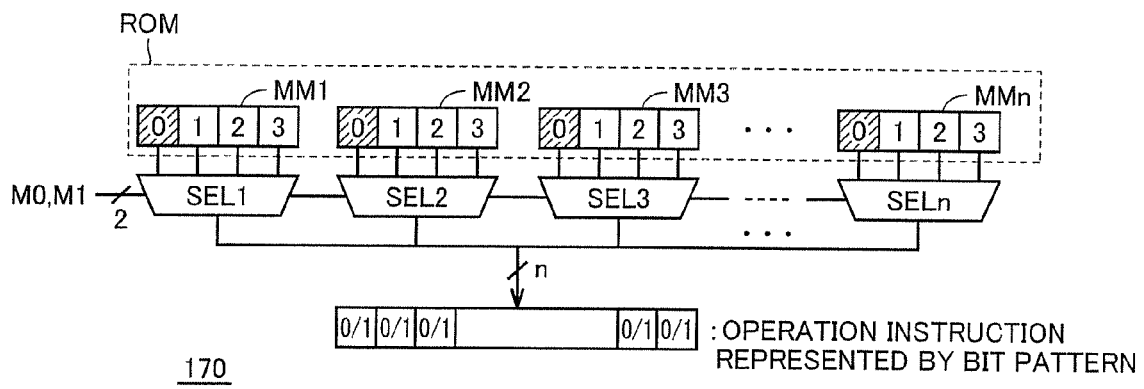
FIG. 54 shows, in detail, the configuration of multiplexer shown in FIG. 53.

FIG. 54 schematically shows a specific configuration of multiplexer 170 shown in FIG. 53. Referring to FIG. 54, multiplexer 170 includes selectors SEL1-SELn, each performing a 4-to-1 selection in accordance with the MIMD instruction bits M0 and M1.

In order to generate a bit pattern of the MIMD operational instruction, an instruction pattern memory ROM is provided. The instruction pattern memory ROM is a read-only-memory, and includes memory regions MM1-MMn each having the bit width of 4 bits, provided corresponding to selectors SEL1 to SELn. At the bit positions of the same number of memory regions MM1 to NMn, code bit of the same MIMD operational instruction is stored. Therefore, by selectors SEL1 to SELn, values stored at the same bit positions of these memory regions MM1 to MMn are selected in accordance with the operation instruction bits M0 and M1, and a control pattern having the n-bit width representing the operational instruction as a bit pattern (code) is selected and applied to adder 50. The bit width n of the bit pattern is set in accordance with the internal configuration of adder 50, and the number of bits necessary for switching the signal propagation path for realizing the designated logic operation in adder 50 is used.

The instruction pattern memory ROM is provided common to the ALU processing elements of all the entries of the main processing circuitry. The stored values of instruction pattern memory ROM are set by masking during manufacturing. Therefore, when the mask value is changed when masking the instruction pattern memory ROM, the instructions to be executed as MIMD operations can easily be changed, and hence, the contents of operation to be executed can easily be changed. Further, by extending bit width of selectors SEL1 to SELn and of memory regions MM1 to MMn, extension in types of MIMD operational instructions can easily be accommodated.

The instruction pattern memory ROM may not be a mask ROM, and it may be formed by an electrically rewritable (erasable and programmable) non-volatile memory. In that case also, the logic operation instructions can be changed or extended easily, by electrically rewriting the stored contents.

Embodiment 7

Figure 55:
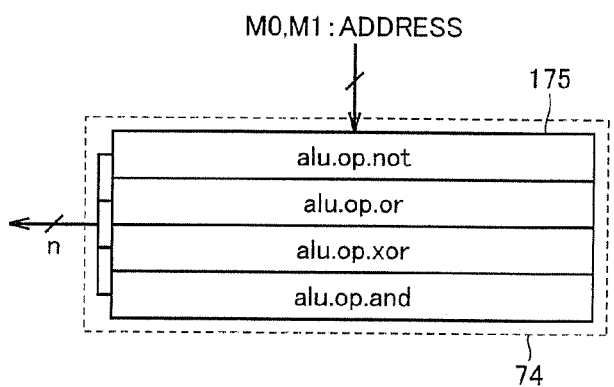
FIG. 55 schematically shows a configuration of an MIMD instruction decoder in accordance with Embodiment 7 of the present invention.

FIG. 55 schematically shows a configuration of MIMD instruction decoder 74 in accordance with Embodiment 7 of the present invention. Referring to FIG. 55, MIMD instruction decoder 74 includes a memory 175 that stores the MID operational instructions deployed in bit patterns. Memory 175 has 4 addresses in correspondence to MIMD operation instruction (1 address has n-bit width). Memory 175 reads an operational instruction pattern (instruction code) of a designated address, using operation instruction bits M0 and M1 as an address.

Memory 175 may be any memory that allow random accessing, and a common SRAM (Static Random Access Memory) or a flash memory may be used. Though not explicitly shown in FIG. 55, memory 175 naturally has an address decoder for decoding instruction bits M0 and M1 and an input/output circuit for writing/reading the bit pattern (instruction code). Memory 175 may be formed by a register file.

When an instruction set of memory 175 is changed, a code (bit pattern) of each instruction set is stored in each corresponding data entry. Here, a configuration may be adopted in which a register for serial/parallel conversion is provided in a preceding stage of the input circuit in memory 175, the instruction code is transferred to memory 175 from the corresponding data entry by 1-bit unit, and for n-bit instruction code of each instruction set, the instruction code transferred in bit-serial manner is written to the corresponding address position in n-bit parallel manner.

Alternatively, a configuration may be adopted, in which a bus dedicated for MIMD instruction transfer is provided for the MIMD instruction decoder, and through such dedicated bus, each instruction code of the instruction set is transferred through internal bus 14 shown in FIG. 1 and written to memory 175 under control of controller 21. Further, a configuration may be used in which controller 21 generates the MIMD instruction codes in main processing circuitry 20, and writes the codes to memory 175 for the instruction decoder of each entry.

Further, memory 175 may be formed into a 2-port configuration having A port of ½ bit width (one or two bit width) and B port of n-bit width, and the instruction code may be written through A port at the time of writing to memory 175, and the instruction code may be read through B port at the time of reading.

Implementation of MIMD instruction decoder 74 by a memory (RAM) 175 such as shown in FIG. 55 provides the following effects. Specifically, by rewriting an instruction code held in memory 175, the instruction set of usable MIMD instructions can be changed even when the parallel processing device (MTX) is in operation.

The present invention allows, when applied to a processing device (MTX) having an SIMD type architecture executing parallel operations, execution of operations with low parallelism at high speed. Application of the invention is not limited to the parallel processing, and it may also be applied to an emulator device for a logic circuit.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A parallel processing device, comprising plural operational blocks each comprising:
    a data storage unit including a plurality of data entries each including a plurality of memory cells arranged as a memory cell array;
    a plurality of arithmetic/logic processing elements, each of which couples with a corresponding entry and performs a designated operational processing on data stored in the corresponding entry;
    a plurality of data transfer lines for transferring data between each of the entries and corresponding arithmetic/logic processing element; and
    a plurality of data transfer circuits, arranged corresponding to said plurality of data transfer lines respectively, for transferring data between the memory cell in the corresponding entry and the corresponding arithmetic/logic processing element,
    wherein each data transfer circuit transfers data stored in a first memory cell in the corresponding entry to the corresponding arithmetic/logic processing element; each arithmetic/logic processing element executes the designated operational processing for the data transferred from the first memory cell; and each data transfer circuit transfers a result data of the designated operational processing by the corresponding arithmetic/logic processing element to a second memory cell in the corresponding entry,
    wherein when executing a SIMD operation instruction, the data transfer circuits select the first memory cell in the corresponding entries coupled with a same word line for an operation in the SIMD operation instruction, and
    wherein when executing a MIMD operation instruction, the data transfer circuits select the first memory cell in the corresponding entries coupled with different word lines for respective operations in the MIMD operation instruction.

2. The parallel processing device according to claim 1, wherein
    each of the arithmetic/logic processing elements includes
    an instruction register for storing data designating contents of operational processing,
    an instruction decoder for decoding the data of the instruction register and generating a signal defining the contents of operational processing, and
    a processing circuit having contents of operational processing set in accordance with an output signal of the instruction decoder.

3. The parallel processing device according to claim 2, wherein
    each of the arithmetic/logic processing elements includes
    a plurality of registers for storing data used for the operational processing by the processing circuit and mask data for masking the operational processing; and
    the instruction register is formed by a register, among the plurality of registers, other than the registers used when an instruction defined by the output signal of the instruction register is executed.

4. The parallel processing device according to claim 2, wherein
    the instruction decoder is formed by a combination circuit.

5. The parallel processing device according to claim 2, wherein
    the instruction decoder is formed by a multiplexer selecting an instruction from a plurality of instructions each in a code form, in accordance with the data stored in the instruction register.

6. The parallel processing device according to claim 2, wherein
    the instruction decoder includes an instruction memory storing a plurality of instructions each in a code form, and from the instruction memory, an instruction code corresponding to a designated instruction is read as a group of control signals, using the data stored in the instruction register as an address.

7. The parallel processing device according to claim 1, wherein
    in each of arithmetic/logic processing elements, either one of negation, logical product, logical sum and exclusive logical sum operations is designated individually, in accordance with the data stored in the instruction register.

* * * * *